US011842350B2

(12) United States Patent
Wong et al.

(10) Patent No.: US 11,842,350 B2
(45) Date of Patent: Dec. 12, 2023

(54) OFFLINE AUTHENTICATION

(71) Applicant: Visa International Service Association, San Francisco, CA (US)

(72) Inventors: Erick Wong, Vancouver (CA); Christian Aabye, Foster City, CA (US); Christian Flurscheim, Concord, CA (US); Christopher Jones, Greenbrae, CA (US)

(73) Assignee: Visa International Service Association, San Francisco, CA (US)

( * ) Notice: Subject to any disclaimer, the term of this patent is extended or adjusted under 35 U.S.C. 154(b) by 397 days.

(21) Appl. No.: 17/069,555

(22) Filed: Oct. 13, 2020

(65) Prior Publication Data

US 2021/0042753 A1 Feb. 11, 2021

Related U.S. Application Data

(62) Division of application No. 14/719,014, filed on May 21, 2015, now Pat. No. 10,846,694.

(Continued)

(51) Int. Cl.
*G06Q 20/40* (2012.01)
*H04L 9/32* (2006.01)
(Continued)

(52) U.S. Cl.
CPC ..... *G06Q 20/4015* (2020.05); *G06Q 20/3829* (2013.01); *H04L 9/3234* (2013.01);
(Continued)

(58) Field of Classification Search
None
See application file for complete search history.

(56) References Cited

U.S. PATENT DOCUMENTS

| 4,661,658 | A | * | 4/1987 | Matyas | ............. | G06Q 20/4012 |
| | | | | | | 705/72 |
| 5,280,527 | A | | 1/1994 | Gullman et al. | | |

(Continued)

FOREIGN PATENT DOCUMENTS

| AU | 2014368949 | 6/2016 |
| AU | 2015264124 | 11/2016 |

(Continued)

OTHER PUBLICATIONS

EMVCo—EMV Integrated Circuit Card Specifications for Payment Systems Book 2 Security and Key Management Version 4.1 May 2004 (Year: 2004).*

(Continued)

*Primary Examiner* — Jacob C. Coppola
*Assistant Examiner* — Eduardo Castilho
(74) *Attorney, Agent, or Firm* — Kilpatrick Townsend & Stockton LLP

(57) ABSTRACT

Techniques for enhancing the security of a communication device when conducting a transaction using the communication device may include using a limited-use key (LUK) to generate a transaction cryptogram, and using a signature key to generate a signature. The transaction can be an offline data authentication transaction, and access can be granted based on authentication of the signature prior to verifying the transaction cryptogram.

16 Claims, 11 Drawing Sheets

Related U.S. Application Data

(60) Provisional application No. 62/001,255, filed on May 21, 2014.

(51) Int. Cl.
*H04L 9/40* (2022.01)
*H04W 12/069* (2021.01)
*G06Q 20/38* (2012.01)
*H04W 12/065* (2021.01)
*H04W 12/06* (2021.01)
*H04W 4/60* (2018.01)
*H04W 12/10* (2021.01)

(52) U.S. Cl.
CPC .......... *H04L 9/3236* (2013.01); *H04L 9/3247* (2013.01); *H04L 9/3263* (2013.01); *H04L 63/0823* (2013.01); *H04W 12/065* (2021.01); *H04W 12/068* (2021.01); *H04W 12/069* (2021.01); *G06Q 2220/00* (2013.01); *H04L 9/3297* (2013.01); *H04L 63/126* (2013.01); *H04L 2209/56* (2013.01); *H04W 4/60* (2018.02); *H04W 12/10* (2013.01)

(56) References Cited

U.S. PATENT DOCUMENTS

| | | |
|---|---|---|
| 5,301,231 A | 4/1994 | Abraham et al. |
| 5,336,870 A | 8/1994 | Hughes et al. |
| 5,365,586 A | 11/1994 | Indeck et al. |
| 5,450,537 A | 9/1995 | Hirai et al. |
| 5,548,282 A | 8/1996 | Escritt et al. |
| 5,613,012 A | 3/1997 | Hoffman et al. |
| 5,625,669 A | 4/1997 | McGregor et al. |
| 5,640,577 A | 6/1997 | Scharmer |
| 5,729,591 A | 3/1998 | Bailey |
| 5,742,845 A | 4/1998 | Wagner |
| 5,781,438 A | 7/1998 | Lee et al. |
| 5,794,259 A | 8/1998 | Kikinis |
| 5,883,810 A | 3/1999 | Franklin et al. |
| 5,892,900 A | 4/1999 | Ginter et al. |
| 5,930,767 A | 7/1999 | Reber et al. |
| 5,953,710 A | 9/1999 | Fleming |
| 5,956,699 A | 9/1999 | Wong et al. |
| 5,974,430 A | 10/1999 | Mutschler, III et al. |
| 6,000,832 A | 12/1999 | Franklin et al. |
| 6,014,635 A | 1/2000 | Harris et al. |
| 6,044,349 A | 3/2000 | Tolopka et al. |
| 6,044,360 A | 3/2000 | Picciallo |
| 6,067,621 A | 5/2000 | Yu et al. |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,367,011 B1 | 4/2002 | Lee et al. |
| 6,385,596 B1 | 5/2002 | Wiser et al. |
| 6,421,729 B1 | 7/2002 | Paltenghe et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,490,601 B1 | 12/2002 | Markus et al. |
| 6,499,042 B1 | 12/2002 | Markus |
| 6,571,339 B1 | 5/2003 | Danneels et al. |
| 6,592,044 B1 | 7/2003 | Wong et al. |
| 6,636,833 B1 | 10/2003 | Flitcroft et al. |
| 6,658,566 B1 | 12/2003 | Hazard |
| 6,658,568 B1 | 12/2003 | Ginter et al. |
| 6,725,371 B1 | 4/2004 | Verhoorn, III et al. |
| 6,742,116 B1 | 5/2004 | Matsui et al. |
| 6,748,367 B1 | 6/2004 | Lee |
| 6,805,287 B2 | 10/2004 | Bishop et al. |
| 6,850,996 B2 | 2/2005 | Wagner |
| 6,873,974 B1 | 3/2005 | Schutzer |
| 6,879,965 B2 | 4/2005 | Fung et al. |
| 6,891,953 B1 | 5/2005 | DeMello et al. |
| 6,901,387 B2 | 5/2005 | Wells et al. |
| 6,907,476 B2 | 6/2005 | Wagner |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,983,882 B2 | 1/2006 | Cassone |
| 6,990,470 B2 | 1/2006 | Hogan et al. |
| 6,991,157 B2 | 1/2006 | Bishop et al. |
| 7,024,553 B1 | 4/2006 | Morimoto |
| 7,051,929 B2 | 5/2006 | Li |
| 7,062,706 B2 | 6/2006 | Maxwell et al. |
| 7,069,249 B2 | 6/2006 | Stolfo et al. |
| 7,080,048 B1 | 7/2006 | Sines et al. |
| 7,080,256 B1 | 7/2006 | Vedder |
| 7,103,576 B2 | 9/2006 | Mann, III et al. |
| 7,110,792 B2 | 9/2006 | Rosenberg |
| 7,111,324 B2 | 9/2006 | Elteto et al. |
| 7,113,930 B2 | 9/2006 | Eccles et al. |
| 7,136,835 B1 | 11/2006 | Flitcroft et al. |
| 7,146,159 B1 | 12/2006 | Zhu |
| 7,159,180 B2 | 1/2007 | Ward |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,210,169 B2 | 4/2007 | Smith et al. |
| 7,216,292 B1 | 5/2007 | Snapper et al. |
| 7,218,915 B2 | 5/2007 | Craven |
| 7,228,155 B2 | 6/2007 | Saunders |
| 7,231,045 B1 | 6/2007 | Parrott |
| 7,254,569 B2 | 8/2007 | Goodman et al. |
| 7,257,581 B1 | 8/2007 | Steele et al. |
| 7,264,154 B2 | 9/2007 | Harris |
| 7,275,263 B2 | 9/2007 | Bajikar et al. |
| 7,275,685 B2 | 10/2007 | Gray et al. |
| 7,287,692 B1 | 10/2007 | Patel et al. |
| 7,292,999 B2 | 11/2007 | Hobson et al. |
| 7,334,184 B1 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,350,230 B2 | 3/2008 | Forrest |
| 7,353,382 B2 | 4/2008 | Labrou et al. |
| 7,356,706 B2 | 4/2008 | Scheurich |
| 7,366,703 B2 | 4/2008 | Gray et al. |
| 7,374,082 B2 | 5/2008 | Van de Velde et al. |
| 7,376,583 B1 | 5/2008 | Rolf |
| 7,379,919 B2 | 5/2008 | Hogan et al. |
| RE40,444 E | 7/2008 | Linehan |
| 7,412,420 B2 | 8/2008 | Holdsworth |
| 7,413,113 B1 | 8/2008 | Zhu |
| 7,415,270 B2 | 8/2008 | Wilhelmsson et al. |
| 7,415,443 B2 | 8/2008 | Hobson et al. |
| 7,427,033 B1 | 9/2008 | Roskind |
| 7,430,540 B1 | 9/2008 | Asani |
| 7,431,202 B1 | 10/2008 | Meador et al. |
| 7,437,575 B2 | 10/2008 | Dennis et al. |
| 7,437,757 B2 | 10/2008 | Holdsworth |
| 7,444,676 B1 | 10/2008 | Asghari-Kamrani et al. |
| 7,469,151 B2 | 12/2008 | Khan et al. |
| 7,483,845 B2 | 1/2009 | Vetelainen |
| 7,512,975 B2 | 3/2009 | Aissi |
| 7,523,859 B2 | 4/2009 | Patel et al. |
| 7,533,063 B2 | 5/2009 | Kianian |
| 7,533,828 B2 | 5/2009 | Ong |
| 7,548,889 B2 | 6/2009 | Bhambri et al. |
| 7,552,094 B2 | 6/2009 | Park et al. |
| 7,567,934 B2 | 7/2009 | Flitcroft et al. |
| 7,567,936 B1 | 7/2009 | Peckover et al. |
| 7,568,631 B2 | 8/2009 | Gibbs et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,581,678 B2 | 9/2009 | Narendra et al. |
| 7,584,153 B2 | 9/2009 | Brown et al. |

(56) References Cited

U.S. PATENT DOCUMENTS

| | | |
|---|---|---|
| 7,587,756 B2 | 9/2009 | Peart et al. |
| 7,593,896 B1 | 9/2009 | Flitcroft et al. |
| 7,599,863 B2 | 10/2009 | Sines et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,628,322 B2 | 12/2009 | Holtmanns et al. |
| 7,650,314 B1 | 1/2010 | Saunders |
| 7,660,779 B2 | 2/2010 | Goodman et al. |
| 7,664,699 B1 | 2/2010 | Powell |
| 7,685,037 B2 | 3/2010 | Reiners et al. |
| 7,694,130 B1 | 4/2010 | Martinez |
| 7,697,686 B2 | 4/2010 | Puiatti et al. |
| 7,702,578 B2 | 4/2010 | Fung et al. |
| 7,707,120 B2 | 4/2010 | Dominguez et al. |
| 7,712,655 B2 | 5/2010 | Wong |
| 7,716,596 B2 | 5/2010 | Cao et al. |
| 7,734,527 B2 | 6/2010 | Uzo |
| 7,753,265 B2 | 7/2010 | Harris |
| 7,761,374 B2 | 7/2010 | Sahota et al. |
| 7,765,281 B1 | 7/2010 | Crow et al. |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,840,812 B1 | 11/2010 | Levenberg |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,014 B2 | 12/2010 | Erikson |
| 7,849,020 B2 | 12/2010 | Johnson |
| 7,853,529 B1 | 12/2010 | Walker et al. |
| 7,853,995 B2 | 12/2010 | Chow et al. |
| 7,857,225 B2 | 12/2010 | Challa et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,560 B2 | 2/2011 | Hammad |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,954,717 B2 | 6/2011 | Narendra et al. |
| 7,959,076 B1 | 6/2011 | Hopkins, III |
| 7,966,257 B2 | 6/2011 | DiGioacchino |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,083,145 B2 | 12/2011 | Narendra et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,165,635 B2 | 4/2012 | Khan et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,131 B1 | 6/2012 | Von Behren et al. |
| 8,196,813 B2 | 6/2012 | Vadhri |
| 8,196,818 B2 | 6/2012 | Van de Velde et al. |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,089 B2 | 7/2012 | Wang et al. |
| 8,225,385 B2 | 7/2012 | Chow et al. |
| 8,229,852 B2 | 7/2012 | Carlson |
| 8,265,993 B2 | 9/2012 | Chien et al. |
| 8,271,395 B2 | 9/2012 | Dominguez et al. |
| 8,280,777 B2 | 10/2012 | Mengerink et al. |
| 8,281,991 B2 | 10/2012 | Wentker et al. |
| 8,302,167 B2 | 10/2012 | Mennes et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,474 B2 | 3/2013 | Charrat |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,099 B2 | 4/2013 | Charrat |
| 8,412,623 B2 | 4/2013 | Moon et al. |
| 8,412,631 B2 | 4/2013 | Crofts et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,523,059 B1 | 9/2013 | Mullen et al. |
| 8,528,067 B2 | 9/2013 | Hurry et al. |
| 8,533,860 B1 | 9/2013 | Grecia |
| 8,534,564 B2 | 9/2013 | Hammad |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,594,566 B2 | 11/2013 | Zhu et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,628,012 B1 | 1/2014 | Wallner |
| 8,635,157 B2 | 1/2014 | Smith et al. |
| 8,644,959 B2 | 2/2014 | Hermann |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,677,467 B2 | 3/2014 | Lincoln et al. |
| 8,700,729 B2 | 4/2014 | Dua |

(56) References Cited

U.S. PATENT DOCUMENTS

| | | |
|---|---|---|
| 8,706,556 B2 | 4/2014 | Mestre et al. |
| 8,712,325 B2 | 4/2014 | Leica et al. |
| 8,719,952 B1 | 5/2014 | Damm-Goossens |
| 8,751,391 B2 | 6/2014 | Freund |
| 8,762,263 B2 | 6/2014 | Gauthier et al. |
| 8,793,186 B2 | 7/2014 | Patterson |
| 8,814,046 B1 | 8/2014 | Wallner |
| 8,838,982 B2 | 9/2014 | Carlson et al. |
| 8,850,527 B2 | 9/2014 | Chew et al. |
| 8,855,314 B2 | 10/2014 | Modave et al. |
| 8,856,539 B2 | 10/2014 | Weiss |
| 8,856,640 B1 | 10/2014 | Barr et al. |
| 8,887,308 B2 | 11/2014 | Grecia |
| 8,909,557 B2 | 12/2014 | Collinge et al. |
| 8,955,039 B2 | 2/2015 | Prakash et al. |
| 8,990,572 B2 | 3/2015 | Patefield-Smith et al. |
| 9,026,462 B2 | 5/2015 | Lin et al. |
| 9,037,491 B1 | 5/2015 | Lee |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,195,926 B2 | 11/2015 | Spodak |
| 9,208,482 B2 | 12/2015 | Laracey |
| 9,208,490 B2 | 12/2015 | Pitroda et al. |
| 9,218,479 B2 | 12/2015 | Collinge et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,361,619 B2 | 6/2016 | Varadarajan et al. |
| 9,411,601 B2 | 8/2016 | Zimmer et al. |
| 9,425,968 B2 | 8/2016 | Demeter et al. |
| 9,530,137 B2 | 12/2016 | Weiss |
| 9,680,942 B2 | 6/2017 | Dimmick |
| 9,775,029 B2 | 9/2017 | Lopez |
| 9,922,322 B2 | 3/2018 | Flurscheim et al. |
| 9,972,005 B2 | 5/2018 | Wong et al. |
| 10,049,353 B2 | 8/2018 | Lopez |
| 10,402,814 B2 | 9/2019 | Wong et al. |
| 10,477,393 B2 | 11/2019 | Lopez |
| 10,664,824 B2 | 5/2020 | Wong et al. |
| 11,036,873 B2 | 6/2021 | Lopez |
| 2001/0029485 A1 | 10/2001 | Brody et al. |
| 2001/0032182 A1 | 10/2001 | Kumar et al. |
| 2001/0034720 A1 | 10/2001 | Armes |
| 2001/0042785 A1 | 11/2001 | Walker et al. |
| 2001/0051924 A1 | 12/2001 | Uberti |
| 2001/0054003 A1 | 12/2001 | Chien et al. |
| 2001/0054148 A1 | 12/2001 | Hoornaert et al. |
| 2002/0007320 A1 | 1/2002 | Hogan et al. |
| 2002/0016749 A1 | 2/2002 | Borecki et al. |
| 2002/0023054 A1 | 2/2002 | Gillespie |
| 2002/0029193 A1 | 3/2002 | Ranjan et al. |
| 2002/0035548 A1 | 3/2002 | Hogan et al. |
| 2002/0049636 A1 | 4/2002 | Griffin et al. |
| 2002/0073045 A1 | 6/2002 | Rubin et al. |
| 2002/0091877 A1 | 7/2002 | Karidis |
| 2002/0095580 A1 | 7/2002 | Candelore |
| 2002/0111919 A1* | 8/2002 | Weller ............... G06Q 20/12 705/67 |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0061519 A1 | 3/2003 | Shibata et al. |
| 2003/0097344 A1* | 5/2003 | Chaum ............ G06Q 20/40975 705/75 |
| 2003/0108204 A1 | 6/2003 | Audebert et al. |
| 2003/0115142 A1 | 6/2003 | Brickell et al. |
| 2003/0130955 A1 | 7/2003 | Hawthorne |
| 2003/0182246 A1 | 9/2003 | Johnson et al. |
| 2003/0191709 A1 | 10/2003 | Elston et al. |
| 2003/0191945 A1 | 10/2003 | Keech |
| 2004/0010462 A1 | 1/2004 | Moon et al. |
| 2004/0029569 A1 | 2/2004 | Khan et al. |
| 2004/0034597 A1 | 2/2004 | Durand |
| 2004/0050928 A1 | 3/2004 | Bishop et al. |
| 2004/0058705 A1 | 3/2004 | Morgan et al. |
| 2004/0059682 A1 | 3/2004 | Hasumi et al. |
| 2004/0093281 A1 | 5/2004 | Silverstein et al. |
| 2004/0104268 A1 | 6/2004 | Bailey |
| 2004/0127256 A1 | 7/2004 | Goldthwaite et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0188519 A1 | 9/2004 | Cassone |
| 2004/0210449 A1 | 10/2004 | Breck et al. |
| 2004/0210498 A1 | 10/2004 | Freund |
| 2004/0210821 A1 | 10/2004 | Kasser |
| 2004/0226999 A1 | 11/2004 | Ruat et al. |
| 2004/0232225 A1 | 11/2004 | Bishop et al. |
| 2004/0236632 A1 | 11/2004 | Maritzen et al. |
| 2004/0236672 A1 | 11/2004 | Jung et al. |
| 2004/0248554 A1 | 12/2004 | Khan et al. |
| 2004/0254890 A1 | 12/2004 | Sancho et al. |
| 2004/0260646 A1 | 12/2004 | Berardi et al. |
| 2005/0027871 A1 | 2/2005 | Bradley et al. |
| 2005/0037735 A1 | 2/2005 | Coutts |
| 2005/0043997 A1 | 2/2005 | Sahota et al. |
| 2005/0080730 A1 | 4/2005 | Sorrentino |
| 2005/0108178 A1 | 5/2005 | York |
| 2005/0108569 A1 | 5/2005 | Bantz et al. |
| 2005/0109838 A1 | 5/2005 | Linlor |
| 2005/0156026 A1 | 7/2005 | Ghosh et al. |
| 2005/0171898 A1 | 8/2005 | Bishop et al. |
| 2005/0177522 A1 | 8/2005 | Williams |
| 2005/0194452 A1 | 9/2005 | Nordentoft et al. |
| 2005/0199709 A1 | 9/2005 | Linlor |
| 2005/0238174 A1 | 10/2005 | Kreitzer |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2005/0278461 A1 | 12/2005 | Ohta |
| 2006/0016879 A1 | 1/2006 | Kean |
| 2006/0041655 A1 | 2/2006 | Holloway et al. |
| 2006/0093149 A1 | 5/2006 | Zhu et al. |
| 2006/0131390 A1 | 6/2006 | Kim |
| 2006/0142058 A1 | 6/2006 | Elias et al. |
| 2006/0168653 A1 | 7/2006 | Contrera |
| 2006/0235795 A1 | 10/2006 | Johnson et al. |
| 2006/0237528 A1 | 10/2006 | Bishop et al. |
| 2006/0253389 A1 | 11/2006 | Hagale et al. |
| 2006/0278704 A1 | 12/2006 | Saunders et al. |
| 2006/0294023 A1 | 12/2006 | Lu |
| 2007/0005685 A1 | 1/2007 | Chau et al. |
| 2007/0107044 A1 | 5/2007 | Yuen et al. |
| 2007/0114274 A1 | 5/2007 | Gibbs et al. |
| 2007/0118483 A1 | 5/2007 | Hill et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0143828 A1 | 6/2007 | Jeal et al. |
| 2007/0170247 A1 | 7/2007 | Friedman |
| 2007/0178883 A1 | 8/2007 | Nandagopal |
| 2007/0179885 A1 | 8/2007 | Bird et al. |
| 2007/0192240 A1 | 8/2007 | Crooks |
| 2007/0208671 A1 | 9/2007 | Brown et al. |
| 2007/0228148 A1 | 10/2007 | Rable |
| 2007/0245414 A1 | 10/2007 | Chan et al. |
| 2007/0255955 A1 | 11/2007 | Everett et al. |
| 2007/0276765 A1 | 11/2007 | Hazel et al. |
| 2007/0284443 A1 | 12/2007 | Anson et al. |
| 2007/0288377 A1 | 12/2007 | Shaked |
| 2007/0291995 A1 | 12/2007 | Rivera |
| 2008/0001744 A1 | 1/2008 | Batra et al. |
| 2008/0011823 A1 | 1/2008 | Patel et al. |
| 2008/0014867 A1 | 1/2008 | Finn |
| 2008/0015988 A1 | 1/2008 | Brown et al. |
| 2008/0029598 A1 | 2/2008 | Fernandes et al. |
| 2008/0029607 A1 | 2/2008 | Mullen |
| 2008/0034221 A1 | 2/2008 | Hammad et al. |
| 2008/0035738 A1 | 2/2008 | Mullen |

(56) References Cited

U.S. PATENT DOCUMENTS

| | | |
|---|---|---|
| 2008/0040276 A1 | 2/2008 | Hammad et al. |
| 2008/0040285 A1 | 2/2008 | Wankmueller |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0071681 A1 | 3/2008 | Khalid |
| 2008/0110983 A1 | 5/2008 | Ashfield |
| 2008/0126260 A1 | 5/2008 | Cox et al. |
| 2008/0142582 A1 | 6/2008 | Corioni |
| 2008/0154770 A1 | 6/2008 | Rutherford et al. |
| 2008/0177796 A1 | 7/2008 | Eldering |
| 2008/0201264 A1 | 8/2008 | Brown et al. |
| 2008/0201265 A1 | 8/2008 | Hewton |
| 2008/0201577 A1 | 8/2008 | Tuliani |
| 2008/0208759 A1 | 8/2008 | Royyuru |
| 2008/0228646 A1 | 9/2008 | Myers et al. |
| 2008/0228653 A1 | 9/2008 | Holdsworth |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0249948 A1 | 10/2008 | Kim et al. |
| 2008/0283591 A1 | 11/2008 | Oder, II et al. |
| 2008/0289022 A1 | 11/2008 | Chiu |
| 2008/0302869 A1 | 12/2008 | Mullen |
| 2008/0302876 A1 | 12/2008 | Mullen |
| 2008/0305769 A1 | 12/2008 | Rubinstein |
| 2008/0313264 A1 | 12/2008 | Pestoni |
| 2008/0319905 A1 | 12/2008 | Carlson |
| 2009/0006262 A1 | 1/2009 | Brown et al. |
| 2009/0006646 A1 | 1/2009 | Duarte |
| 2009/0010488 A1 | 1/2009 | Matsuoka et al. |
| 2009/0030845 A1 | 1/2009 | Hurry et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048935 A1 | 2/2009 | Blanc et al. |
| 2009/0048953 A1 | 2/2009 | Hazel et al. |
| 2009/0048971 A1 | 2/2009 | Hathaway et al. |
| 2009/0068982 A1 | 3/2009 | Chen et al. |
| 2009/0104888 A1 | 4/2009 | Cox |
| 2009/0106112 A1 | 4/2009 | Dalmia et al. |
| 2009/0106138 A1 | 4/2009 | Smith et al. |
| 2009/0106160 A1 | 4/2009 | Skowronek |
| 2009/0124234 A1 | 5/2009 | Fisher et al. |
| 2009/0132413 A1 | 5/2009 | Engelbrecht |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0216681 A1 | 8/2009 | McCown |
| 2009/0219430 A1 | 9/2009 | Okamoto et al. |
| 2009/0248583 A1 | 10/2009 | Chhabra |
| 2009/0254440 A1 | 10/2009 | Pharris |
| 2009/0255987 A1 | 10/2009 | Olivares Baena |
| 2009/0255996 A1 | 10/2009 | Brown et al. |
| 2009/0264102 A1 | 10/2009 | Parmar et al. |
| 2009/0265260 A1 | 10/2009 | Aabye et al. |
| 2009/0276347 A1 | 11/2009 | Kargman |
| 2009/0281948 A1 | 11/2009 | Carlson |
| 2009/0282261 A1 | 11/2009 | Khan et al. |
| 2009/0289110 A1 | 11/2009 | Regen et al. |
| 2009/0294527 A1 | 12/2009 | Brabson et al. |
| 2009/0298478 A1 | 12/2009 | Tyhurst et al. |
| 2009/0300351 A1 | 12/2009 | Lei et al. |
| 2009/0307139 A1 | 12/2009 | Mardikar et al. |
| 2009/0307493 A1 | 12/2009 | Smith |
| 2009/0308921 A1 | 12/2009 | Mullen |
| 2009/0313168 A1 | 12/2009 | Manessis |
| 2009/0319430 A1 | 12/2009 | Faith et al. |
| 2009/0319431 A1 | 12/2009 | Aiello et al. |
| 2009/0319784 A1 | 12/2009 | Faith et al. |
| 2009/0323937 A1 | 12/2009 | Teng et al. |
| 2009/0327131 A1 | 12/2009 | Beenau et al. |
| 2010/0008535 A1 | 1/2010 | Abulafia et al. |
| 2010/0034383 A1 | 2/2010 | Turk |
| 2010/0042841 A1 | 2/2010 | King et al. |
| 2010/0082444 A1 | 4/2010 | Lin et al. |
| 2010/0082485 A1 | 4/2010 | Lin et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0114776 A1 | 5/2010 | Weller et al. |
| 2010/0120408 A1 | 5/2010 | Beenau et al. |
| 2010/0125516 A1 | 5/2010 | Wankmueller et al. |
| 2010/0133334 A1 | 6/2010 | Vadhri |
| 2010/0138344 A1 | 6/2010 | Wong et al. |
| 2010/0138347 A1 | 6/2010 | Chen |
| 2010/0145860 A1 | 6/2010 | Pelegero |
| 2010/0153267 A1 | 6/2010 | Ghaidan et al. |
| 2010/0161433 A1 | 6/2010 | White |
| 2010/0176935 A1 | 7/2010 | Phillips |
| 2010/0185545 A1 | 7/2010 | Royyuru et al. |
| 2010/0211505 A1 | 8/2010 | Saunders et al. |
| 2010/0223184 A1 | 9/2010 | Perlman |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0246369 A1 | 9/2010 | Sato |
| 2010/0257102 A1 | 10/2010 | Perlman |
| 2010/0258620 A1 | 10/2010 | Torreyson et al. |
| 2010/0274692 A1 | 10/2010 | Hammad |
| 2010/0274712 A1 | 10/2010 | Mestre et al. |
| 2010/0274721 A1 | 10/2010 | Hammad |
| 2010/0291904 A1 | 11/2010 | Musfeldt et al. |
| 2010/0293189 A1 | 11/2010 | Hammad |
| 2010/0293381 A1 | 11/2010 | Hammad |
| 2010/0293382 A1 | 11/2010 | Hammad |
| 2010/0299267 A1 | 11/2010 | Faith et al. |
| 2010/0306076 A1 | 12/2010 | Taveau et al. |
| 2010/0318468 A1 | 12/2010 | Carr et al. |
| 2010/0318801 A1 | 12/2010 | Roberge et al. |
| 2010/0325041 A1 | 12/2010 | Berardi et al. |
| 2010/0327054 A1 | 12/2010 | Hammad |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0038481 A1 | 2/2011 | Modave et al. |
| 2011/0040640 A1 | 2/2011 | Erikson |
| 2011/0047076 A1 | 2/2011 | Carlson et al. |
| 2011/0078081 A1 | 3/2011 | Pirzadeh et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0112918 A1 | 5/2011 | Mestre et al. |
| 2011/0112920 A1 | 5/2011 | Mestre et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0184867 A1 | 7/2011 | Varadarajan |
| 2011/0191244 A1 | 8/2011 | Dai |
| 2011/0208529 A1 | 8/2011 | Jeal et al. |
| 2011/0238511 A1 | 9/2011 | Park et al. |
| 2011/0238573 A1 | 9/2011 | Varadarajan |
| 2011/0238579 A1 | 9/2011 | Coppinger |
| 2011/0240745 A1 | 10/2011 | Brown |
| 2011/0246317 A1 | 10/2011 | Coppinger |
| 2011/0246369 A1 | 10/2011 | De Oliveira et al. |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276418 A1 | 11/2011 | Velani |
| 2011/0276420 A1 | 11/2011 | White et al. |
| 2011/0276424 A1 | 11/2011 | Mullen |

(56) References Cited

U.S. PATENT DOCUMENTS

| | | |
|---|---|---|
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0070129 A1 | 3/2012 | Lin et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0084206 A1 | 4/2012 | Mehew et al. |
| 2012/0089519 A1 | 4/2012 | Peddada |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0124394 A1 | 5/2012 | Brudnicki et al. |
| 2012/0129514 A1 | 5/2012 | Beenau et al. |
| 2012/0143707 A1 | 6/2012 | Jain |
| 2012/0143752 A1 | 6/2012 | Wong et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0254041 A1 | 10/2012 | Saxena et al. |
| 2012/0265631 A1 | 10/2012 | Cronic et al. |
| 2012/0271770 A1 | 10/2012 | Harris et al. |
| 2012/0284195 A1 | 11/2012 | McMillen et al. |
| 2012/0284526 A1 | 11/2012 | Arnold et al. |
| 2012/0290376 A1 | 11/2012 | Dryer et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2012/0317628 A1 | 12/2012 | Yeager |
| 2012/0324566 A1 | 12/2012 | Baum et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0028502 A1 | 1/2013 | Nepomniachtchi et al. |
| 2013/0031006 A1 | 1/2013 | McCullagh et al. |
| 2013/0054336 A1 | 2/2013 | Graylin |
| 2013/0054337 A1 | 2/2013 | Brendell et al. |
| 2013/0054466 A1 | 2/2013 | Muscato |
| 2013/0054474 A1 | 2/2013 | Yeager |
| 2013/0067216 A1 | 3/2013 | Tanner et al. |
| 2013/0081122 A1 | 3/2013 | Svigals et al. |
| 2013/0086375 A1 | 4/2013 | Lyne et al. |
| 2013/0091028 A1 | 4/2013 | Oder ("J.D."), II et al. |
| 2013/0097080 A1 | 4/2013 | Smets et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0140360 A1 | 6/2013 | Graylin |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0145455 A1 | 6/2013 | Vijayshankar et al. |
| 2013/0159178 A1 | 6/2013 | Colon et al. |
| 2013/0159184 A1 | 6/2013 | Thaw |
| 2013/0159186 A1 | 6/2013 | Brudnicki et al. |
| 2013/0166402 A1 | 6/2013 | Parento et al. |
| 2013/0166448 A1 | 6/2013 | Narayanan |
| 2013/0166456 A1 | 6/2013 | Zhang et al. |
| 2013/0173736 A1 | 7/2013 | Krzeminski et al. |
| 2013/0179348 A1 | 7/2013 | Crofts et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0198519 A1* | 8/2013 | Marien .......... G06F 21/34 713/172 |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226797 A1 | 8/2013 | Jiang et al. |
| 2013/0226799 A1 | 8/2013 | Raj |
| 2013/0226812 A1 | 8/2013 | Landrok et al. |
| 2013/0226813 A1 | 8/2013 | Voltz |
| 2013/0232083 A1 | 9/2013 | Smith et al. |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0268776 A1 | 10/2013 | Motoyama |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304642 A1 | 11/2013 | Campos |
| 2013/0304649 A1 | 11/2013 | Cronic et al. |
| 2013/0305035 A1 | 11/2013 | Lyne et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339166 A1 | 12/2013 | Baer et al. |

(56) References Cited

U.S. PATENT DOCUMENTS

| | | |
|---|---|---|
| 2013/0339253 A1 | 12/2013 | Sincai |
| 2013/0346305 A1 | 12/2013 | Mendes |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0020073 A1 | 1/2014 | Ronda et al. |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040149 A1* | 2/2014 | Fiske ................ G06Q 20/3263 705/71 |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0052640 A1 | 2/2014 | Pitroda et al. |
| 2014/0061302 A1 | 3/2014 | Hammad |
| 2014/0068706 A1 | 3/2014 | Aissi |
| 2014/0074635 A1 | 3/2014 | Reese et al. |
| 2014/0074637 A1 | 3/2014 | Hammad |
| 2014/0074724 A1 | 3/2014 | Gordon et al. |
| 2014/0075496 A1 | 3/2014 | Prakash et al. |
| 2014/0100973 A1 | 4/2014 | Brown et al. |
| 2014/0108172 A1 | 4/2014 | Weber et al. |
| 2014/0108241 A1 | 4/2014 | Tunnell et al. |
| 2014/0108261 A1 | 4/2014 | Priest et al. |
| 2014/0108263 A1 | 4/2014 | Ortiz et al. |
| 2014/0108265 A1 | 4/2014 | Hayhow et al. |
| 2014/0110477 A1 | 4/2014 | Hammad |
| 2014/0114857 A1 | 4/2014 | Griggs et al. |
| 2014/0123237 A1 | 5/2014 | Gaudet et al. |
| 2014/0129438 A1 | 5/2014 | Desai et al. |
| 2014/0143137 A1 | 5/2014 | Carlson |
| 2014/0149285 A1 | 5/2014 | De et al. |
| 2014/0164243 A1 | 6/2014 | Aabye et al. |
| 2014/0188586 A1 | 7/2014 | Carpenter et al. |
| 2014/0207682 A1 | 7/2014 | Wolfond et al. |
| 2014/0236842 A1 | 8/2014 | Salminen et al. |
| 2014/0244494 A1 | 8/2014 | Davis et al. |
| 2014/0244514 A1 | 8/2014 | Rodriguez et al. |
| 2014/0246490 A1 | 9/2014 | Graylin |
| 2014/0246492 A1 | 9/2014 | Hill et al. |
| 2014/0249945 A1 | 9/2014 | Gauthier et al. |
| 2014/0263625 A1 | 9/2014 | Smets et al. |
| 2014/0279309 A1* | 9/2014 | Cowen ................ G06Q 20/4016 705/30 |
| 2014/0294701 A1 | 10/2014 | Dai et al. |
| 2014/0297534 A1 | 10/2014 | Patterson |
| 2014/0298027 A1 | 10/2014 | Roberts et al. |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0351581 A1 | 11/2014 | Pritikin |
| 2014/0358796 A1 | 12/2014 | Smets et al. |
| 2014/0372308 A1 | 12/2014 | Sheets |
| 2015/0012980 A1 | 1/2015 | Mikolajczyk |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0081544 A1 | 3/2015 | Schulz et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0116887 A1 | 4/2015 | Avestruz et al. |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0134537 A1 | 5/2015 | Hammad |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0172330 A1 | 6/2015 | Kaplan |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0227920 A1 | 8/2015 | Sadiq et al. |
| 2015/0269566 A1 | 9/2015 | Gaddam et al. |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0324788 A1 | 11/2015 | Graylin et al. |
| 2015/0332261 A1 | 11/2015 | Park et al. |
| 2015/0332262 A1 | 11/2015 | Lingappa |
| 2015/0339642 A1 | 11/2015 | Park et al. |
| 2015/0339662 A1 | 11/2015 | Huang et al. |
| 2015/0339664 A1 | 11/2015 | Wong et al. |
| 2015/0356560 A1 | 12/2015 | Shastry et al. |
| 2015/0363781 A1 | 12/2015 | Badenhorst |
| 2015/0371050 A1 | 12/2015 | Martini |
| 2015/0373762 A1 | 12/2015 | Raj et al. |
| 2016/0019512 A1 | 1/2016 | Buchheim et al. |
| 2016/0028548 A1 | 1/2016 | Yao et al. |
| 2016/0028550 A1 | 1/2016 | Gaddam et al. |
| 2016/0034880 A1 | 2/2016 | Roberts et al. |
| 2016/0036790 A1 | 2/2016 | Shastry et al. |
| 2016/0042263 A1 | 2/2016 | Gaddam et al. |
| 2016/0057619 A1 | 2/2016 | Lopez |
| 2016/0065370 A1 | 3/2016 | Le Saint et al. |
| 2016/0086073 A1 | 3/2016 | Narendra et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0162883 A1 | 6/2016 | Liscia et al. |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217452 A1 | 7/2016 | Wong et al. |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0241402 A1 | 8/2016 | Gordon et al. |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0103387 A1 | 4/2017 | Weber |
| 2017/0109745 A1 | 4/2017 | Al-Bedaiwi et al. |
| 2017/0186001 A1 | 6/2017 | Reed et al. |

(56) References Cited

U.S. PATENT DOCUMENTS

| | | |
|---|---|---|
| 2017/0201520 A1 | 7/2017 | Chandoor et al. |
| 2017/0220818 A1 | 8/2017 | Nagasundaram et al. |
| 2017/0228723 A1 | 8/2017 | Taylor et al. |
| 2017/0295155 A1 | 10/2017 | Wong |
| 2017/0364707 A1 | 12/2017 | Lal et al. |
| 2017/0364903 A1 | 12/2017 | Lopez |
| 2018/0075081 A1 | 3/2018 | Chipman |
| 2018/0189783 A1 | 7/2018 | Flurscheim et al. |
| 2018/0232722 A1 | 8/2018 | Wong et al. |
| 2018/0247303 A1 | 8/2018 | Raj et al. |
| 2018/0262334 A1 | 9/2018 | Hammad |
| 2018/0268405 A1 | 9/2018 | Lopez |
| 2018/0324184 A1 | 11/2018 | Kaja et al. |
| 2018/0324584 A1 | 11/2018 | Lopez |
| 2019/0295063 A1 | 9/2019 | Wong et al. |

FOREIGN PATENT DOCUMENTS

| | | |
|---|---|---|
| AU | 2015264124 | 5/2019 |
| CA | 2931093 | 6/2015 |
| CN | 101515319 | 8/2009 |
| CN | 102096972 | 6/2011 |
| CN | 102103683 | 6/2011 |
| CN | 102460491 | 5/2012 |
| CN | 103530775 | 1/2014 |
| CN | 103797500 | 5/2014 |
| CN | 105830107 | 8/2016 |
| CN | 106465112 | 2/2017 |
| EA | 011495 | 4/2009 |
| EP | 1028401 | 8/2000 |
| EP | 1168265 | 1/2002 |
| EP | 2098985 | 9/2009 |
| EP | 2156397 | 2/2010 |
| EP | 2515472 | 10/2012 |
| EP | 3084701 | 10/2016 |
| EP | 3146747 | 3/2017 |
| GB | 2459850 | 11/2009 |
| IN | 201647023956 | 8/2016 |
| JP | 334641 | 2/1991 |
| JP | 2007513529 | 5/2007 |
| JP | 2008210370 | 9/2008 |
| JP | 2010004390 | 1/2010 |
| JP | 2017507518 | 3/2017 |
| JP | 6551850 | 7/2019 |
| KR | 20000054496 | 9/2000 |
| KR | 20050019674 | 3/2005 |
| KR | 20050115513 | 12/2005 |
| KR | 20060096821 | 9/2006 |
| KR | 20070100076 | 10/2007 |
| KR | 20080026802 | 3/2008 |
| KR | 20080039330 | 5/2008 |
| KR | 20080051198 | 6/2008 |
| KR | 20090021388 | 3/2009 |
| KR | 20090044619 | 5/2009 |
| KR | 20100110642 | 10/2010 |
| KR | 16101117 | 8/2016 |
| RU | 2252451 | 5/2005 |
| RU | 2331110 | 8/2008 |
| RU | 2016129192 | 1/2018 |
| RU | 2686014 | 4/2019 |
| RU | 2019111186 | 5/2019 |
| SG | 11201604906 | 7/2016 |
| SG | 11201604906 | 2/2019 |
| SG | 10201900964 | 3/2019 |
| WO | 0014648 | 3/2000 |
| WO | 0116900 | 3/2001 |
| WO | 0135304 | 5/2001 |
| WO | 0201520 | 1/2002 |
| WO | 0135304 | 5/2002 |
| WO | 02059727 | 8/2002 |
| WO | 03047208 | 6/2003 |
| WO | 2004042536 | 5/2004 |
| WO | 2004051585 | 6/2004 |
| WO | 2005001751 | 1/2005 |
| WO | 2005109360 | 11/2005 |
| WO | 2006099294 | 9/2006 |
| WO | 2006113834 | 10/2006 |
| WO | 2007131956 | 11/2007 |
| WO | 2008014554 | 2/2008 |
| WO | 2009025605 | 2/2009 |
| WO | 2009032523 | 3/2009 |
| WO | 2009052634 | 4/2009 |
| WO | 2009136404 | 11/2009 |
| WO | 2010078522 | 7/2010 |
| WO | 2012068078 | 5/2012 |
| WO | 2012098556 | 7/2012 |
| WO | 2012136986 | 10/2012 |
| WO | 2012136987 | 10/2012 |
| WO | 2012142370 | 10/2012 |
| WO | 2012167941 | 12/2012 |
| WO | 2013048538 | 4/2013 |
| WO | 2013049213 | 4/2013 |
| WO | 2013056104 | 4/2013 |
| WO | 2013096486 | 6/2013 |
| WO | 2013101035 | 7/2013 |
| WO | 2013116817 | 8/2013 |
| WO | 2013119914 | 8/2013 |
| WO | 2013130982 | 9/2013 |
| WO | 2013155627 | 10/2013 |
| WO | 2013179271 | 12/2013 |
| WO | 2014012037 | 1/2014 |
| WO | 2015095771 | 6/2015 |
| WO | 2015179637 | 11/2015 |
| ZA | 201603926 | 6/2018 |

OTHER PUBLICATIONS

B. Rexha, "Increasing user privacy in online transactions with X.509 v3 certificate private extensions and smartcards," Seventh IEEE International Conference on E-Commerce Technology (CEC'05), Munich, Germany, 2005, pp. 293-300, doi: 10.1109/ICECT.2005. 54. (Year: 2005).*

H. Wang, Jinli Cao, and Yanchun Zhang, "A flexible payment scheme and its role-based access control," in IEEE Transactions on Knowledge and Data Engineering, vol. 17 No. 3 pp. 425-436, 2005, doi: 10.1109/TKDE.2005.35. (Year: 2005).*

N. C. Kiran and G. N. Kumar, "Building robust m-commerce payment system on offline wireless network," 2011 Fifth IEEE International Conference on Advanced Telecommunication Systems and Networks (ANTS), Bangalore, India, 2011, pp. 1-3, doi: 10.1109/ANTS.2011.6163664. (Year: 2011).*

P. Urien, "EMV-TLS, a secure payment protocol for NFC enabled mobiles," 2014 International Conference on Collaboration Technologies and Systems (CTS), Minneapolis, MN, USA, 2014, pp. 203-210, doi: 10.1109/CTS.2014.6867565. (Year: 2014).*

Application No. EP22171039.5, Extended European Search Report, dated Jun. 10, 2022, 8 pages.

Google Scholar, 2020, 1 page.

Petition for Inter Partes Review of U.S. Pat. No. 8,533,860 Challenging Claims 1-30 Under 35 U.S.C. § 312 and 37 C.F.R. § 42.104, USPTO Patent Trial and Appeal Board, IPR 2016-00600, Feb. 17, 2016, 65 pages.

"2.4.2 How VISA Card Verification Values are Used", 2.4.2 "z/OSV1 R3.0 ICSF Application Programmer's Guide" IBM Library Server, Available online at: http://publibz.boulder.ibm.com/cgibin/bookmgr_OS390/BOOKS /CSFB4Z20/2.4.2?SHEL, 1997, 1 page.

"Contactless Mobile Payment", EMVCo., Contactless Mobile Payment Architecture Overview, Version 1.0, Jun. 2010, 28 pages.

"EMV Contactless Specifications for Payment Systems", Book a Architecture and General Requirements, XP055402194, Mar. 1, 2011, 124 pages.

"EMV Integrated Circuit Card Specifications for Payment Systems", Books 1-3, Application Specification, Version 4.3, Nov. 2011, 162 pages.

"EMV Integrated Circuit Card Specifications for Payment Systems", Book 2, Security and Key Management, Version 4.3, Nov. 2011, 174 pages.

"EMV Integrated Circuit Card Specifications for Payment Systems", Book 2, Security and Key Management, Version 4.2, XP-002732389, Jun. 2008, 177 pages.

(56) References Cited

OTHER PUBLICATIONS

"EMV Integrated Circuit Card Specifications for Payment Systems", Book 2 Security and Key Management, Version 4.1, May 2004, 187 pages.
"EMV Integrated Circuit Card Specifications for Payment Systems, Common Payment Application Specification", Version 1.0, Dec. 2005, 770 pages.
"What Makes a Smart Card Secure? A Smart Card Alliance Contactless and Mobile Payments Council White Paper", Publication No. CPMC-08002, Smart Card Alliance, Oct. 2008, 38 pages.
12718316.8 , "Notice of Opposition", Feb. 15, 2018, 32 pages.
U.S. Appl. No. 14/046,828 , Final Office Action, dated Apr. 28, 2017, 20 pages.
U.S. Appl. No. 14/046,828 , Final Office Action, dated Mar. 29, 2019, 21 pages.
U.S. Appl. No. 14/046,828 , Non-Final Office Action, dated Sep. 13, 2016, 18 pages.
U.S. Appl. No. 14/046,828 , Non-Final Office Action, dated Jul. 5, 2018, 21 pages.
U.S. Appl. No. 14/577,678 , Final Office Action, dated Jun. 28, 2019, 11 pages.
U.S. Appl. No. 14/577,678 , Non-Final Office Action, dated Jun. 25, 2020, 10 pages.
U.S. Appl. No. 14/577,678 , Non-Final Office Action, dated Dec. 20, 2018, 15 pages.
U.S. Appl. No. 14/577,837 , "Corrected Notice of Allowability", dated Apr. 19, 2018, 2 pages.
U.S. Appl. No. 14/577,837 , "Corrected Notice of Allowability", dated Jan. 24, 2018, 2 pages.
U.S. Appl. No. 14/577,837 , "Corrected Notice of Allowability", dated Mar. 5, 2018, 3 pages.
U.S. Appl. No. 14/577,837 , Final Office Action, dated Jun. 5, 2017, 20 pages.
U.S. Appl. No. 14/577,837 , Final Office Action, dated Jul. 18, 2016, 25 pages.
U.S. Appl. No. 14/577,837 , Non-Final Office Action, dated Dec. 15, 2016, 18 pages.
U.S. Appl. No. 14/577,837 , Non-Final Office Action, dated Dec. 31, 2015, 23 pages.
U.S. Appl. No. 14/577,837 , Notice of Allowance, dated Jan. 10, 2018, 19 pages.
U.S. Appl. No. 14/600,523 , Secure Payment Processing Using Authorization Request, filed Jan. 20, 2015, 42 pages.
U.S. Appl. No. 14/719,014 , "Corrected Notice of Allowability", dated Sep. 2, 2020, 3 pages.
U.S. Appl. No. 14/719,014 , Final Office Action, dated Dec. 9, 2016, 31 pages.
U.S. Appl. No. 14/719,014 , Final Office Action, dated Oct. 2, 2018, 38 pages.
U.S. Appl. No. 14/719,014 , Non-Final Office Action, dated Aug. 19, 2016, 21 pages.
U.S. Appl. No. 14/719,014 , Non-Final Office Action, dated Mar. 30, 2018, 39 pages.
U.S. Appl. No. 14/719,014 , Notice of Allowance, dated Jul. 13, 2020, 9 pages.
U.S. Appl. No. 14/719,014 , "Restriction Requirement", dated May 26, 2016, 6 pages.
U.S. Appl. No. 14/834,028 , "Corrected Notice of Allowability", dated Aug. 23, 2017, 2 pages.
U.S. Appl. No. 14/834,028 , Non-Final Office Action, dated Jan. 19, 2017, 8 pages.
U.S. Appl. No. 14/834,028 , "Notice of Allowability", dated Jul. 17, 2017, 2 pages.
U.S. Appl. No. 14/834,028 , Notice of Allowance, dated May 24, 2017, 9 pages.
U.S. Appl. No. 15/004,705 , Final Office Action, dated Nov. 3, 2016, 28 pages.
U.S. Appl. No. 15/004,705 , Non-Final Office Action, dated Apr. 6, 2017, 26 pages.
U.S. Appl. No. 15/004,705 , Non-Final Office Action, dated May 24, 2016, 28 pages.
U.S. Appl. No. 15/004,705 , Notice of Allowance, dated Nov. 8, 2017, 18 pages.
U.S. Appl. No. 15/008,388 , Methods for Secure Credential Provisioning, filed Jan. 27, 2016, 90 pages.
U.S. Appl. No. 15/011,366 , Token Check Offline, filed Jan. 29, 2016, 60 pages.
U.S. Appl. No. 15/019,157 , Token Processing Utilizing Multiple Authorizations, filed Feb. 9, 2016, 62 pages.
U.S. Appl. No. 15/041,495 , Peer Forward Authorization of Digital Requests, filed Feb. 11, 2016, 63 pages.
U.S. Appl. No. 15/091,253 , "Corrected Notice of Allowability", dated Apr. 25, 2019, 3 pages.
U.S. Appl. No. 15/091,253 , "Corrected Notice of Allowability", dated Aug. 7, 2019, 3 pages.
U.S. Appl. No. 15/091,253 , Final Office Action, dated Jul. 3, 2017, 21 pages.
U.S. Appl. No. 15/091,253 , Final Office Action, dated Jul. 13, 2018, 24 pages.
U.S. Appl. No. 15/091,253 , Non-Final Office Action, dated Dec. 13, 2017, 22 pages.
U.S. Appl. No. 15/091,253 , Non-Final Office Action, dated Dec. 19, 2016, 26 pages.
U.S. Appl. No. 15/091,253 , Notice of Allowance, dated Mar. 11, 2019, 21 pages.
U.S. Appl. No. 15/091,253 , "Supplemental Notice of Allowability", dated Jun. 12, 2019, 2 pages.
U.S. Appl. No. 15/265,282 , Self-Cleaning Token Valut, filed Sep. 14, 2016, 52 pages.
U.S. Appl. No. 15/462,658 , Replacing Token on a Multi-Token User Device, filed Mar. 17, 2017, 58 pages.
U.S. Appl. No. 15/585,077 , System and Method Using Interaction Token, filed May 2, 2017, 36 pages.
U.S. Appl. No. 15/682,348 , "Notice of Allowability", dated Apr. 13, 2018, 2 pages.
U.S. Appl. No. 15/682,348 , Notice of Allowance, dated Apr. 2, 2018, 12 pages.
U.S. Appl. No. 15/890,871 , Final Office Action, dated Apr. 28, 2020, 28 pages.
U.S. Appl. No. 15/890,871 , Non-Final Office Action, dated Sep. 4, 2020, 22 pages.
U.S. Appl. No. 15/890,871 , Non-Final Office Action, dated Dec. 4, 2019, 26 pages.
U.S. Appl. No. 15/949,790 , Notice of Allowance, dated Jan. 14, 2020, 18 pages.
U.S. Appl. No. 16/020,796 , "Corrected Notice of Allowability", dated Jul. 19, 2019, 2 pages.
U.S. Appl. No. 16/020,796 , Notice of Allowance, dated Jun. 21, 2019, 12 pages.
U.S. Appl. No. 16/438,178 , Non-Final Office Action, dated Jun. 15, 2020, 19 pages.
U.S. Appl. No. 16/438,178 , Notice of Allowance, dated Oct. 2, 2020, 15 pages.
U.S. Appl. No. 61/738,832 , Management of Sensitive Data, filed Dec. 18, 2012, 22 pages.
U.S. Appl. No. 61/751,763 , Payments Bridge, filed Jan. 11, 2013, 64 pages.
U.S. Appl. No. 61/879,632 , Systems and Methods for Managing Mobile Cardholder Verification Methods, filed Sep. 18, 2013, 24 pages.
U.S. Appl. No. 61/892,407 , Issuer Over-the-Air Update Method and System, filed Oct. 17, 2013, 28 pages.
U.S. Appl. No. 61/894,749 , Methods and Systems for Authentication and Issuance of Tokens in a Secure Environment, filed Oct. 23, 2013, 67 pages.
U.S. Appl. No. 61/926,236 , Methods and Systems for Provisioning Mobile Devices With Payment Credentials and Payment Token Identifiers, filed Jan. 10, 2014, 51 pages.
U.S. Appl. No. 62/000,288 , Payment System Canonical Address Format, filed May 19, 2014, 58 pages.
U.S. Appl. No. 62/003,717 , Mobile Merchant Application, filed May 28, 2014, 58 pages.

(56) References Cited

OTHER PUBLICATIONS

U.S. Appl. No. 62/024,426, Secure Transactions Using Mobile Devices, filed Jul. 14, 2014, 102 pages.
U.S. Appl. No. 62/037,033, Sharing Payment Token, filed Aug. 13, 2014, 36 pages.
U.S. Appl. No. 62/038,174, Customized Payment Gateway, filed Aug. 15, 2014, 42 pages.
U.S. Appl. No. 62/042,050, Payment Device Authentication and Authorization System, filed Aug. 26, 2014, 120 pages.
U.S. Appl. No. 62/053,736, Completing Transactions Without a User Payment Device, filed Sep. 22, 2014, 31 pages.
U.S. Appl. No. 62/054,346, Mirrored Token Vault, filed Sep. 23, 2014, 38 pages.
U.S. Appl. No. 62/103,522, Methods and Systems for Wallet Provider Provisioning, filed Jan. 14, 2015, 39 pages.
U.S. Appl. No. 62/108,403, Wearables with NFC HCE, filed Jan. 27, 2015, 32 pages.
U.S. Appl. No. 62/117,291, Token and Cryptogram Using Transaction Specific Information, filed Feb. 17, 2015, 25 pages.
U.S. Appl. No. 62/128,709, Tokenizing Transaction Amounts, filed Mar. 5, 2015, 30 pages.
AU2014368949, "First Examination Report", dated Oct. 11, 2019, 3 pages.
AU2015264124, "First Examination Report", dated Nov. 7, 2018, 4 pages.
AU2015264124, "Notice of Acceptance", dated Apr. 29, 2019, 3 pages.
Application No. CN201480069311.1, Office Action, dated Dec. 11, 2019, 15 pages.
Application No. CN201480069311.1, Office Action, dated Jul. 30, 2019, 15 pages.
Application No. CN201480069311.1, Office Action, dated Jan. 7, 2019, 18 pages.
Application No. CN201580025927.3, Office Action, dated Jun. 24, 2019, 25 pages.
Doherty et al., "Dynamic Symmetric Key Provisioning Protocol (DSKPP)", CiteSeerX, Internet Engineering Task Force (IETF), ISSN: 2070-1721, Dec. 2010, 106 pages.
Elliott et al., "The Use of Near Field Communication (NFC) Technology in Mobile Phones for Public Transport Ticketing", Department of Transport, Research database, Version 1.2a, Nov. 11, 2009, 52 pages.
EP12718316.8, "Notice of Opposition", Feb. 9, 2018, 19 pages.
EP12718316.8, "Notice of Opposition", Jan. 31, 2019, 24 pages.
EP12718316.8, "Notice of Opposition", Sep. 26, 2018, 8 pages.
EP12718316.8, "Reply to Notice of Opposition", Jul. 3, 2018, 13 pages.
Application No. EP14872737.3, Extended European Search Report, dated Jul. 11, 2017, 8 pages.
Application No. EP14872737.3, Office Action, dated May 21, 2019, 6 pages.
Application No. EP15796553.4, Extended European Search Report, dated Sep. 29, 2017, 11 pages.
Application No. EP15796553.4, Notice of Decision to Grant, dated Jun. 5, 2020, 2 pages.
Application No. EP17828213.3, Extended European Search Report, dated Mar. 6, 2019, 7 pages.
IN201647023956, "First Examination Report", dated Aug. 20, 2020, 7 pages.
Application No. JP2016-541553, Notice of Decision to Grant, dated May 22, 2019, 3 pages.
Application No. JP2016-541553, Office Action, dated Sep. 28, 2018, 6 pages.
Kasper et al., "Subscriber Authentication in Mobile Cellular Networks with Virtual software SIM Credentials Using Trusted Computing", Conference: Advanced Communication Technology, 10th International Conference on, vol. 2, Mar. 2008, 7 pages.
Application No. KR2016-7019520, Office Action, dated May 18, 2020, 12 pages.
Application No. PCT/GB2012/050737, International Preliminary Report on Patentability, dated May 31, 2013, 7 pages.
Application No. PCT/GB2012/050737, International Search Report and Written Opinion, dated Jul. 20, 2012, 13 pages.
Application No. PCT/US2014/071622, International Preliminary Report on Patentability, dated Jun. 30, 2016, 8 pages.
Application No. PCT/US2014/071622, International Search Report and Written Opinion, dated Mar. 27, 2015, 9 pages.
Application No. PCT/US2015/031968, International Preliminary Report on Patentability, dated Dec. 1, 2016, 6 pages.
Application no. PCT/US2015/031968, International Search Report and Written Opinion, dated Jul. 27, 2015, 7 pages.
Radu, "Implementing Electronic Card Payment Systems", Artech House, Inc Applendix D Security Mechanisms, 2003, 1 page.
Radu, "Implementing Electronic Card Payment Systems", Artech House, Chapter-5, ProQuest Ebook Central, Available online at: http://ebookcentral.proquest.com/lib/uspto-ebooks/detail.action?dociD=227605, 2002, pp. 125-145.
Radu, "Implementing Electronic Card Payment Systems", ProQuest Ebook Central, Chapter-6, Available online at: http://ebookcentral.proquest.com/lib/uspto-ebooks/detail.action?dociD=227605, 2002, pp. 147-225.
Radu, "Implementing Electronic Card Payment Systems", ProQuest Ebook Central, Available online at: http://ebookcentral.proquest.com/lib/uspto-ebooks/detail.action?dociD=227605,Appendix D, 2002, pp. 373-398.
Reisinger, "PayPal Offers SMS Security Key for Mobile Users", Available online at: http://news.cnet/com/8301-17939_1209-10106410-2.html, Nov. 24, 2008, pp. 1-3.
Application No. RU2016129192, Notice of Decision to Grant, dated Feb. 20, 2019, 18 pages.
Application No. RU2016129192, Office Action, dated Aug. 22, 2018, 11 pages.
Ruiter et al., "Formal Analysis of the EMV Protocol Suite", Theory of Security and Applications, Mar. 31, 2011, pp. 113-129.
Application No. SG11201604906Q, Notice of Decision to Grant, dated Dec. 6, 2018, 4 pages.
Application No. SG11201604906Q, Search Report and Written Opinion, dated Jun. 27, 2017, 11 pages.
Application No. SG11201604906Q, Written Opinion, dated Feb. 7, 2018, 5 pages.
Shoup et al., "Session Key Distribution Using Smart Cards", International Conference on the Theory and Applications of Cryptographic Techniques, Eurocrypt 1996: Advances in Cryptology, May 1996, 11 pages.
Application No. ZA2016/03926, Notice of Allowance, dated May 22, 2018, 1 page.
U.S. Appl. No. 14/577,678, Advisory Action, dated Dec. 21, 2020, 4 pages.
U.S. Appl. No. 16/438,178, "Supplemental Notice of Allowability", dated Dec. 2, 2020, 2 pages.
KR Application No. 10-2016-7019520, Notice of Decision to Grant, dated Nov. 23, 2020, 4 pages.
U.S. Appl. No. 17/358,837, Non-Final Office Action, dated Nov. 4, 2022, 10 pages.
U.S. Appl. No. 14/046,828, "Supplemental Notice of Allowability", dated May 14, 2021, 3 pages.
U.S. Appl. No. 14/577,678, Notice of Allowance, dated Jul. 21, 2021, 9 pages.
Application No. KR10-2021-7005408, Notice of Decision to Grant, dated Jun. 4, 2021, 5 pages.
Application No. EP14872737.3, Notice of Decision to Grant, dated Apr. 7, 2022, 3 pages.
Application No. KR2021-7026400, Notice of Decision to Grant, dated Mar. 14, 2022, 8 pages.
Application No. KR2021-7026400, Office Action, dated Sep. 8, 2021, 6 pages.
U.S. Appl. No. 14/046,828, Non-Final Office Action, dated Oct. 16, 2020, 13 pages.
U.S. Appl. No. 14/577,678, Final Office Action, dated Oct. 2, 2020, 10 pages.
U.S. Appl. No. 16/438,178, Corrected Notice of Allowance, dated Oct. 6, 2020, 4 pages.

(56) References Cited

OTHER PUBLICATIONS

U.S. Appl. No. 14/046,828 , Notice of Allowance, dated Mar. 25, 2021, 10 pages.
U.S. Appl. No. 15/890,871 , "Supplemental Notice of Allowability", dated Mar. 4, 2021, 2 pages.
U.S. Appl. No. 16/653,521 , Notice of Allowance, dated Feb. 25, 2021, 11 pages.
EP14872737.3 , "Summons to Attend Oral Proceedings", dated Mar. 22, 2021, 11 pages.
Application No. CN201480069311.1 , Office Action, dated Jan. 7, 2022, 16 pages.
U.S. Appl. No. 15/890,871 , Notice of Allowance, dated Jan. 6, 2021, 13 pages.
U.S. Appl. No. 14/046,828 , "Supplemental Notice of Allowability", dated Apr. 13, 2021, 3 pages
U.S. Appl. No. 15/890,871 , "Supplemental Notice of Allowability", dated Apr. 28, 2021, 2 pages
Application No. KR10-2022-7019314 , Office Action, dated Sep. 13, 2022, 5 pages.
U.S. Appl. No. 17/318,918 , Non-Final Office Action, dated Feb. 3, 2023, 11 pages.
Application No. KR10-2022-7019314 , Notice of Decision to Grant, dated Jan. 26, 2023, 4 pages.
U.S. Appl. No. 17/358,837, Notice of Allowance, dated Feb. 22, 2023, 8 pages.
U.S. Appl. No. 17/318,918, Notice of Allowance, dated May 23, 2023, 7 pages.
U.S. Appl. No. 17/489,227, Non-Final Office Action, dated Jun. 8, 2023, 17 pages.
U.S. Appl. No. 17/222,563, Notice of Allowance, dated Sep. 6, 2023, 16 pages.
U.S. Appl. No. 17/318,918 , "Corrected Notice of Allowability", dated Sep. 8, 2023, 2 pages.

\* cited by examiner

OFFLINE AUTHENTICATION

CROSS-REFERENCES TO RELATED APPLICATIONS

This application is a divisional application of U.S. application Ser. No. 14/719,014, filed May 21, 2015, titled "OFFLINE AUTHENTICATION", which claims the benefit of priority to U.S. Provisional Application No. 62/001,255, filed on May 21, 2014, which is hereby incorporated by reference in its entirety for all purposes.

BACKGROUND

Advances in the capabilities of portable communication devices have allowed portable communication devices such as smart phones to be used as payment instruments to conduct contactless transactions. For example, a portable communication device can be placed in proximity to an access device such as a point-of-sale (POS) terminal to transfer account information from the portable communication device to the access device to conduct a transaction. To provide a secure operating environment to securely store account information on a portable communication device, a secure element such as subscriber identity module (SIM) card, specialized integrated chip embedded into the portable communication device, or specialized component provided as aftermarket solution is used. At the time of a transaction, the secure element communicates directly with a contactless interface (e.g., a near-field communication (NFC) transceiver) of the portable communication device to pass payment data to a contactless reader of the access device. A secure element is considered secure because account information is stored in tamper-resistant hardware, which protects the account information from malware or viruses that may have infected the operating system or an application running on the portable communication device.

However, a secure element used in a portable communication device is typically not under the control of a financial institution, but is instead under the control of a mobile network operator (MNO). As a result, an issuer and/or payment processor may not have direct access to a secure element to provision it with account credentials and payment functionalities. In order to gain access to a secure element, an issuer and/or payment processor may have to establish commercial agreements and technical connectivity with the party controlling the secure element to perform over-the-air (OTA) personalization of the secure element. This is both a cumbersome and complex process. Furthermore, incorporating a secure element adds to the manufacturing cost of the portable communication device, and increases the cost of the finished portable communication device.

Thus, in some cases, it would be desirable to use a portable communication device that does not have a secure element to conduct transactions. Or, if the portable communication device does have a secure element, it may be desirable not to rely on the use of the secure element. However, because a secure element is not used, transaction security will be a concern.

To further complicate the security issue, in some scenarios, obtaining authorization of a transaction from an issuer at the time of a transaction may be impractical. For example, in a transit environment, a transit gate terminal may lack constant network connectivity, and thus the transit gate terminal may not be able to obtain authorization of a transaction from an issuer at the time of the transaction. And even if the transit gate terminal has network connectivity, the transit agency may have a requirement to process a certain number of patrons per minute through a transit gate, and the amount of time it takes to route the transaction to an issuer and obtain an authorization response may exceed the maximum amount of time allowed by the transit agency. In such scenarios, credentials used to quickly provide patrons with access in such an environment may require additional safeguards if they are not stored in a secure element.

Embodiments of the present invention address these and other problems individually and collectively. Specifically, embodiments of the invention address the problem of security concerns with conducting transactions with a communication device that does not have or does not rely on a secure element.

BRIEF SUMMARY

Embodiments of the present invention provide techniques for enhancing the security of a communication device (e.g., a portable communication device) when conducting a transaction using the communication device. The techniques described herein can be used with a communication device that may or may not have a secure element, because the techniques do not require the use of a secure element to safeguard account credentials. Embodiments of the invention instead utilize limited-use account parameters that may have a limited lifespan, and once expired, may no longer be used to conduct a transaction until the limited-use account parameters are replenished from the cloud (e.g., a remote computer). Hence, transactions conducted using the techniques described herein may be referred to as "cloud-based transactions."

According to some embodiments, a process for enhancing the security of a communication device when conducting a transaction using the communication device may include receiving, from a remote computer, a signature key, and a limited-use key (LUK) that is associated with a first set of one or more limited-use thresholds that limits usage of the LUK. The signature key may also be associated with a second set of one or more limited-use thresholds. The process may further include generating, by the communication device, a transaction cryptogram using the LUK, and a signature using the signature key, and sending, to an access device, the transaction cryptogram and the signature to request access to a good or a service associated with the transaction. For an offline data authentication transaction, access to the good or service associated with the transaction can be granted based on authentication of the signature prior to verifying the transaction cryptogram.

According to some embodiments, a communication device may include a contactless interface transceiver to communicate with an access device, a processor; and a memory coupled to the processor and storing a mobile application that performs operations for enhancing security of the communication device when conducting transactions using the communication device. The operations may include receiving, from a remote computer, a signature key, and a limited-use key (LUK) that is associated with a first set of one or more limited-use thresholds that limits usage of the LUK. The signature key may also be associated with a second set of one or more limited-use thresholds. The operations may further include generating, by the communication device, a transaction cryptogram using the LUK, and a signature using the signature key, and sending, to an access device, the transaction cryptogram and the signature to request access to a good or a service associated with the transaction. For an offline data authentication transaction, access to the good or service associated with the transaction can be granted based on authentication of the signature prior to verifying the transaction cryptogram.

According to some embodiments, an access device may include a contactless interface transceiver to communicate with a communication device, a processor; and a memory coupled to the processor and storing code executable by the process to perform operations for offline data authentication. The operations may include sending, to a communication device, terminal transaction data for a transaction, and receiving, from the communication device, a transaction cryptogram generated with a limited-use-key (LUK) that is associated with a first set of one or more limited-use thresholds that limits usage of the LUK. The operations may further include receiving, from the communication device, a signature generated with a signature key that is associated with a second set of one or more limited-use thresholds that limits usage of the signature key, authenticating the signature base on a communication device public key associated with the communication device, and in response to authenticating the signature, granting access to a good or a service associate with the transaction prior to verifying the transaction cryptogram.

DETAILED DESCRIPTION

Figure 1:
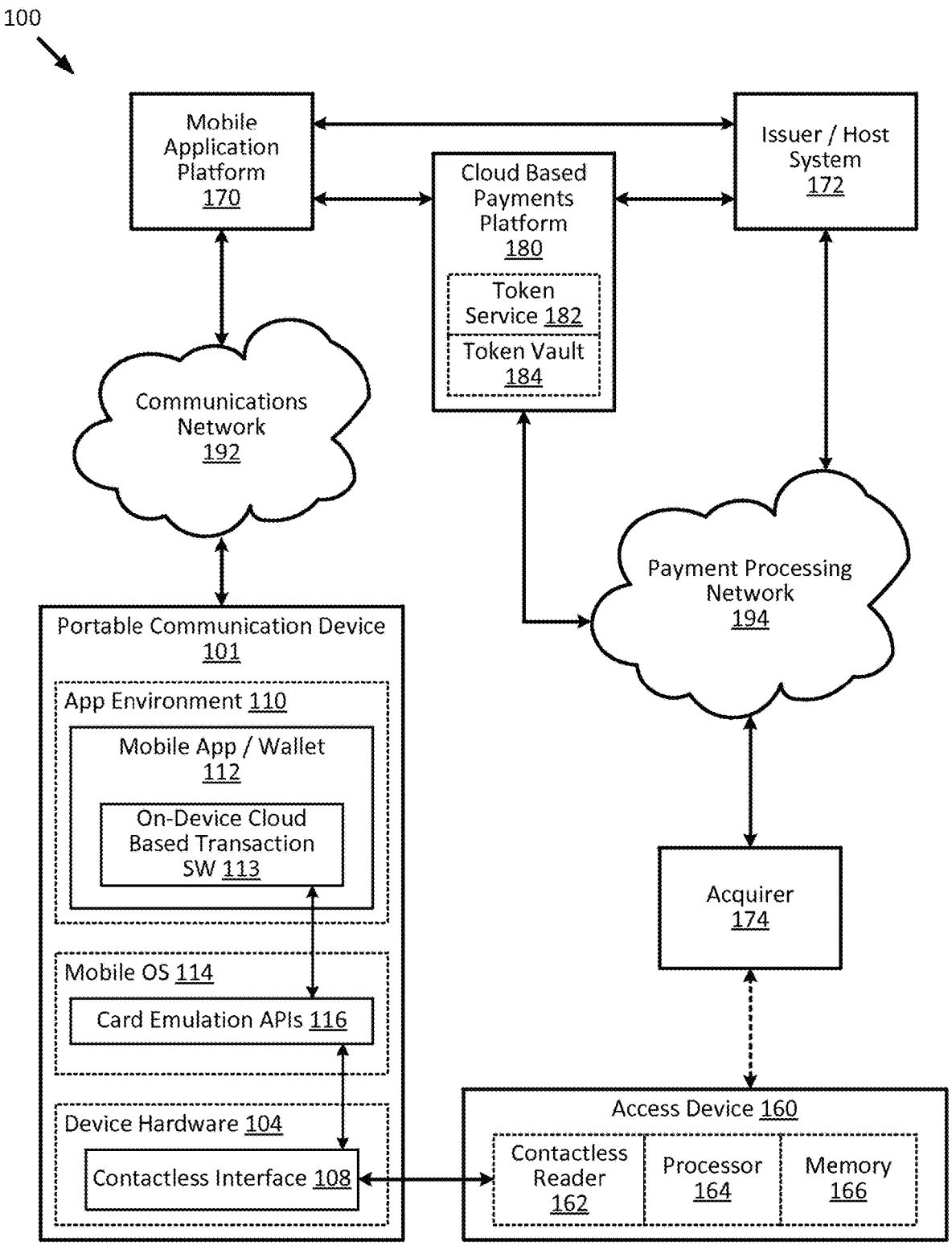
FIG. 1 illustrates a block diagram of an example of a cloud-based transaction system, according to some embodiments.

Embodiments of the present invention provide for methods, devices, and systems for cloud-based transactions that can be performed by a communication devices with or without a secure element. The techniques described herein can utilize card emulation technology (e.g., Host Card Emulation (HCE), etc.) to emulate a smartcard on a communication device (e.g., a portable communication device) to allow a mobile application running on the portable communication device to conduct contactless transactions. In the card emulation environment, a mobile application can access the contactless interface (e.g., a near-field communication (NFC) transceiver) of the portable communication device via the operating system (OS) of the portable communication device without involving a secure element. As compared to secure element implementations, the card emulation approach reduces the technical and commercial complexities for issuers and/or payment processors, because issuers and/or payment processors can provision account credentials and payment functionalities to a mobile application on a portable communication device without having to obtain access to a secure element through a mobile network operator.

By removing the control of payment functionalities and account credentials from the confines of a secure element, the tamper-resistant hardware based security provided by a secure element can no longer be relied on to safeguard account information. Without the requirement that a secure element be present, account credentials may be stored in a memory of the portable communication device that is not part of a secure element, such as the general memory of the portable communication device. As such, the account credentials may be susceptible to access by malware or viruses that may have infected an application or operating system of the portable communication device.

To enhance the security of a portable communication device when conducting transactions without utilizing a secure element, instead of using stagnant account credentials stored on a portable communication device which may be valid for the lifetime of an account, the cloud-based techniques described herein provision a portable communication device with limited-use account parameters that have a limited usage or lifespan. When the limited usage or lifespan of the limited-use account parameters is exhausted, the same set of limited-use account parameters may no longer be used to conduct further transactions. In order to conduct further transactions using the portable communication device, new limited-use account parameters are replenished to the portable communication device. The limited-use account parameters provided to the portable communication device can be renewed or replenished from the network (also be referred to as the "cloud") repeatedly during the lifetime of an account. By managing the delivery and lifecycle of the limited-use account parameters between a set of network based capabilities and the portable communication device, the compromise of mobile application software and/or account credentials stored on a portable communication device becomes only a limited security risk, because stolen limited-use account parameters can at most be used for only a small number of transactions or limited monetary amount.

Prior to discussing the details of some embodiments of the present invention, description of some terms may be helpful in understanding the various embodiments.

A "communication device" may be a device that includes one or more electronic components (e.g., an integrated chip) that can communicate with another device. A "portable communication device" be a communication device that can be transported and operated by a user. A portable communication device may provide remote communication capabilities to a network. The portable communication device can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable computing device (e.g., watch), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile such as car) equipped with communication capabilities.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

An "access device" may be any suitable device for communicating with a merchant computer or payment processing network, and for interacting with a communication device such as a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. In some scenarios, the merchant associated the access device may be a transit agency or a transit operator, and the access device may be a transit gate or transit terminal. An access device may use any suitable contact or contactless mode of operation to send or receive data from, or associated with, a portable communication device. In some embodiments, where an access device may include a reader, a processor, and a computer-readable medium. A reader may include any suitable contact or contactless mode of operation. For a contactless mode of operation, a reader may include a contactless interface transceiver (e.g., a NFC transceiver) to interact with a portable communication device. Other example components of exemplary readers may include radio frequency (RF) antennas, optical scanners, bar code readers, or magnetic stripe readers to interact with a portable communication device.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some embodiments, a payment processing network may generate or forward the authorization response message to the merchant.

A "token" may include a substitute identifier for some information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "real account identifier" may include an original account identifier associated with a payment account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

"Account parameters" may refer to information relating to an account that can be used to conduct a transaction on the account. Examples of account parameters may include information that can be used to identify an account of the user (e.g., real account identifier, alternate account identifier, token, etc.), data or information relating to the status of the account, one or more keys that are used to generate cryptographic information, data or information relating to the one or more keys, etc. An account parameter can be semi-static or dynamic. A dynamic account parameter may be an account parameter that has a limited lifespan, and which once expired, can no longer be used to conduct a transaction until the account parameter is replenished, refreshed, or renewed. A dynamic account parameter may be replenished frequently during the lifetime of an account. A semi-static account parameter may be an account parameter that has an extended lifespan that is longer than a dynamic account parameter, and can be replenished less frequently than a dynamic account parameter or not at all during the lifetime of the account.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "certificate" may refer to an attestation of the authenticity of some information. For example, a key certificate can be an electronic document used to prove the authenticity and/or ownership of a key. A certificate can be issued by a certificate authority, which is a trusted entity that verifies the certificate's contents.

A "signature" may refer to electronic information that can be used to demonstrate the authenticity of an item (e.g., a message, document, application, etc.). For example, a signature can be a digital signature that employs asymmetric cryptography (e.g., public key infrastructure PKI) in which a piece of information is encrypted using a private key, and successful decryption of the information using a public key can be used to verify the authenticity of the source of that information.

A "cryptogram" may refer to an encrypted representation of some information. A cryptogram can be used by a recipient to determine if the generator of the cryptogram is in possession of a proper key, for example, by encrypting the underlying information with a valid key, and comparing the result to the received cryptogram.

A "limited-use threshold" may refer to a condition that limits the usage of a piece of information. A limited-use threshold may be exceeded or exhausted when the underlying condition is met. For example, a limited-use threshold may include a time-to-live that indicates an amount of time for which a piece of information is valid, and once that amount of time has elapsed, the limited-use threshold is exceeded or exhausted, and the piece of information may become invalid and may no longer be used. As another example, a limited-use threshold may include a number of times that a piece of information can be used, and once the piece of information has been used for that number of times, the limited-use threshold is exceeded or exhausted, and the piece of information may become invalid and may no longer be used.

Details of some embodiments of the present invention will now be described.

I. Account Parameters

The cloud-based transactions system according to some embodiments provides a set of functionalities to manage the deployment and usage of account parameters for transactions conducted using a portable communication device. Account parameters (may also be referred to as "account credentials") are information relating to an account (e.g., a financial account, bank account, payment account, etc.) associated with a user that can be used to conduct transactions on the user's account. The account parameters can be provided or provisioned to a portable communication device to enable the portable communication device to conduct transactions on the user's account (e.g., by placing the portable communication device in proximity to a contactless reader of an access device such as a point-of-sale (POS) terminal).

Account parameters may include a semi-static set of data and a dynamic set of data, and some or all of the account parameters may be limited-use account parameters. The semi-static set of data may include an identifier that can be used to identify an account associated with the user (e.g., an account identifier such as a primary account number (PAN), an alternate account identifier such as an alternate PAN, or a token that is a substitute for an account identifier, etc.), an expiry date, and/or other account details or data that does not necessarily change for an extended period of time, or in some embodiments, for the lifetime of the account. The dynamic set of data may include one or more keys, information associated with the one or more keys, and/or other dynamic data that has a limited lifespan, and are repeatedly refreshed or replenished during the lifetime of an account. The dynamic set of data can be used for or relates to on-device generation of dynamic transaction cryptograms, or represent dynamic transaction data during payment transactions.

The dynamic set of data may be limited-use in the sense that the dynamic set of data can be used for only a limited time or a limited number of transactions, and may need to be renewed, refreshed, updated, or replenished when the dynamic set of data has exhausted its limited usage. For example, the dynamic set of data may include a limited-use key (LUK) that is used as an encryption key to generate a transaction cryptogram during a transaction. The LUK may be associated with a set of one or more limited-use thresholds that limits the usage of the LUK, where once the usage of the LUK has exhausted or exceeded the set of one or more limited-use thresholds, a further transaction conducted using that LUK will be declined even if the underlying account is still in good standing. The set of one or more limited-use thresholds to enforce can be determined, for example, by an issuer of the account or by a cloud-based payments platform that provides the cloud-based transaction service.

The set of one or more limited-use thresholds may include at least one of a time-to-live indicating the duration of time for which the LUK is valid, a predetermined number of transactions for which the LUK is valid, and/or a cumulative transaction amount indicating the total transaction amount summed across one or more transactions for which the LUK is valid, or any combination thereof. For example, a LUK may be valid for a time-to-live of five days, and a transaction conducted using that LUK after five days have elapsed since the LUK was generated may be declined. As another example, a LUK may be valid for a predetermined number of five transactions, and a sixth transaction (and any subsequent transaction) conducted using that LUK may be declined. As a further example, a LUK may be valid for a cumulative transaction amount of five hundred dollars, and a transaction conducted using the LUK after that LUK has already been used for transactions totaling more than five hundred dollars may be declined.

It should be understood that the limited usage values described above are just examples, and that other usage limits can be used. For example, the number of transactions usage limit can be set to a number in the range of 2 to 10 transactions, or a number in the range of 5 to 50 transactions, etc., and the cumulative transaction amount can be set to a value in the range of $100 to $5,000, or a value in the range of $10 to $1000, etc.

It should also be noted that in some embodiments, the number of transactions limited-use threshold can be set to one transaction such each LUK is valid for only one transaction. However, in some embodiments, the network bandwidth available to a portable communication device may be limited, or the portable communication device may not always have uninterrupted network connectivity. As such, the number of transactions limited-use threshold can be set to more than one transaction (e.g., five transactions) in some embodiments, for example, to reduce the frequency and amount of LUK replenishments over time, and hence reduce the amount of network traffic used by the portable communication device over time.

In some embodiments, the set of one or more limited-use thresholds may also include an international usage threshold and a domestic usage threshold indicating separate limits for international transactions versus domestic transactions. For example, the number of transactions that a LUK may be valid for can be higher for domestic transactions than for international transactions, if international transactions are deemed to be more risky. The set of one or more limited-use thresholds may also include a low value transaction threshold and a high value transaction threshold indicating separate limits for low value transactions versus high value transactions. For example, the number of transactions that a LUK may be valid for can be higher for low value transactions (e.g., LUK valid for ten transactions under $20) than for high value transactions (e.g., LUK valid for five transactions over $20) such that low value transactions will trigger replenishment of the LUK less frequently than high value transactions.

In some embodiments, the set of one or more limited-use thresholds associated with an account may change when the LUK is replenished such that a new LUK replacing a previous LUK may have one or more different usage limits than the previous LUK. This may occur, for example, based on changes in the consumer spending habits, the location of the portable communication device, or the time of the year, etc. For example, a new LUK may have a higher usage limit if the user has a recent pattern of conducting many high value transactions, or when it is during the holiday season when transaction activity is expected to increase. As another example, a new LUK may have a lower usage limit if the location of the portable communication device indicates that the user may have traveled to a high risk country where fraud is prevalent.

In embodiments in which a LUK is associated with more than one limited-use thresholds, the usage of the LUK can be exhausted when any one of the limited-use thresholds is exceeded, or when some combination of the limited-use thresholds is exceeded. Hence, replenishment of the LUK may be triggered when any one of the limited-use thresholds is exceeded or is about to be exceeded, or when some combination of the limited-use thresholds is exceeded or is about to be exceeded.

In some embodiments, a limited-use threshold associated with a LUK of an account may have different usage limits configured in different components or entities of the cloud-based transaction system. In other words, different components or entities may have different usage limits for a particular limited-use threshold to trigger replenishment of the LUK. The components or entities that may be configured with different usage limits may include, for example, the portable communication device of the user, the cloud-based service provider, and/or the issuer/host system. According to some embodiments, the usage limit at the portable communication device can be set lower than the usage limit at cloud-based service provider, and the usage limit at the cloud-based service provider can be set lower than the usage limit at the issuer. For example, a LUK may have a time-to-live limited-use threshold, and the on-device usage limit to trigger replenishment of the LUK at the portable communication device can be set at 2 days, the service provider usage limit at the cloud-based service provider can be set at 4 days, and the issuer usage limit at the issuer can be set at 5 days. In this example, the portable communication device would normally initiate replenishment of the LUK after 2 days. However, if the portable communication device is turned off or has lost network connectivity, the cloud-based service provider can initiate replenishment of the LUK after 4 days, or the issuer can initiate the replenishment after 5 days, if the LUK has not been renewed prior to that to ensure the LUK does not remain stale.

In some embodiments, the different components or entities of the cloud-based transaction system may be configured with different limited-use thresholds that may trigger LUK replenishment. For example, the on-device set of one or more limited-use thresholds configured on the portable communication device may include a time-to-live and a number of transactions that will trigger LUK replenishment initiated by the portable communication device, while the cloud-based service provider and/or the issuer/host system may additionally or alternatively be configured with a cumulative transaction amount to trigger LUK replenishment initiated by the cloud-based service provider and/or the issuer/host system. In other words, different components or entities may monitor different types of conditions or limited-use thresholds to trigger replenishment of the LUK.

In some embodiments, the set of one or more limited-use thresholds may be account specific (e.g., where different accounts may have different usage limits), portable communication device specific (e.g., where different portable communication devices of the user may have different usage limits even if the underlying account is the same), and/or mobile application specific (e.g., where different mobile applications may have different usage limits even if the mobile applications are installed on the same portable communication device and/or if the underlying account is the same). In some embodiments, the LUK may also have other use restrictions such as which type of merchant, which particular merchant, or which geographical location where the LUK can be used. The particular rules or risk parameters for triggering the LUK replenishment and/or for setting the limited-use thresholds can be determined by the issuer or cloud-based transactions provider.

The dynamic set of data may also include a key index that is associated with the LUK. The key index may include information pertaining to the generation of the LUK. For example, the key index may be used as a seed to generate its corresponding LUK. The key index may include time information (e.g., a timestamp) indicating when the LUK is generated, and/or may include a replenishment counter value indicating the number of times that the LUK has been renewed or replenished for a particular account, mobile application, or portable communication device. In some embodiments, the replenishment counter value may indicate the number of times the LUK has been replenished within a predetermined time period, and the replenishment counter value may reset when each predetermined time period elapses. This predetermined time period may correspond, for example, to the smallest unit of time determinable from the time information, although other predetermined time periods can be used. As an example, if the time information included in the key index indicates down to which hour the current LUK is generated, the counter value may indicate the number of times the LUK has been replenished in the hour. In some embodiments, the LUK may include an application transaction counter value indicating the number of transactions that has been previously conducted by a mobile application of the portable communication device at the time the LUK is generated, or may include a pseudo random number generated by a cloud-based transaction service provider or by a suitable entity such as an issuer involved in processing the transaction. It should be understood that the key index may include one or more pieces of information pertaining to the generation of the LUK, and that one or more or all pieces of information included in the key index may be used as a seed to generate the LUK.

According to some embodiments, the dynamic set of data may also include a signature key that is used to generate a signature to perform offline data authentication (ODA). Offline data authentication may refer to an offline process (e.g., without network connectivity) by which an access device authenticates a communication device or an application executing thereon that is interacting with the access device. Offline data authentication can be useful in environments in which network connectivity is limited, or in environments in which there is insufficient time to obtain transaction authorization from an issuer. In such environments, if authentication of the communication device or application executing thereon is successful, access to a good or service associated with the transaction can be granted without requiring authorization from an issuer at the time of the transaction. The authorization from the issuer can be obtained at some later time. For example, in a transit environment, offline data authentication can reduce the processing time at the transit gate to allow more passengers to go through the transit gate in a given time frame. In some embodiments, by using offline data authentication, the processing time at the transit gate can be reduced to less than 300 milliseconds, 200 milliseconds, or 100 milliseconds.

To facilitate the offline data authentication, a signature key provisioned to a communication device can be used to generate a signature. The signature is transmitted to the access device along with any necessary certificates and public key information to authenticate the signature. In some embodiments, a certificate chain can be used to authenticate the signature. For example, an issuer public key certificate and a communication device public key certificate can be provisioned to the communication device in addition to the signature key. The issuer public key certificate may include an issuer public key, and may be signed by a certificate authority private key. The issuer public key certificate can be deciphered and authenticated by a certificate authority public key available to the access device. The communication device public key certificate may include a communication device public key that can be used to authenticate the signature generated by the communication device. The communication device public key certificate may be signed by an issuer private key, and can be deciphered and authenticated by the issuer public key in the issuer public key certificate.

At the time of conducting the offline data authentication transaction, the communication device may provide a signature generated with the signature key, a certificate authority public key index, an issuer public key certificate, and a communication device public key certificate to the access device. The certificate authority public key index can be used by the access device to identify a proper certificate authority public key to authenticate and decipher the issuer public key certificate to obtain the issuer public key. The issuer public key can then be used to authenticate and decipher the communication device public key certificate to obtain a communication device public key. The communication device public key can then be used by the access device to authenticate the signature from the communication device or an application executing thereon.

According to some embodiments, the signature key and associated certificates may be stored outside the confines of a secure element, and thus additional safeguards should be taken to reduce the risk that a compromised signature key can be used for unauthorized ODA transactions. As such, the signature key may also be associated with a set of one or more limited-use thresholds that limits the usage of the signature key, where once the usage of the signature key has exhausted or exceeded its corresponding the set of one or more limited-use thresholds, a further offline data authentication transaction conducted using that signature key will be declined even if the underlying account is still in good standing. The set of one or more limited-use thresholds to enforce can be determined, for example, by an issuer of the account, a cloud-based payments platform that provides the cloud-based transaction service, or a certificate authority.

The set of one or more limited-use thresholds associated with a signature key may include a time-to-live indicating the duration of time for which the signature key is valid. The time-to-live (as well as other limited-use thresholds) associated with the signature key can be the same or different than that of the LUK. In some embodiments, the communication device public key certificate may include an indication of the time-to-live associated with the signature key. When an access device deciphers the communication device public key certificate, the access device can verify whether the time-to-live associated with the signature key has expired or not to determine if access to a good or service associated with the ODA transaction should be granted. An ODA transaction conducted using a signature generated with an expired signature key can be declined.

In some embodiments, the set of one or more limited-use thresholds associated with a signature key can be enforced from the perspective of the certificate authority public key that is used to authenticate signatures generated from the signature key. It should be noted that a particular certificate authority public key can be used to authenticate signatures generated from multiple signature keys from multiple communication devices. As such, the set of one or more limited-use thresholds associated with a signature key may include a cumulative number of ODA transactions authenticated by the certificate authority public key, and/or a cumulative transaction amount indicating the total transaction amount summed across one or more ODA transactions authenticated by the certificate authority public key, or any combination thereof.

For example, a signature key may be valid for a cumulative number of a hundred ODA transactions authenticated by the certificate authority public key associated with the signature key, and a subsequent transaction conducted using that signature key (or other signature keys associated with the same certificate authority public key) may fail authentication and be declined. As another example, a signature key may be valid for a cumulative transaction amount of one thousand dollars, and a transaction conducted using the signature key after the associated certificate authority public key has authenticated ODA transactions totaling more than one thousand dollars may be declined. An access device can determine whether such limited-use thresholds has been exceeded by communicating with an issuer or cloud-based payments platform when network connectivity is available, and if such limited-use thresholds have been exceeded, a new certificate authority public key can be provided to the access device. The new certificate authority public key would not be able to authenticate certificates and signature from a communication device using an expired signature key, and a new signature key and associated certificates should be provisioned to the communication device to allow the communication device to conduct further ODA transactions. In some embodiments, the certificate authority public key may also have its own time-to-live limited-use threshold.

In some embodiments, the account parameters may also include limited-use semi-static set of data that have their own set of limited-use thresholds and/or own set of use restrictions. Although in some embodiments, an account identifier such as a PAN can be used and stored on the portable communication device, a PAN may be valid for the lifetime of an account and may be used for a wide range of different types of transactions (e.g., card present transactions, online transactions, etc.). As such, to further enhance the security of the portable communication device and to reduce the impact if the account parameters are compromised, in some embodiments, instead of using and storing a PAN in the portable communication device, an alternate account identifier (e.g., an alternate PAN) or a token that is a substitute for an account identifier may be used.

An account may have one or more alternate account identifiers and/or tokens associated with the account. Each alternate account identifier or token may be restricted to the type of transactions in which the alternate account identifier or token can be used. For example, an account may be associated with a first token that can only be used for online transactions and a second token that can only be used for cloud-based transactions, and an online transaction conducted using the cloud-based token will be declined. Other types of use restrictions may include restrictions on what type of merchant or which merchant and/or which geographical location that the alternate account identifier or token can be used.

An alternate account identifier or a token may also have its own set of limited-use thresholds (e.g., time-to-live, number of transactions, and/or cumulative transaction amount, etc.). In some embodiments, the limited-use thresholds of an alternate account identifier or a token may have higher usage limits than those of the dynamic set of data (e.g., LUK) such that the replenishment of the alternate account identifier or token occurs less frequently. For example, an alternate account identifier or a token may have a time-to-live of a year whereas the time-to-live of a LUK may be five days. As another example, an alternate account identifier or a token may be valid for up to two thousand transactions whereas a LUK may be valid for up to five transactions. It should be understood that in some embodiments, the usage limits of the alternate account identifier or token can also be set to be the same as those of the dynamic set of data (e.g., LUK), such that replenishment of the alternate account identifier or token occurs at the same time as the dynamic set of data.

II. Cloud-Based Transaction System Overview

In the cloud-based transaction system, issuers of accounts may configure service portfolio characteristics to define the risk parameters and hence the limited-use thresholds of account parameters for accounts belonging to a particular portfolio. The limited-use thresholds can be used to manage the triggers for refreshing or replenishing account parameters on a provisioned portable communication device. To ensure that the cloud-based transactions are processed according to the risk parameters specified in the service profile for an account, several core functions are implemented in the system to manage the deployment and usage of the account parameters. These functions may include provisioning, active account management, verification for payment, transaction processing, lifecycle management, and post-payment processing.

Provisioning may entail taking an enrolled account, creating account parameters such as an identifier to identify the enrolled account for cloud-based transactions (e.g., an alternate account identifier such as an alternate PAN or token) and an initial dynamic set of data to ensure the account parameters have only limited use after delivery to the portable communication device, and inheriting the service profile (e.g., limited-used thresholds) that has been established for the portfolio that the enrolled account belongs to. Depending on the type of transactions supported, the dynamic set of data may include a LUK and/or other dynamic data such as a key index, and may also include a signature key and associated certificates. The LUK, for example, can be used by the portable communication device during a transaction to calculate a transaction cryptogram or limited-use dynamic data such as a verification value to support legacy transactions that use verification values (e.g., dynamic card verification value (dCVV)). The signature key, for example, can be used by the portable communication device during an ODA transaction to gain access to a good or service without obtaining authorization from an issuer at the time of transaction.

After an account is provisioned onto the portable communication device, the relevant service profile details (e.g., limited-use thresholds) can be shared with the transaction processing software and entities in the system to ensure transaction authorization decisions are handled properly. Additionally, the service profile details (e.g., limited-use thresholds) can be provided to the on-device cloud-based transaction software of the mobile application installed on the portable communication device to ensure that the account parameters are managed appropriately on the portable communication device. As discussed above, different usage limits for triggering account parameters replenishment can be set at the different entities in the cloud-based transaction system, and thus the service profile may define different usage limits of each limited-use threshold to be set at the different entities that may initiate account parameters replenishment (e.g., portable communication device, cloud-based service provider, issuer, etc.).

After provisioning, the cloud-based transaction system may perform active account management to initiate the renewal or replenishment of the account parameters. The active account management processes can be triggered by transaction processing activity or initiated by the mobile application running on the portable communication device. If the service profile parameters for a particular account indicate that the account parameters on the device should be replaced (e.g., have exhausted their usage limits), the active account management capability recognizes this and attempts to connect to the portable communication device to replenish the account parameters. Additionally or alternatively, if the on-device service profile parameters managed by the mobile application indicate that account parameter replenishment is needed or is close to be being needed, then the mobile application can request account parameter replenishment.

To provide verification for payments, the cloud-based transaction system also has a capability to provide on-device verification functionalities to the payment processing network prior to or during a transaction to provide some level of verification that the transaction was initiated and intended by a proper user of the portable communication device. The on-device verification may include cardholder verification methods (CVMs) that can be used as verification for payment for provisioned accounts. As part of the service profile for a portfolio, specific rules for what can be used as CVM (e.g., screen lock, application passcode, etc.) can be established and shared with the provisioning, active account management, and transaction processing capabilities.

After an account is provisioned, the transaction processing capability of the system can provide awareness that a transaction being conducted is performed using a cloud-based account. When a cloud-based account is identified, the transaction processing capability of the cloud-based transaction system can ensure that the service profile parameters (e.g., limited-use thresholds) are verified, applied, and communicated to the issuer in transaction processing messages. This capability also ensures that any necessary active account management actions are initiated. For example, account identifying information provided during a transaction can be used to identifying an account as a cloud-based account if the account identifying information corresponds to an account identifier range (e.g., a PAN range) that is dedicated for cloud-based transactions, or if the account identifying information corresponds to an alternate PAN or token that is used only for cloud-based transactions.

After an account has been provisioned for cloud-based transactions, the lifecycle management functionality may allow the user or the issuer to manage the lifecycle of the provisioned account. Lifecycle management events such as suspension or deletion of an account may be consumer-initiated. For example, reporting a lost or stolen portable communication device and/or an associated card by the consumer may trigger suspension or deletion of an account from a portable communication device, or a user may elect to remove a provisioned account from the portable communication device. Lifecycle management events can also be issuer-initiated, for example, based on risk management or account reissuance activities. In some embodiments, other parties that may be involved in the processing of cloud-based transactions or managing cloud-based accounts, including merchants or multi-issuer mobile wallet providers, may also initiate lifecycle actions.

FIG. 1 illustrates a cloud-based transaction system 100, according to some embodiments. The core components of system 100 may include a cloud-based payments platform (CBPP) 180 and a mobile application platform (MAP) 170 to manage cloud-based transactions conducted using portable communication device 101. CBPP 180 may be referred to as a remote computer, and may be implemented using one or more computing devices or computers, such as one or more server computers, and can be associated with or be operated by a cloud-based service provider such as an issuer, payment processor, and/or other suitable entities. CBPP 180 may manage cloud-based accounts, provide verification functions for cloud-based transactions, manage lifecycle messages from issuer/host system 172 or MAP 170, as well as initiate lifecycle management events. CBPP 180 may also assist issuer/host system 172 with post payment functionalities to mitigate the risk against counterfeit account parameters, and limit the exposure on account parameters stored on the device. For example, CBPP 180 can be used to facilitate issuer/host system 172 requests for periodic post payment verification of payment transactions and/or validation of account parameters replenishment requests using post payment information.

CBPP 180 may also implement a set of key management functions that manages issuer master derivation keys (MDKs) from which the limited-use keys (LUKs) for cloud-based transactions are derived. CBPP 180 may implement a set of provisioning functions that manages the preparation and delivery of cloud-based account parameters (e.g., alternate account identifier or token, initial LUK and associated key index, etc.) to MAP 170 for the initial setup of the mobile application 112 on portable communication device 110. CBPP 180 may also manage the cloud-based accounts for processing by issuer/host system 172, and may perform active account management functions such as functions to generate account parameters based on requests or the risk profile of the cloud-based account per CBPP 180 risk management parameters. CBPP 180 may also maintain the account status for each cloud-based account, and manage the replenishment or refreshing of the account parameters.

In some embodiments, CBPP 180 may also implement or be provided with access to a token service 182 and/or a token vault 184. Token service 182 can be used to generate, process, and maintain tokens, which are substitute identifiers for account identifiers. During a transaction, instead of using a real account identifier (e.g., a primary account number (PAN)) to identify the account of the user, a token can be used instead to identify the account. By using a token as a substitute for an account identifier, the risk of comprising real account information can be mitigated. As indicated above, a token may have its own set of use restrictions, and token service 182 may manage the deployment and usage of the tokens according to their use restrictions. Token service 182 may be in communication with token vault 184 where the generated tokens are stored. Specifically, token vault 184 may maintain a mapping between a token and the real account identifier (e.g., PAN) represented by the token. During transaction processing, token vault 184 may be queried to retrieve the real account identifier or PAN associated with the token. In some embodiments, CBPP 180 may also act as a certificate authority or be in communication with a certificate authority to issue signature keys and associated certificates.

MAP 170 is used to facilitate communications between mobile application 112 executing on portable communication device 101 and other entities in cloud-based transactions system 100 such as CBPP 180 and/or issuer/host system 172, etc. MAP 170 may communicate with portable communication device 101 via a communications network 192 such as the Internet. In some environments, portable communication device 101 may not always have constant network connectivity, and thus one of the primary roles of MAP 170 is to intermediate requests between mobile application 112 and the other entities in the cloud-based transactions system 100 to ensure that requests and responses involving mobile application 112 are fulfilled as soon as network connectivity to portable communication device 101 is established. MAP 170 may be referred to as a remote computer, and may be implemented using one or more computing devices or computers such as one or more server computers, and can be associated with or be operated by the provider of mobile application 112. The provider of mobile application 112 can be, for example, an issuer, a bank, a third-party mobile wallet provider, a merchant, or other suitable entities. In some embodiments, MAP 170 can be associated with or be operated by the same entity as CBPP 180, or they can be separate. Although MAP 170 is illustrated as a separate logical entity in FIG. 1 because CBPP 180 is not expected to communicate directly with portable communication devices, it should be understood that in some embodiments, some or all of the functionalities of MAP 170 may be integrated as part of CBPP 180. Examples of MAP 170 may include mobile banking platforms and mobile wallet platforms.

In some embodiments, MAP 170 may implement authentication functionalities to authenticate portable communication device 101 when portable communication device 101 communicates with the other entities in cloud-based transaction system 100 via MAP 170. The authentication functionalities may ensure that a portable communication device communicating with the system is an authorized portable communication device and/or a portable communication device that has not been hacked, infected with malware or virus, or otherwise been compromised. For example, MAP 170 may perform, request, or facilitate a device fingerprint of portable communication device 101 to capture the state of portable communication device 101 when portable communication device 101 communicates with MAP 170. The device fingerprint may, for example, capture information about portable communication device 101 such as the operating system and version, applications installed on portable communication device 101, memory usage, whether portable communication device 101 has been jail-broken, device identifiers such as a portable communication device identifier, and/or other suitable device characteristics.

MAP 170 may verify the device fingerprint of portable communication device 101 for each communication session established with portable communication device 101 or periodically (e.g., once every five communication sessions, once a month, etc.). If the device fingerprint of a portable communication device indicates that the portable communication device is not an authorized device for an account (e.g., the portable communication device requesting replenishment of account parameters is a different device than the original device that was used to enroll the account), or if the device fingerprint indicates that the portable communication device may potentially be hacked, MAP 170 may prevent the portable communication device from communicating with the system and alert the issuer that the portable communication device may have been compromised.

MAP 170 may perform enrollment functions to enroll a mobile cardholder into a cloud-based transactions program, and a set of provisioning functions that facilitates the preparation and delivery of the account parameters, configuration, and cloud-based payments device threshold parameters to mobile application 112. MAP 170 may perform account parameters replenishment functions to facilitate the account parameter replenishment process for the cloud-based account provisioned on portable communication device 101, and lifecycle management functions that manage lifecycle messages from issuer/host system 172, CBPP 180, and/or mobile application 112. MAP 170 may also perform post-payment functions to mitigate the risk against counterfeit account parameters, and to limit the exposure on account parameters stored on portable communication device 101, such as facilitating periodic post payment verification of payment transactions or the use of post payment information to validate account parameters replenishment requests.

In cloud-based transactions system 100, portable communication device 101 can be used to conduct cloud-based transactions facilitated by CBPP 180 and/or MAP 170. The components in portable communication device 101 may include device hardware 103, a mobile operating system (OS) 114, and an applications environment 110 in which mobile application 112 may reside. Device hardware 104 may include a contactless interface 108 that can interact with a contactless reader 162 of an access device 160. Examples of contactless interface 108 may include one or more radio frequency (RF) transceivers (e.g., may be referred to as contactless interface transceivers) that can send and receive communications using near-field communications (NFC), or other radio frequency or wireless communication protocols such as Bluetooth, Bluetooth low-energy (BLE), Wi-Fi, iBeacon, etc. In some embodiments, contactless interface 108 may include an optical interface (e.g., a display screen) to present payment information in the form of an image such as a quick response (QR) code, or bar code, etc. to contactless reader 162 of access device 160 when contactless reader 162 includes an optical code scanner or reader.

Applications environment 110 of portable communication device 101 may host a mobile application 112 provided by a mobile application provider. For example, if the provider of mobile application 112 is an issuer, mobile application 112 may be a mobile banking application or a separate mobile payment application. If the provider is a mobile wallet provider such as a mobile network operator or third-party wallet provider that supports multiple issuers, mobile application 112 may be a mobile wallet application. For merchants, mobile application 112 may be a merchant's own mobile application from which consumers can conduct e-commerce or point of sale transactions with that merchant, or may be a mobile wallet application that supports multiple merchants.

According to some embodiments, mobile application 112 may include on-device cloud-based transaction software 113 (e.g., can be in the form of a software developer kit (SDK)) integrated into mobile application 112 to support cloud-based transaction functionalities. The on-device cloud-based transaction software 113 may perform functions to facilitate cloud-based transactions such as to take the account parameters (e.g., LUK and associated key index, signature key, etc.), generate transaction cryptograms and/or signatures, and deliver them to mobile operating system 114 for transmission over contactless interface 108. The on-device cloud-based transaction software 113 may also manage the initial service profile parameters (e.g., limited-use thresholds) that are provided after an account has been provisioned to ensure that requests for account parameter replenishment and other account parameter management activities are initiated.

Mobile application 112 may perform functions to manage the risk profile of the cloud-based account, maintain the account status, and replenish account parameters for each cloud-based account based on the on-device threshold management parameters. Mobile application 112 may also manage lifecycle messages from issuer/host system 172 or lifecycle messages from MAP 170. Mobile application 112 may perform a set of functions to enroll a mobile cardholder into a cloud-based transactions program, and a set of functions that manages the receiving and configuration of the cloud-based account parameters and cloud-based payments device threshold parameters received from MAP 170. Mobile application 122 may also provide consumer device cardholder verification method (CDCVM) functions for cloud-based transactions, and perform a set of functions that processes and responds to messages in support of post-payment processing to limit the exposure of account parameters stored on the portable communication device. For example, post-payment processing may include periodic post-payment verification of payment transactions or using post-payment information to validate account parameters replenishment requests.

In secure element based implementations, a contactless application (e.g., a mobile wallet or payment application for contactless transactions) using a contactless interface to communicate with a contactless reader of an access device would have to be coded for and be executed on a secure element in order to gain access to the contactless interface. In some embodiments, portable communication device 101 may include a mobile operating system (OS) 114 that implements a set of card emulation application programming interfaces (APIs) 116 such as host card emulation (HCE) APIs to allow mobile application 112 to gain access to contactless interface 108 without requiring the use of a secure element. For example, card emulation APIs 116 may be coded for and be executed from mobile OS 114 of portable communication device 101, and may include programming function calls to allow mobile application 112 to receive, process, and respond to transaction communications such as Application Protocol Data Unit (ADPU) commands sent from contactless reader 162. In this manner, portable communication device 101 is able to conduct contactless transactions without requiring access to a secure element on portable communication device 101.

Once portable communication device 101 and mobile application 112 have been provisioned with the account parameters, portable communication device 110 can conduct cloud-based transactions by interacting with contactless reader 162 of access device 160 (e.g., at a merchant point-of-sale (POS) location, at a transit gate of a transit authority, etc.). Contactless reader 162 may include one or more contactless interface transceivers that can send and receive communications using NFC or other radio frequency or wireless communication protocols such as Bluetooth, BLE, Wi-Fi, iBeacon, etc. In some embodiments, contactless reader 162 may include an optical code scanner or reader to conduct transactions using QR codes, bar codes, etc. Access device 160 may also include a processor or controller 164 and a memory 166 that stores code that is executable by the processor or controller 164 to perform functions of access device 160, such as controlling contactless reader 162 to interact with a communication device or communication with an entity such as acquirer 174.

To conduct a cloud-based transaction, a user of portable communication device 101 may place portable communication device 101 in proximity to contactless reader 162 of access device 160, or display an image such as a QR code or bar code on a screen of portable communication device 101 for scanning by contactless reader 162 of access device 160. Portable communication device 101 may provide access device 160 with an identifier (e.g., an account identifier such as a PAN, an alternate account identifier such as an alternate PAN, or a token, etc.) to identify the account of the user and additional information such as the limited-use account parameters or information derived from the limited-use account parameters (e.g., transaction cryptograms generated from an LUK). For example, in some embodiments, an account identifier or token, and additional information (e.g., a transaction cryptogram, account parameters, etc.) can be transmitted to access device 160 in APDU responses that are responsive to a series of APDU commands received from access device 160. In some embodiments, an account identifier or token, and the additional information can be encoded in a QR code or bar code that is scanned and processed by access device 160 to retrieve the encoded information. Access device 160 or a merchant computer coupled to access device 160 may then generate an authorization request message including the account identifier or token, and additional information such as a transaction cryptogram and other transaction data, and forward the authorization request message to acquirer 174 associated with the merchant. The authorization request message can then be sent by acquirer 174 to payment processing network 194.

Payment processing network 194 may include data processing subsystems, networks, and operations used to support and deliver authorization services, exception file services, transaction scoring services, and clearing and settlement services. An exemplary payment processing network may include VisaNet™. Payment processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

Upon receiving the authorization request message, payment processing network 194 may forward the authorization request message received from acquirer 174 to the corresponding issuer/host system 172 of the account of the user of portable communication device 101. After issuer/host system 172 receives the authorization request message, the authorization request message may be parsed, and the information in the authorization request message may be verified. For example, issuer/host system 172 may verify that the transaction cryptogram was generated by a valid LUK, and that the set of one or more limited-use thresholds associated with the LUK has not been exceeded. In some embodiments, some or all of the information in the authorization request message can also be sent to CBPP 180 for verification and processing. For example, if issuer/host system 172 does not have the capability to verify the transaction cryptogram, the payment processing network 194 or issuer/host system 172 may forward the transaction cryptogram to CBPP 180 for verification.

An authorization response message is then sent back to payment processing network 194 to indicate whether the current transaction is authorized (or not authorized). Payment processing network 194 then forwards the authorization response message back to acquirer 174. In some embodiments, payment processing network 194 may decline the transaction even if issuer/host system 172 has authorized the transaction, for example, depending on a value of a fraud risk score or depending if limited-use account parameters are verified by CBPP 180. Acquirer 174 then sends the authorization response message to the merchant computer and/or access device 160. The authorization response results, which may include transaction data for the transaction can be displayed by access device 160, or be printed out on a physical receipt.

At the end of the day, a clearing and settlement process can be conducted by payment processing network 194. A clearing process is a process of exchanging financial details between an acquirer and an issuer to facilitate posting to a user's payment account and reconciliation of the user's settlement position.

In some embodiments, if obtaining authorization for the transaction is impractical at the time of the transaction (e.g., in a transit environment), access device 160 may indicate to portable communication device 101 that access device 160 supports offline data authentication, and portable communication device 101 may generate a signature using a signature key. The signature along with its associated certificates can be transmitted to access device 160 in APDU responses responsive to a series of APDU commands received from access device 160 to conduct an ODA transaction. If access device 160 successfully authenticates the signature, a user of portable communication device 101 can be given access to a good or service (e.g., permitted to enter the transit gate) before authorization of the transaction is obtained via acquirer 174, payment processing network 194, and/or issuer/host system 172. At some time after the transaction, access device 160 may send an authorization request message to obtain authorization for the transaction from issuer/host system 172.

It should be understood that any of the acquirer 174, payment processing network 194, issuer/host system 172, CBPP 180, and/or MAP 170 may be referred to as a remote computer, and may include one or more computing devices such as one or more computers or server computers to enable the entity to communicate with the other entities in system 100, and/or to perform one or more of the functions described herein.

II. ODA Transaction Execution

Once a portable communication device has been provisioned with the appropriate account parameters, the portable communication device can be used to execute a contactless transaction, for example, by placing portable communication device in proximity to a contactless reader of an access device. Depending on the capabilities of the access device, a contactless transaction conducted using the techniques described herein can be an offline data authentication (ODA) transaction in which access to a good or service associated with the transaction can be granted to a user prior to obtaining authorization for the transaction. For example, in some embodiments, access to a good or service can be given to a user of the portable communication device based on authentication of a signature generated with a signature key prior to completing the steps involved in authorization of the transaction such as verifying a transaction cryptogram generated with a LUK.

In some embodiments, execution of a contactless transaction using a portable communication device can be carried out by providing or exchanging messages (e.g., Application Protocol Data Unit (APDU) messages) between a mobile application running on the portable communication device and a contactless reader of an access device over a contactless medium such as radio frequency waves. The messages can be in the form of APDU commands sent from the contactless reader to the portable communication device, and APDU responses sent from the mobile application to the contactless reader in response to the APDU commands. To provide additional security, the mobile application may be configured to only respond to APDU commands received from the contactless interface or contactless controller of the portable communication device. In other words, the mobile application can be configured to ignore or reject APDU commands received from other applications or components, and/or ADPU commands that the mobile application does not recognize. In some embodiments, if the mobile application receives an unrecognized APDU command from the contactless interface or contactless controller of the portable communication device, the mobile application can respond to the command with a default status word.

In some embodiments, when the mobile application interacts with an external entity (e.g., MAP, CBPP or issuer/host system via the MAP, or a contactless reader of an access device) for which the mobile application may change its state or its stored information, the mobile application processes the interaction in an atomic manner. In other words, the mobile application may process either all of the functions required by the interaction or none of them. In this manner, the mobile application may keep a recognized state as seen from external entities.

During installation of the mobile application, the mobile application may register its proximity payment system environment (PPSE) name as well as all Application Identifiers (AIDs) covered by the mobile application to ensure that transactions using those AIDs are routed to the mobile application (e.g., this can be achieved through a declaration in the manifest of the mobile application to the mobile operating system). For example, in some embodiments, the mobile application can be registered to receive APDU commands for one or more AIDs of a PPSE with a name such as "2PAY.SYS.DDF01."

In some embodiments, the mobile application can be registered to receive and process APDU commands for multiple AIDs (e.g., AIDs defined for a particular issuer, payment processor or processing network, service provider, etc.), and in some scenarios, the multiple AIDs can be associated with a single account. A single account may have multiple AIDs associated with it, for example, if a transaction conducted on that account can be processed by different payment processing networks and/or if the account can have different services, features, product-types, and payment capabilities associated with the account. For example, a single account may have a common debit AID and a payment processing network specific AID (e.g., a Visa AID) associated with the single account. As another example, a single account may support different payment products, and each payment product can have its own AID. The multiple AIDs can be communicated to the access device to allow an access device to select a preferred AID to choose how the transaction is processed (e.g., which payment processing network) and/or what services or features to associate with or provide for the transaction. The multiple AIDs can be populated in the directory entry for the PPSE, and communicated to an access device for this purpose.

The mobile application on the portable communication device may receive, store, and/or support generation of information related to the account to enable the mobile application to respond with the necessary information to a contactless reader as well as provide cardholders with information about the account via the portable communication device's user interface. Some or all of this information can be provided to the mobile application during the enrollment and provisioning process. The account related information may include card art or other visuals that identifies the account to the consumer, account identifying information that can identify the account to the user (e.g. nickname or last 4 digits of the account), the state of the account (e.g.

active, suspended etc.), account configuration information, transaction flow parameters (e.g., information that is provided to a contactless reader during a transaction), the current set of account parameters (e.g., LUK and key index, signature key and associated certificates) and their associated set of one or more limited-use thresholds and corresponding usage limits, and a transaction verification log, etc. The account configuration information may include the AID(s) of the account, which consumer verification method(s) (CVM(s)) (e.g., online PIN, consumer device CVM, signature, etc.) are supported by the account (or by the respective AID if multiple AIDs are present) and their priority, whether the account supports ODA transactions, and a derivation key index (DKI) associated with the issuer master key used during verification of the transaction cryptograms. For mobile applications supporting multiple accounts for the same or different account AIDs, the mobile application may also support the concept of which account is currently the active account and be able to populate responses to the contactless reader with the data according to the currently active account.

The mobile application may also implement one or more counters to track the transaction activity of the mobile application. For example, the mobile application may implement a sequence counter (SC) to count how many times the mobile application has successfully requested new account parameters for a specific account. The mobile application may also implement an application transaction counter (ATC) to count how many times the mobile application has been used to initiate a transaction.

During a transaction, the mobile application may receive, store, and/or dynamically build information such as transaction flow parameters related to the contactless transaction in order to return the necessary information to the contactless reader for the transaction to be successfully executed. Some of the transaction flow parameters may be received, stored, and/or built before the contactless transaction is initiated, while some transaction flow parameters (e.g., transaction cryptogram, signature) can be dynamically built at the time of transaction. For mobile applications supporting multiple AIDs, different transaction flow parameters can be stored and/or generated per AID. Example details of the transaction flow parameters (e.g., including the transaction processing information and/or account data referred to below), and example details of the communication exchanges between the mobile application and the contactless reader will be described with reference to FIGS. 2A-2B for an ODA transaction.

Figure 2A:
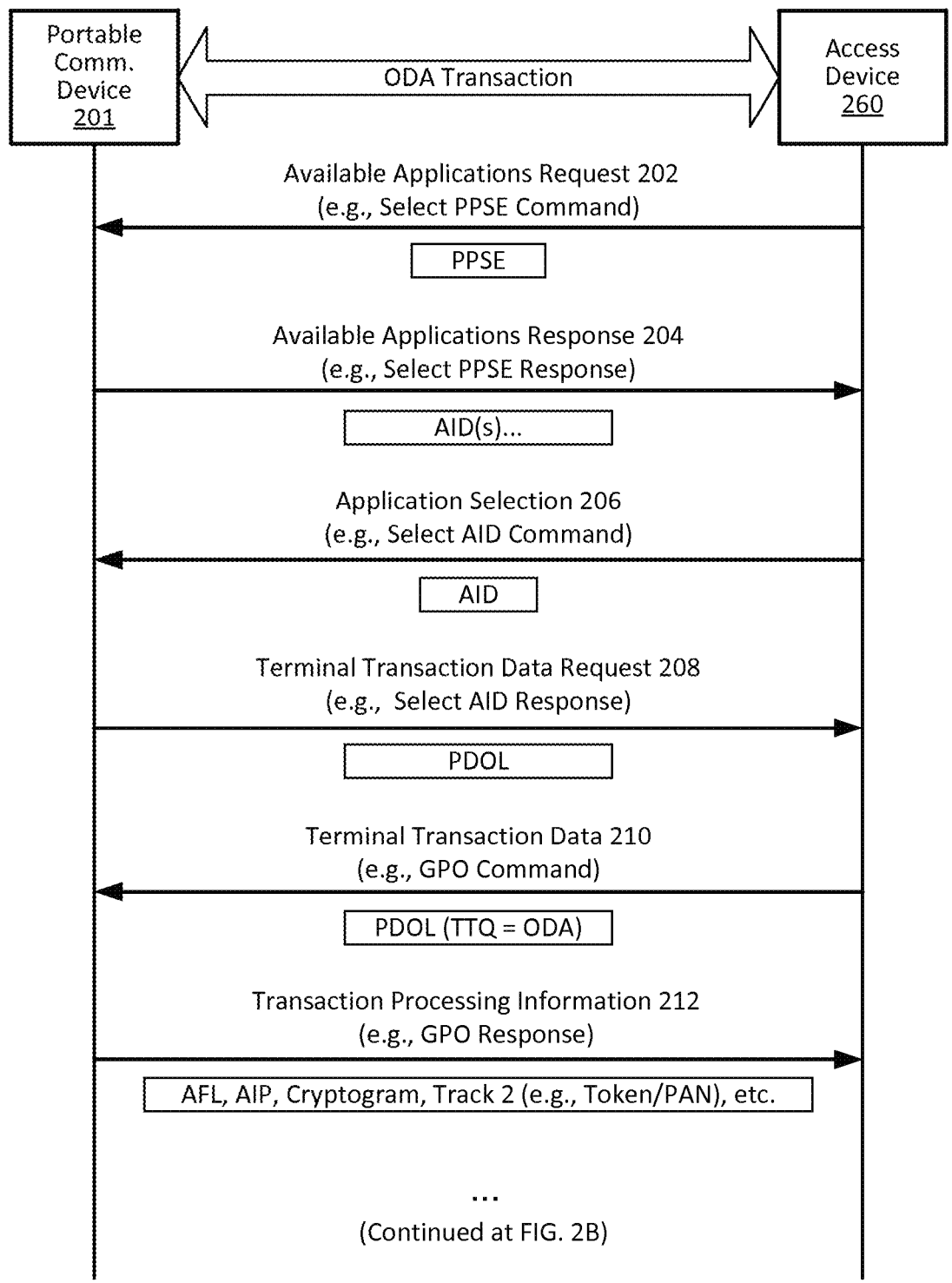
FIG. 2A illustrates a portion of a communication flow diagram of an example of executing an offline data authentication transaction, according to some embodiments.
Figure 2B:
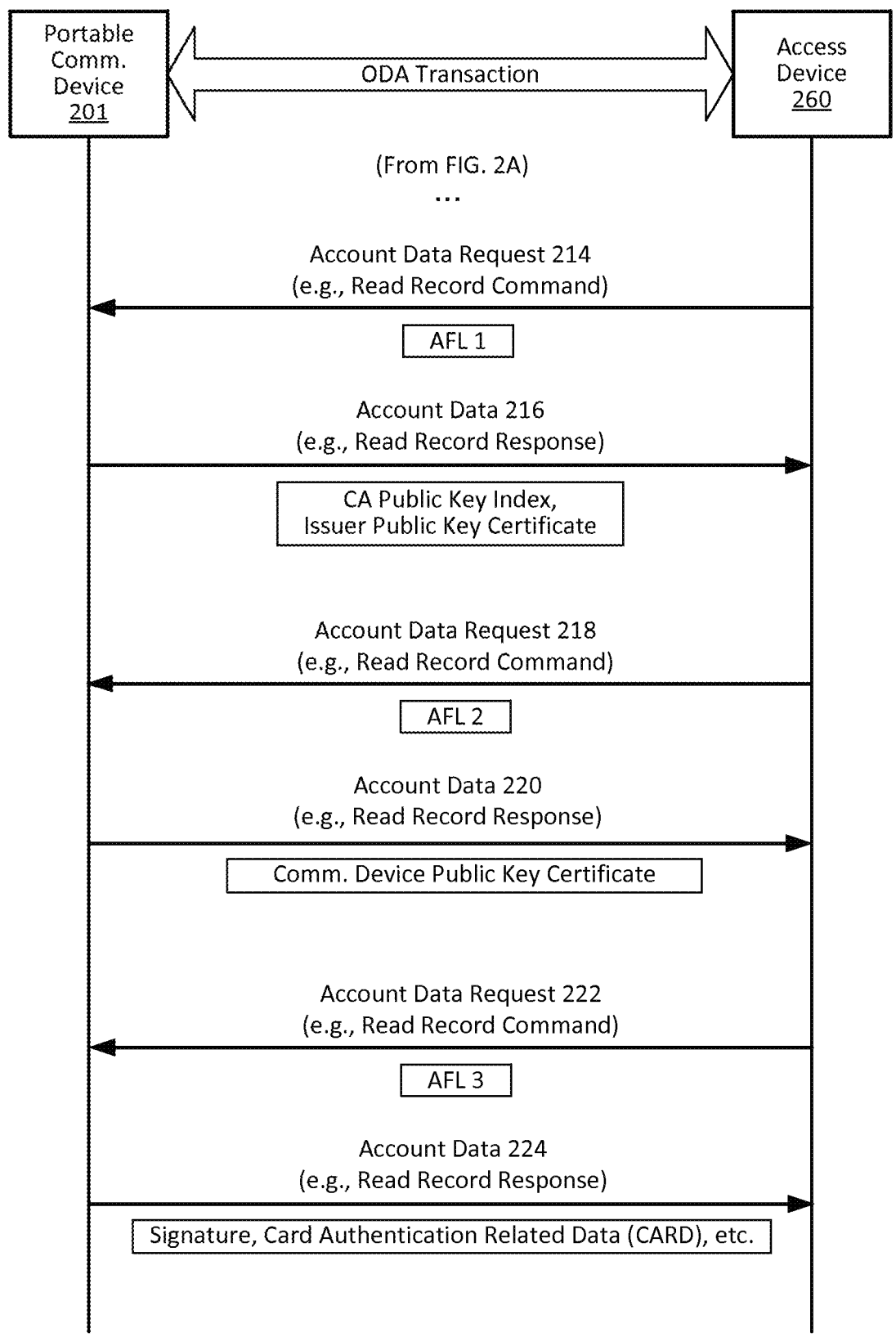
FIG. 2B illustrates another portion of a communication flow diagram of an example of executing an offline data authentication transaction, according to some embodiments.

FIGS. 2A-2B illustrate an example communication flow between a portable communication device 201 and an access device 260 during an offline data authentication (ODA) transaction, according to some embodiments. In some embodiments, the communications can be in the form of ADPU commands and responses. However, it should be understood that other messages, messaging protocols, or formats can be used to exchange the relevant information to conduct the transaction. The communications can be carried out between a mobile application running on portable communication device 201 and a contactless reader of access device 260. In some embodiments, the mobile application may communicate with the contactless reader using card emulation APIs of the mobile operating system of portable communication device 201, and thus the transaction can be carried out without requiring the use of a secure element (although a secure element can be used).

Referring to FIG. 2A, when access device 260 detects the presence of portable communication device 201 in proximity to a contactless reader of access device 260, access device 260 may initiate a transaction by sending an available applications request 202 to portable communication device 201 to request information on which payment application(s) (e.g., a list of AID(s)) that may be available on the mobile application of portable communication device 201. In some embodiments, the available applications request 202 may be in the form of a select PPSE command. The available applications request 202 may include a payment environment identifier (e.g., a PPSE name such as "2PAY.SYS. DDF01") to identify the payment environment supported by access device 260 and the mobile application.

Upon receiving the available applications request 202, the mobile application of portable communication device 201 may identify and process the request by recognizing the payment environment identifier (e.g., PPSE name) included in the request, and respond by sending an available applications response 204 back to access device 260. The available applications response 204 may include a list of available AIDs, and may include the payment environment identifier (e.g., PPSE name) as the dedicated file name. In some embodiments, the available applications response 204 may be in the form of a select PPSE response and may include PPSE file control information (FCI). For example, the available applications response 204 may include a directory entry for each available AID. If the mobile application supports only one AID (irrespective of the number of accounts related to that AID), the mobile application may respond with a single directory entry for the supported AID. If the mobile application supports an account with multiple AIDs, the mobile application may respond with a directory entry for each of the supported AIDs. Each directory entry may include information such as the AID, an application label associated with the AID (e.g., a mnemonic associated with the AID), an application priority indicator indicating the priority of the AID, a kernel identifier indicating the application's kernel preference, and/or additional information relating to the particular AID. The available application(s) response 204 may also include other data such as FCI issuer discretionary data.

When access device 260 receives the available applications response 204, access device 204 may select a suitable application from the list of applications received in the available applications response 204 (e.g., by selecting an AID from the available AID(s) received in the available application(s) response 204). In some embodiments, the selected AID can be the highest priority AID available on the mobile application that is supported by access device 260. Access device 260 may send an application selection 206 with the selected AID to the mobile application of portable communication device 201 to continue the transaction. In some embodiments, the application selection 206 can be in the form of a select AID command.

Upon receiving the application selection 206, the mobile application of portable communication device 201 may send a terminal transaction data request 208 to request transaction data from access device 260 which may be needed to execute the transaction using the selected application AID. In some embodiments, the terminal transaction data request 208 may be in the form of a select AID response and may include AID file control information (FCI) with the selected AID as the dedicated file name. The terminal transaction data request 208 may include a list of transaction data identifiers to request the appropriate data from access device 260, and the list of transaction data identifiers can be in the form of a processing options data object list (PDOL). The transaction data requested by the mobile application for the transaction may include terminal transaction qualifiers (TTQ), authorized amount, other amount, terminal country code, terminal verification results, transaction currency code, transaction data, transaction type, and/or an unpredictable number. The terminal transaction data request 208 may also include other data such as FCI issuer discretionary data, application program identifier, and language preference.

After receiving the terminal transaction data request 208, access device 260 may send, to the mobile application of portable communication device 201, the terminal transaction data 210 requested by the mobile application. In some embodiments, the terminal transaction data 210 may be sent in the form of a get processing options (GPO) command, and may include the requested terminal transaction data in a processing options data object list (PDOL). In some embodiments, the terminal transaction data 210 (e.g., terminal transaction qualifiers (TTQ)) may include a transaction type indicator indicating whether access device 260 supports offline data authentication transactions. Thus, in the ODA transaction illustrated in FIGS. 2A-2B, access device 260 may send a transaction type indicator in the terminal transaction data 210 to indicate that access device 260 supports ODA transactions. In some embodiments, the terminal transaction data 210 (e.g., terminal transaction qualifiers (TTQ)) may also include a consumer verification method (CVM) requirement indicator to indicate whether a CVM is required by access device 260 for the transaction, and also one or more CVM type indicators indicating the types of CVM supported by access device 260. Examples of CVMs that may be supported by access device 260 can include online PIN, signature, and/or consumer device CVM (CDCVM) such as a passcode used on portable communication device 201 to unlock the screen or mobile application.

Once the mobile application of portable communication device 201 receives terminal transaction data 210, the mobile application may increment its Application Transaction Counter (ATC) and generate dynamic transaction processing information using at least some of the received terminal transaction data 210, and send a set of transaction processing information 212 including the generated dynamic transaction processing information to access device 260. The dynamic transaction processing information 212 returned to access device 260 may include a transaction cryptogram generated using the LUK. For an ODA transaction, portable communication device 201 may also need to generate a signature based on at least some of the received terminal transaction data 210. In some embodiments, because the signature generation process can be computing intensive and the signature may require some time to be generated, to reduce the overall transaction processing time, the signature generation process can begin when the terminal transaction data 210 from access device 260 is received, and can be performed in parallel with the generation of the transaction cryptogram and transaction processing information 212.

The transaction processing information 212 can be sent in the form of a GPO response to access device 260. In some embodiments, the transaction processing information 212 may include one or more application file locators (AFLs) that can be used as file address(es) by access device 260 to read account data stored on portable communication device 201, and an application interchange profile (AIP) that can be used to indicate the capabilities of the mobile application. The transaction processing information 212 may include a transaction cryptogram dynamically generated using the LUK as indicated above, track-2 equivalent data, and additional data such as issuer application data (IAD), form factor indicator (FFI), card transaction qualifiers (CTQ), cryptogram information data (CID), the updated ATC, and/or an application PAN sequence number (PSN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g. a master key associated with the issuer used in generation of the LUK), card verification results (CVR), a wallet provider ID, and/or derivation data such as the key index that was used in the generation of the LUK.

The card verification results (CVR) may include information about the CVM verifying entity and the CVM verified type for the transaction. The CVM verifying entity is used to indicate which entity is performing the verification of the CVM for the transaction. The verification entity may be the access device (or terminal), a co-residing secure application, a trusted execution environment application, the mobile application itself, a remote server (e.g., the cloud), or the mobile operating system. The CVM verified type is used to indicated the CVM method used for the transaction. The CVM method may be a passcode, biometric (e.g., fingerprint), pattern lock (e.g., for a screen lock), signature, or online PIN. In some embodiments, if the terminal transaction data 210 received from access device 260 indicates that the CVM supported by access device 260 is an online PIN or a signature, the CVM verifying entity in the CVR can be set to the access device (or terminal) to indicate that access device 260 is the verifying entity, and the CVM verified type can be set accordingly (e.g., online PIN or signature).

If the terminal transaction data 210 received from access device 260 indicates that the CVM supported by access device 260 is a CDCVM, the CVM verifying entity and the CVM verified type can be set according to the configuration parameters of the account. For example, if the account supports CVM using a passcode that is verified by the mobile operating system of portable communication device 201, the CVM verifying entity can be set to the mobile operating system, and the CVM verified type can be set to indicate that the CVM is a passcode. In some embodiments, a CDCVM performed indicator can be included in the card transaction qualifiers (CTQ) to indicate whether the CVM verifying entity has successfully verified the user using the CDCVM indicated by the CVM verified type.

If the terminal transaction data 210 received from access device 260 indicates that a CVM is not required, the CVM verifying entity and the CVM verified type can be set to indicate that no CVM was verified. In some embodiments, the CVR may include additional data such as a threshold indicator that indicates whether one or more limited-use thresholds associated with the LUK has been exceeded.

The form factor indicator (FFI) may include information about portable communication device 201, such as a form factor indicator version number indicating the version of the form factor indicator being used, a consumer payment device form factor indicator indicating the device type of portable communication device 201, and consumer payment device features indicators indicating what payment features are supported by portable communication device 201. The consumer payment device form factor may indicate that portable communication device 201 is a standard card (e.g., ID-1 card type as specified in ISO 7811), a mini-card, a non-card form factor (e.g., key fob, watch, wristband, ring, sticker, etc.), or a mobile phone. The consumer payment device features indicators may indicate whether portable communication device 201 is capable of using a passcode (can be separate from a PIN that is used during transactions), has a signature panel, has a hologram, has support for card verification values (e.g., CVV2), capable of two-way messaging to exchange identifying information between the issuer and the user, and/or has support for using cloud-based credentials (e.g., LUK, token, etc.). The form factor indicator (FFI) may also include a payment transaction technology indicator indicating that portable communication device 201 supports contactless transactions (e.g., NFC).

It should be understood that in some embodiments, the transaction processing information 212 being sent from portable communication device 201 to access device 260 may include some or all of the information describe above, and in some embodiments, may include additional information not specifically described.

Referring to FIG. 2B, after access device 260 receives the transaction processing information 212, access device 260 may send a set of account data requests (e.g., account data request 214, 218, and 222) to the mobile application of portable communication device 201 to read additional account data that may be stored on portable communication device 201. In some embodiments, each account data request may be in the form of a read record command, and may include an application file locator (AFL) indicating the location of the account data that access device 260 is attempting to read. The AFL included in the account data request may correspond to one of the AFLs in the transaction processing information 212 that were provided to access device 260 from portable communication device 201.

For example, access device 260 may send a first account data request 214 to the mobile application of portable communication device 201 to read additional account data that may be stored at a first AFL 1 where the certificate authority public key index and issuer public key certificate are stored. In response to receiving the first account data request 214 from access device 260, portable communication device 201 may send the account data 216 stored at the location indicated by AFL 1 to access device 260. In some embodiments, the account data 216 may be sent in the form of a read record response. The account data 216 may include, for example, a certificate authority public key index that identifies a proper certificate authority public key that the access device 260 can use to authenticate a signature generated by portable communication device 201, and an issue public key certificate. The account data 216 may also include additional issuer public key certificate information such as an issuer public key exponent and issue public key remainder. The certificate authority public key index can be used by access device 260 to retrieve a proper certificate authority public key. Using the identified certificate authority public key and the issuer public key exponent and remainder information, access device 260 can decipher the issuer public key certificate to obtain the issuer public key from the issuer public key certificate.

Access device 260 may then send a second account data request 218 to the mobile application of portable communication device 201 to read additional account data that may be stored at a second AFL 2 where a communication device public key certificate is stored. In response to receiving the second account data request 218 from access device 260, portable communication device 201 may send the account data 220 stored at the location indicated by AFL 2 to access device 260. In some embodiments, the account data 220 may be sent in the form of a read record response. The account data 220 may include, for example, a communication device public key certificate, and may also include additional communication device public key certificate information such as a communication device public key exponent and communication device public key remainder. Using the issuer public key obtained above and the communication device public key exponent and remainder information, access device 260 can decipher the communication device public key certificate to obtain a communication device public key from the communication device public key certificate. In some embodiments, the communication device public key is the public key corresponding to the private signature key, and can be used to authenticate a signature generated with the signature key.

Access device 260 may then send a third account data request 222 to the mobile application of portable communication device 201 to read additional account data that may be stored at a third AFL 3 where the signature dynamically generated by portable communication device 201 is stored. It should be noted that portable communication device 201 can take advantage of the processing time for processing account data requests 214 and 218 by performing the signature generation in parallel with the processing of these requests, such that the signature can be available when the third account data request 222 is received. In response to receiving the third account data request 222 from access device 260, portable communication device 201 may send the account data 224 stored at the location indicated by AFL 3 to access device 260. In some embodiments, the account data 224 may be sent in the form of a read record response.

The account data 220 may include, for example, a signature generated with a signature key as well as other account related data such as an application expiration date, PAN/token, application usage control (AUC), card authentication related data (CARD), issuer country code, and/or a token requestor ID. In some embodiments, the card authentication related data may include a ODA version number indicating the version of offline data authentication being supported, a communication device unpredictable number, and other card transaction qualifiers. Using the communication device public key obtained above, access device 260 can decipher and authenticate the signature received from portable communication device 201. In some embodiments, the signature may have been generated by applying a signing function to a hash value of at least some of the terminal transaction data 210 provided from access device 260 to portable communication device 201. To authenticate the signature received from portable communication device 201, access device 260 can retrieve the hash value from the signature by applying the communication device public key to the signature, and compare the retrieved hash value against a hash value computed over the same set of terminal transaction data. If the signature is successfully authenticated, a user of portable communication device 201 can be given access to a good or service associated with the transaction before access device 260 obtains authorization for the transaction from an issuer (e.g., verify the transaction cryptogram with the issuer).

It should be understood that in some embodiments, the account data 216, 220, and 224 being sent from portable communication device 201 to access device 260 may include some or all of the information describe above, and in some embodiments, may include additional information not specifically described. In some embodiments, there can be additional pairs of account data request and account data communication exchanges between access device 260 and portable communication device 201, for example, if additional account related data stored on or dynamically generated by portable communication device 201 is needed by access device 260 to process the transaction.

According to some embodiments, some or all of the data elements in the transaction processing information 212 and account data transmissions can be used by access device 260 to generate a transaction authorization request message. At a later time (e.g., when access device 260 establishes network connectivity) after the user has been granted access to a good or service based on authentication of the signature, access device 260 may route the authorization request message to request authorization of the transaction from the issuer. For example, in some embodiments, the authorization request message may include at least the track-2 equivalent data and the transaction cryptogram generated with the LUK, and the transaction can be authorized based on at least verifying that the transaction cryptogram was generated correctly and that the LUK used in generation of the transaction cryptogram has not exhausted the LUK's set of one or more limited use thresholds.

Track-2 Equivalent Data

According to some embodiments, the track-2 equivalent data provided from the mobile application of the portable communication device to the access device may include different data elements. Table 1 shows one example of a track-2 equivalent data format with an embedded transaction cryptogram that can be used in an ODA transaction.

TABLE 1

Track-2 equivalent data with embedded transaction cryptogram
Data Element

Account Identifier
(e.g., PAN, alternate PAN, token)
Field Separator = 'D'
Expiry Date
Service Code
Key Index
Transaction Cryptogram
Padding 'F'

The key index is associated with the LUK that was used in the generation of the transaction cryptogram for the particular transaction, and may include information pertaining to the generation of the LUK as described herein. For example, the key index may be a seed that was used to generate the LUK, and may include time information (e.g., a timestamp) indicating when the LUK was generated, and/or may include a replenishment counter value indicating the number of times that the LUK has been renewed or replenished for a particular account, mobile application, or portable communication device. In some embodiments, the key index may include an application transaction counter value indicating the number of transactions that has been previously conducted by a mobile application of the portable communication device at the time the LUK is generated, or may include a pseudo random number generated by a cloud-based transaction service provider or by a suitable entity such as an issuer involved in processing the transaction.

The transaction cryptogram embedded in the track-2 equivalent data may be a cryptogram generated by using the LUK as an encryption key. In some embodiments, the transaction cryptogram that is embedded in the track-2 equivalent data may be different than the transaction cryptogram that is provided in the transaction processing information 312 (e.g., GPO response). For example, the transaction cryptogram embedded in the track-2 equivalent data (may be referred to as a "decimalized transaction cryptogram") may have a reduced-length (e.g., reduced to six digits), and/or may be generated by encrypting a static data (e.g., a predetermined numeric string) instead of terminal transaction data.

In some embodiments in which the transaction is conducted using an optical contactless interface, an optical image such as a QR code or a bar code can be generated to encode the track-2 equivalent data format shown in Table 1, and the optical image encoding the track-2 equivalent data can be displayed on a portable communication device, and be presented to an optical scanner or reader of an access device to conduct the transaction.

Table 2 shows an example of a track-2 equivalent data format without an embedded transaction cryptogram that can be used in an ODA transaction.

TABLE 2

Track-2 equivalent data without embedded transaction cryptogram
Data Element

Account Identifier
(e.g., PAN, alternate PAN, token)
Field Separator = 'D'
Expiry Date
Service Code
PIN Verification Field
Track 2 Discretionary Data
Padding 'F'

For an integrated chip based transaction, a transaction cryptogram is already provided to the access device in the transaction processing information 312 (e.g., GPO response), and thus it may be unnecessary to include a transaction cryptogram in the track-2 equivalent data. Hence, the track-2 equivalent data format shown in Table 2 can be used for an ODA transaction, although the track-2 equivalent data format shown in Table 1 may also be used.

In some embodiments, the key index associated with the LUK can be embedded in the track-2 discretionary data in the track-2 equivalent data format shown in Table 2. The key index, for example, may include time information and/or a replenishment counter value, an application transaction counter value, or a pseudo random number, or any of the examples described herein. In some embodiments, the key index may act as a seed for generating the transaction cryptogram. By including the seed in the track-2 discretionary data that is passed to the issuer, the issuer can verify the seed, and in some embodiments, regenerate the transaction cryptogram using the seed to verify the transaction cryptogram.

It should be understood that the track-2 equivalent data formats describe above are examples, and that in some embodiments, the track-2 equivalent data may omit some of the data elements, and/or may include additional data elements not specifically shown.

III. Transaction Verification Log

According to some embodiments, the mobile application may update a transaction verification log maintained by the mobile application at the end of a transaction to include information about the transaction in the transaction verification log. The mobile application may recognize the end of a transaction by recognizing that all transaction processing information and/or account data that may be needed by the access device to complete the transaction has been provided to the access device (e.g., recognizing that the last record defined in the AFL has been returned successfully or if no AFL, when the GPO response has been returned successfully).

Figure 3:
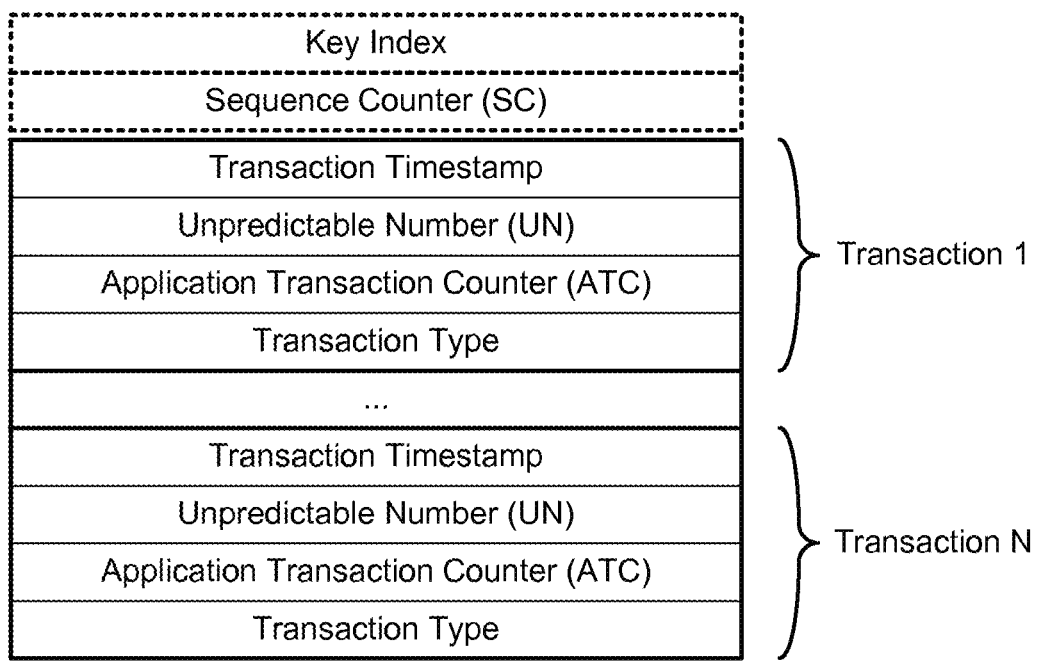
FIG. 3 illustrates an example of a transaction verification log, according to some embodiments.

FIG. 3 illustrates examples of data elements that can be include in a transaction verification log, according to some embodiments. The mobile application may maintain a transaction verification log per LUK or per set of account parameters. In some embodiments, the portable communication device may maintain a number of transaction verification logs for several LUKs or sets of account parameters, or optionally, once the current LUK or account parameters have been renewed or replenished, the transaction verification log corresponding to the previous LUK or account parameters can be deleted to save memory space on the portable communication device.

The transaction verification log may be associated with and/or may include the key index corresponding to the LUK or set of account parameters used in the logged transactions, and a sequence counter value associated with the key index or set of account parameters indicating the number of times the LUK or set of account parameters have been replenished. For each transaction conducted using the particular LUK or particular set of account parameters, the transaction verification log may include a transaction timestamp indicating the time of the corresponding transaction, an unpredictable number (UN) provided from the access device during the transaction (if available), an application transaction counter (ATC) value associated with the corresponding transaction (e.g., a value indicating the number of transactions that has been conducted using the mobile application at the time of the transaction), and a transaction type indicator indicating whether the corresponding transaction was conducted as an integrated chip based transaction or a magnetic stripe based transaction. The transaction timestamp may be the UTC time as determined by the portable communication device at the time of the transaction. In some embodiments, additional information such as the location of the portable communication device at the time of the corresponding transaction can be included in the transaction verification log. It should be understood that in some embodiments, the transaction verification log may include fewer data elements, and/or may include other data elements not specifically shown.

IV. Account Parameters Replenishment

When a set of account parameters (e.g., LUK, signature key, etc.) expires due to the age of the account parameters or usage of the account parameters exhausting the associated set of one or more limited-use thresholds, a subsequent transaction conducted using the expired set of account parameters may be declined. In order to be able to continue to conduct transactions using the mobile application of the portable communication device, the mobile application may need to update, renew, refresh, or replenishment the set of account parameters available to the mobile application. In some embodiments, the transaction verification log may also be used during the account parameter replenishment process to verify that the mobile application or portable communicate device requesting new account parameters is the same application or device that had previously received and used the prior set of account parameters.

To facilitate the account parameters replenishment process, the mobile application of the portable communication device may track the usage of the set of account parameters (e.g., LUK, signature key, etc.), and maintain an account parameters status that indicate whether one or more limited-use thresholds associated with the account parameters has been exhausted or is about to be exhausted. For example, the mobile application may track how many transactions have been conducted using the set of account parameters, how much time has elapsed since the set of account parameters was generated, and/or the cumulative transaction amount over all transactions that were conducted using the set of account parameters. At the end of each transaction, the mobile application may update the usage of the set of account parameters being tracked by the mobile application, and compare the usage against the on-device set of one or more limited-use thresholds. In some embodiments, if the mobile application determines that the usage of the current set of account parameters has exhausted the on-device set of one or more limited-use thresholds or used beyond the usage limit, the mobile application may initiate an account parameters replenishment request. In some embodiments, the mobile application may initiate an account parameters replenishment request if the mobile application determines that the next transaction conducted using the current set of account parameters will exhaust the set of one or more limited-use thresholds. This can be done, for example, to help ensure that a valid set of account parameters is constantly available to the mobile application such that the next transaction conducted with the mobile application does not get declined.

Figure 4:
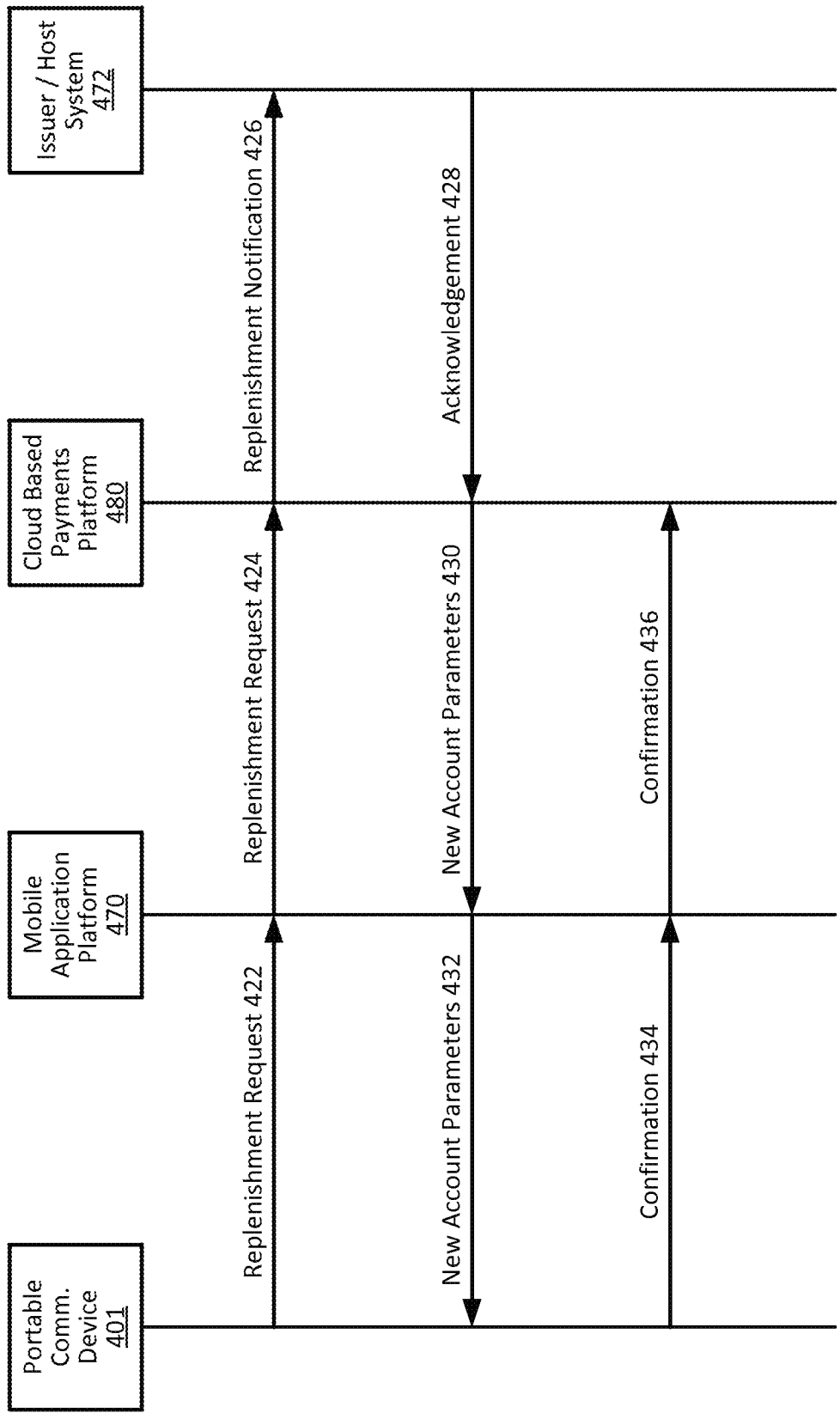
FIG. 4 illustrates a communication flow diagram of an example of an account parameters replenishment process, according to some embodiments.

FIG. 4 illustrates a communication flow diagram of an example of an account parameters replenishment process, according to some embodiments. In the example shown in FIG. 4, the account parameters replenishment process is initiated by the mobile application of portable communication device 401, and may be referred to as a replenishment pull process. When the mobile application determines that the set of one or more limited-use thresholds associated with the current set of account parameters have been exhausted or is about to be exhausted, the mobile application of portable communication device 401 may send an account parameters replenishment request 422 to MAP 470 to replenish the set of account parameters available to the mobile application.

The account parameters replenishment request 422 may include information identify the relevant account, mobile application, and/or portable communication device 401, and may include transaction log information derived from the transaction verification log stored on the portable communication device. The transaction log information provided in the account parameters replenishment request 422 may include some or all of the information contained in the transaction verification log such as the per transaction details for each transaction conducted using the current set of account parameters (e.g., transaction timestamp, application transaction counter value, transaction type indicator, unpredictable number if available, and/or any combination thereof). The transaction log information may include the key index associated with the current set of account parameters, and/or the sequence counter associated with the current set of account parameters. Alternatively or additionally, the transaction log information derived from the transaction verification log and provided in the account parameters replenishment request 422 may include an authentication code (e.g., a message authentication code, hash value, etc.) computed over some or all of the information in the transaction verification log. For example, the authentication code may be computed over the per transaction details, or over the key index and/or sequence counter together with the per transaction details. In some embodiments, the authentication code can be generated by using the LUK as an encryption key.

When MAP 470 received the account parameters replenishment request 422, MAP 470 forwards the request as account parameters replenishment request 424 to CBPP 480. Upon receiving the account parameters replenishment request 424, CBPP 480 may verify the transaction log information or request issuer/host system 472 to verify the transaction log information. If the transaction log information matches the transaction activity at CBPP 480 or issuer/host system 472, CBPP 480 may then generate a new set of account parameters (e.g., new key index, new LUK, new signature key and associated certificates, etc.) to replenish the current set of account parameters at the mobile application. CBPP 480 may send a replenishment notification 426 to issuer/host system 472 to notify the issuer that a new set of account parameters is being replenished to the mobile application. In some embodiments, the replenishment notification 426 may include the new set of account parameters (e.g., new key index, new LUK, new signature key and associated certificates, etc.) such that issuer/host system 472 may perform its own update. Issuer/host system 472 may respond by sending an acknowledgment 428 to CBPP 480.

After the new set of account parameters are generated, CBPP 480 may send the new set of account parameters 430 to MAP 470. The new set of account parameters 430 may include a new key index, a new LUK, new signature key and associated certificates, etc., and in some embodiments, may also include a new set of one or more limited-use thresholds associated with the account parameters or LUK that may have different usage limits than the previous thresholds. MAP 470 then forwards the data as the new set of account parameters 432 to the mobile application of portable communication device 401.

When the mobile application of portable communication device 401 receives the new set of account parameters, the mobile application delete the previous set of account parameters and associated transaction verification log details and usage tracking, and store the new set of account parameters. If the new set of account parameters has different usage limits for the set of one or more limited-use thresholds, the one or more limited-use thresholds can be updated with the new usage limits. The mobile application also increments the sequence counter for each successful account parameters replenishment. Once the mobile application has updated the set of account parameters, the mobile application of portable communication device 401 may send a confirmation 434 to MAP 480, and MAP 480 may forward this as confirmation 436 to CBPP 470 to confirm that the account parameters replenishment process was successful.

In some embodiments, if issuer/host system 472 is responsible for account parameters generation, instead of sending the replenishment notification 426 to issuer/host system 472, CBPP 480 may forward account parameters replenishment request 424 to issuer/host system 472, and have issuer/host system 472 generate the new set of account parameters. In such embodiments, issuer/host system 472 may provide the new set of account parameters to CBPP 480 and/or to MAP 470 for forwarding to the mobile application on portable communication device 401.

According to some embodiments, the account parameters replenishment process can be initiated by CBPP 480 and/or issuer/host system 472. An account parameters replenishment process that is not initiated by the mobile application may be referred to as a replenishment push process. For example, the account parameters replenishment process can be triggered by transaction activity monitored by CBPP 480 and/or issuer/host system 472. In some embodiments, CBPP 480 and/or issuer/host system 472 may maintain their own set of one or more limited-use thresholds, which may or may not have the same usage limits as the on-device limited-use thresholds maintained at the mobile application. CBPP 480 and/or issuer/host system 472 may track the usage of the current set of account parameters.

When CBPP 480 determines that the set of one or more limited-use thresholds at the CBPP 480 associated with the current set of account parameters have been exhausted or is about to be exhausted, CBPP 480 may send a push message to MAP 470 to request the mobile application to replenish its current set of account parameters. When issuer/host system 472 determines that the issuer set of one or more limited-use thresholds associated with the current set of account parameters have been exhausted or is about to be exhausted, issuer/host system 472 may send a push message to CBPP 480 and/or MAP 470 to request the mobile application to replenish its current set of account parameters.

Upon receiving a push message to replenish the set of account parameters from CBPP 480 or issuer/host system 472, MAP 470 may forward the push message to the mobile application of portable communication device 401. In some scenarios, portable communication device 401 may be powered off or the mobile application may not be active at portable communication device 401 at the time CBPP 480 and/or issuer/host system 472 initiates the replenishment process. In such scenarios, MAP 470 may queue the push message for deliver to the mobile application at a later time, and may periodically attempt to reach the mobile application until MAP 470 establishes communication with the mobile application. When the mobile application receives the push message requesting the mobile application of portable communication device 401 to replenish the account parameters, in response, the mobile application of portable communication device 401 may send an account parameters replenishment request with the relevant transaction log information to MAP 470. The replenishment process may continue in a similar manner as the replenishment push process described above with reference to FIG. 4. In some embodiments, CBPP 480 and/or issuer/host system 772 may generate the new set of account parameters and provide them to MAP 470 together with the push message such that MAP 470 may provide the new set of account parameters to the mobile application when communication with the mobile application is established.

It should be understood that the account parameters replenishment process described herein can be used, for example, to replenish any account parameters or related information such as to replenish the LUK, LUK index, signature key, certificates and information associated with the signature key (e.g., certificate authority public key index, issuer public key certificate, communication device public key certificate, token that is used as a substitute for an account identifier, etc. In some embodiments, a combination of the account parameters can be replenished at the same time, or separately. For example, a token can be replenished at the same time as the LUK and key index, or separately from the LUK and key index. As another example, a signature key can be replenished at the same time as the LUK and key index, or separately from the LUK and key index.

V. Transaction Cryptograms and Signatures

According to some embodiments, because no secure element is required to be present to protect account credentials stored on the potable communication device, the account parameters for conducting cloud-based transactions may have a limited lifespan such that even if a given set of account parameters is compromised, the stolen account parameters would be of little use as they may have expired or will expire shortly. For example, instead of using a static key stored in a secure element to generate cryptograms during transactions as in some secure element implementations, the cloud-based transaction system uses limited-use keys in the generation of transaction cryptograms. As another example, instead of using a static signature key stored in a secure element to generate signatures during ODA transactions as in some secure element implementations, the cloud-based transaction system uses limited-use signature keys in the generation of signatures in ODA transactions.

With respect to the transaction cryptogram, in some embodiments, the input data used to generate the transaction cryptogram may include dynamic data (e.g., data that changes for each transaction) received from the contactless reader of an access device during the transaction (e.g., terminal transaction data). In addition to being used in transaction cryptogram generation, in some embodiments, the LUK can be used to generate an authentication code when the mobile application communicates with the other components or entities of the cloud-based transaction system. For example, an authentication code or hash code can be generated over the transaction verification log details using the LUK as a key during the account parameters replenishment process.

Figure 5:
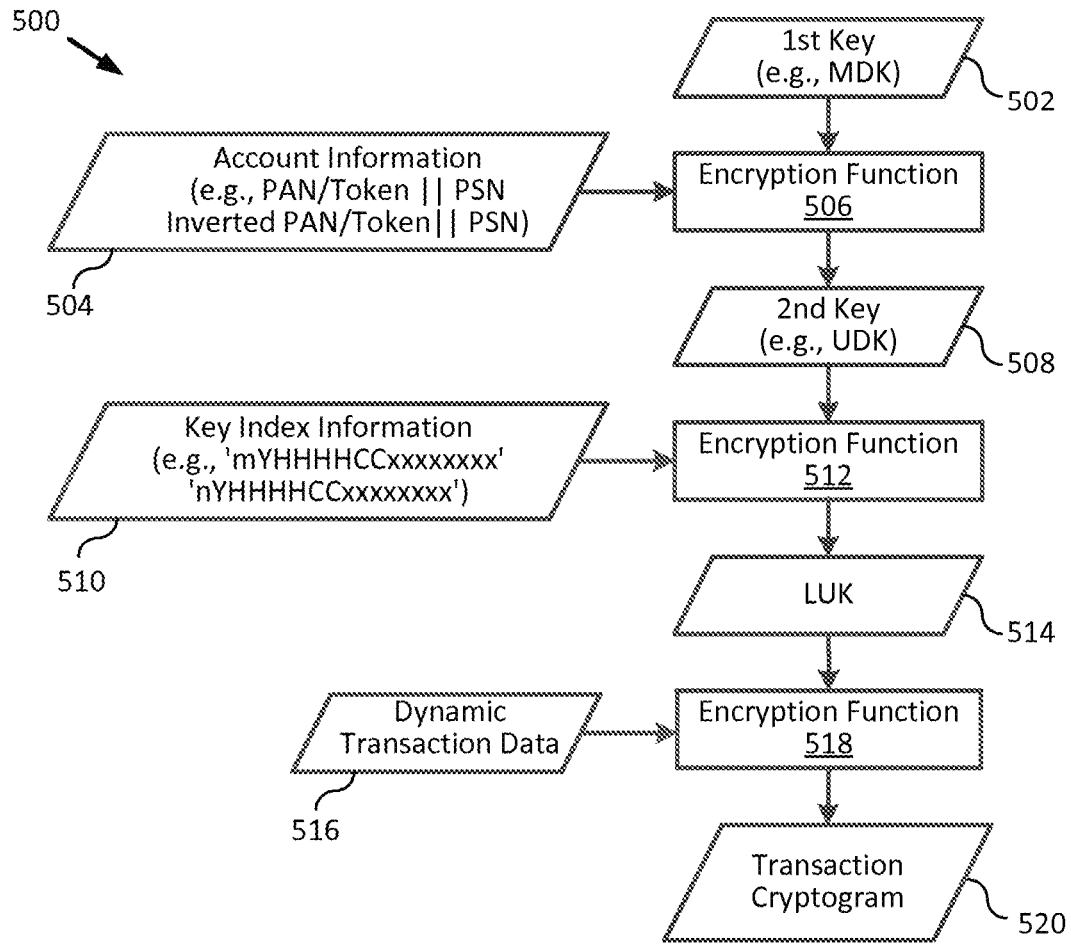
FIG. 5 illustrates an example of a process for generating a transaction cryptogram, according to some embodiments.

FIG. 5 illustrates a block diagram of an example of a process 500 for generating a transaction cryptogram, according to some embodiments. Any one of the encryption functions 506, 512, 518, and/or 524 can be the same or be different than any of the other encryption functions. For example, any one of the encryption functions 506, 512, 518, and/or 524 may be implemented as triple data encryption standard (TDES), data encryption standard (DES), advanced encryption standard (AES), or other suitable encryption algorithms.

Process 500 can be divided into two parts—the first part relates to the LUK generation (blocks 502 to 514), and the second part relates to the transaction cryptogram generation (blocks 516-520). The first part relating to the LUK generation can be performed once to generate a LUK (e.g., by CBPP or issuer/host system), and the second part relating to the transaction cryptogram generation can be performed multiple times using the LUK generated from the first part (e.g., by the mobile application) until the LUK has exceeded its set of one or more limited-use thresholds, at which time, the first part relating to the LUK generation can be performed again to replenish, renew, or refresh the LUK.

Process 500 may begin by encrypting account information 504 with a first encryption key 502 using an encryption function 506 to generate a second encryption key 508. The first encryption key 502 may be a base key that is associated with the issuer of the user's account, and the base key may be associated with a group of accounts. For example, the first encryption key 502 may be associated with a group of accounts within a BIN or PAN range designated for the cloud-based transaction service. In some embodiments, the first encryption key 502 may be a master derivation key (MDK) associated with the issuer of the account associated with the account information 504, and the first encryption key 502 can be maintained at the CBPP or at the issuer/host system.

The account information 504 may include account identifying information such as an account identifier (e.g., a PAN), an alternate account identifier (e.g., an alternate PAN), or a token that is a substitute for an account identifier, and may additionally include user identifying information such as a sequence number (e.g., a PAN sequence number (PSN)) that identifies the particular user of the account (e.g., when multiple users use the same account). For example, the account information 504 that is used as the input to encryption function 506 can be a concatenation of the account identifying information and the user identifying information, or an inverted version of the concatenation.

In some embodiments, the second encryption key 508 being generated from the account information 504 may include multiple portions that are each generated from different variations of the account information 504. For example, the second encryption key 508 may be divided into two portions. The first portion of the second encryption key 508 may be generated by encrypting the account information 504 using the first encryption key 502. The second portion of the second encryption key 508 may be generated by inverting the account information 504 and encrypting the inverted account information using the first encryption key 502. The encryption function 506 used to generate the second encryption key 508 may be, for example, triple data encryption standard (TDES) or other suitable encryption algorithms, and may use an initial chaining vector of binary zeros. In some embodiments, the second encryption key 508 generated from the account information 504 may correspond to a unique derivation key (UDK) for the account.

Process 500 may continue by encrypting key index information 510 with the second encryption key 508 using an encryption function 512 to generate the limited-use key (LUK) 514. The key index information 510 may be derived from a key index that includes information pertaining to the generation of the LUK 514, and that may be used as a seed to generate LUK 514. For example, the key index may include time information indicating when the LUK 514 is being generated. In some embodiments, the time information can be represented as the numeric string 'YHHHH', where 'Y' (0-9) represents the least significant digit of the current year, and 'HHHH' (0001-8784) represents the number of hours since the start of January $1^{st}$ of the current year expressed as digits (e.g., first hour of January $1^{st}$=0001). In some embodiments, the key index may also include a replenishment counter value indicating the number of times that the LUK 514 has been renewed or replenished in a predetermined time period (e.g., number of times LUK 514 has been generated in each hour). For example, the replenishment counter value can be represented as the numeric string 'CC' (00-99). At the beginning of each hour, 'CC' starts at 00 and is incremented by 1 each time LUK 514 is generated. In some embodiments, the key index may include an applications transaction counter value, or a pseudo random number generated by the CBPP or the issuer.

According to some embodiments, the key index information 510 that is provided as input to the encryption function 512 may be generated by padding the key index with one or more numeric values. For example, the key index can be padded with a numeric value (e.g., 1 or 2 shown as 'm' or 'n' in FIG. 5) at the beginning of the key index and/or a numeric value (e.g., 80000000 shown as 'xxxxxxxx' in FIG. 5) at the end of the key index. In some embodiments, the LUK 514 being generated from the key index information 510 may include multiple portions that are each generated from different variations of the key index information 510. For example, the LUK 514 may be divided into two portions. The first portion of LUK 514 may be generated by padding the key index with a first value to generate a first padded key index (e.g., 1YHHHHCC80000000), and encrypting the first padded key index using the second encryption key 508. The second portion of LUK 514 may be generated by padding the key index with a second value to generate a second padded key index (e.g., 2YHHHHCC80000000), and encrypting the second padded key index using the second encryption key 508. The encryption function 512 used to generate the LUK 514 may be, for example, TDES or other suitable encryption algorithms, and may use an initial chaining vector of binary zeros. It should be understood that the numeric values described herein are just examples, and that in some embodiments, other numeric values can be used.

After the LUK 514 is generated (e.g., by the CBPP or the issuer), the LUK 514 and the key index that includes information pertaining to the generation of LUK 514 may be provided to a portable communication device to facilitate generation of transaction cryptograms for transactions conducted using the portable communication device. The LUK may be associated with a set of one or more limited-use thresholds that limit the number of transactions that can be conducted using the LUK 514, such as those described herein. During execution of a transaction, the transaction cryptogram and/or the key index can be provided from the portable communication device to an access device, and the transaction may be authorized based on verification of the transaction cryptogram and whether the LUK 514 used to generate the transaction cryptogram has exceeded one or more of the LUK's limited-use thresholds.

The transaction cryptogram 520 may be generated by encrypting dynamic transaction data 516 using the LUK 514 as an encryption key in encryption function 518. The dynamic transaction data 516 may include, for example, some or all of the terminal transaction data 310 provided from the access device to the mobile application of the portable communication device during execution of the transaction. In some embodiments, the dynamic transaction data 516 may include the following data elements: authorized amount, other amount, terminal country code, terminal verification results, transaction currency code, transaction date, transaction type, and unpredictable number; and/or may include the application interchange profile (AIP), application transaction counter (ATC), and issuer application data (IAD). In some embodiments, some data elements may be omitted, and/or additional data elements not specifically described can be included. The data set that makes up the dynamic transaction data 516 is provided as input to the encryption function 518. In some embodiments, the transaction cryptogram 520 can be generated by enciphering the dynamic transaction data 516 using a first portion of the LUK 514, deciphering the enciphered dynamic transaction data using a second portion of the LUK 514, and then re-enciphering the deciphered dynamic transaction data using the first portion of the LUK 514.

Figure 6:
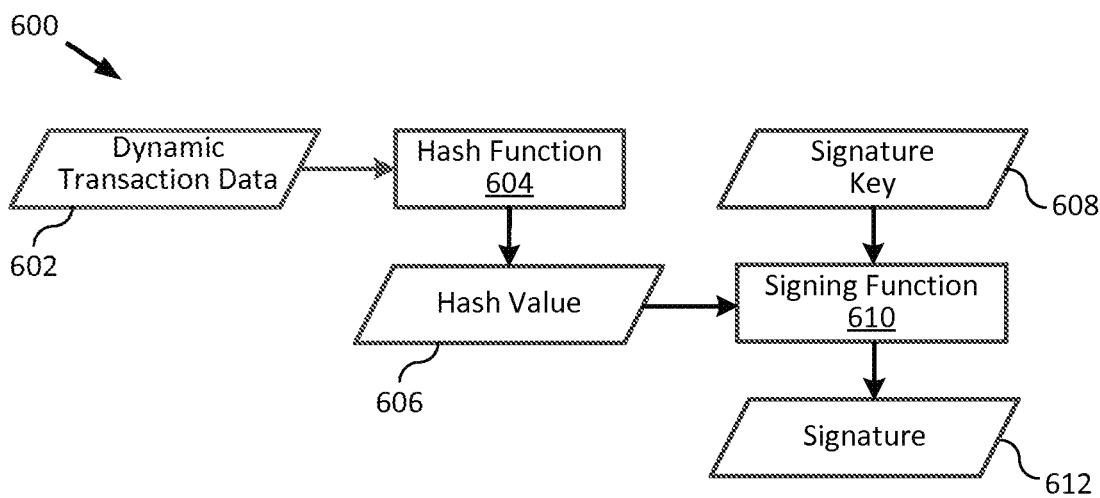
FIG. 6 illustrates an example of a process for generating a signature, according to some embodiments.

With respect to the signature generation, in some embodiments, the input data used to generate the signature for an ODA transaction may include dynamic data (e.g., data that changes for each transaction) received from the contactless reader of an access device during the transaction (e.g., terminal transaction data). FIG. 6 illustrates a block diagram of an example of a process 600 for generating a signature for an ODA transaction, according to some embodiments.

Process 600 may begin by generating a hash value 606 by applying a hash function 604 over dynamic transaction data 602. The dynamic transaction data 602 may include, for example, at least some or all of the terminal transaction data 310 provided from the access device to the mobile application of the portable communication device during execution of the transaction. In some embodiments, the dynamic transaction data 602 may include the terminal transaction data such as a terminal unpredictable number, an amount authorizes, and a transaction currency code, and/or card authentication related data. The card authentication related data may include a data authentication version number, a communication device unpredictable number, and transaction qualifiers. Additional data elements that can be included as the input to hash function 604 may also include the following data elements: a signed data format indicating the format of the signature being generated, a hash algorithm indicator indicating the hash function being used, communication device dynamic data (e.g., application transaction counter (ATC)) and length of the dynamic data, and/or a suitable padding pattern suitable for the hash function 604. Hash function 604 can be a secure hash algorithm (SHA) function such as SHA-1 or other variants, or a message digest algorithm (MD) such as MD5 or other variants.

Once the hash value 606 has been generated, the signature 612 for the ODA transaction can be generated applying a signing function 610 using the signature key 608 to at least the hash value 606. For example, the input data elements to the signing function 610 may include a data header, a signed data format indicating the format of the signature being generated, a hash algorithm indicator indicating the hash function being used, communication device dynamic data (e.g., application transaction counter (ATC)) and length of the dynamic data, a suitable padding pattern, hash value 606, and a data trailer. The signing function 610 can be, for example, a RSA algorithm, or other suitable public-key cryptosystem encryption algorithm.

Figure 7:
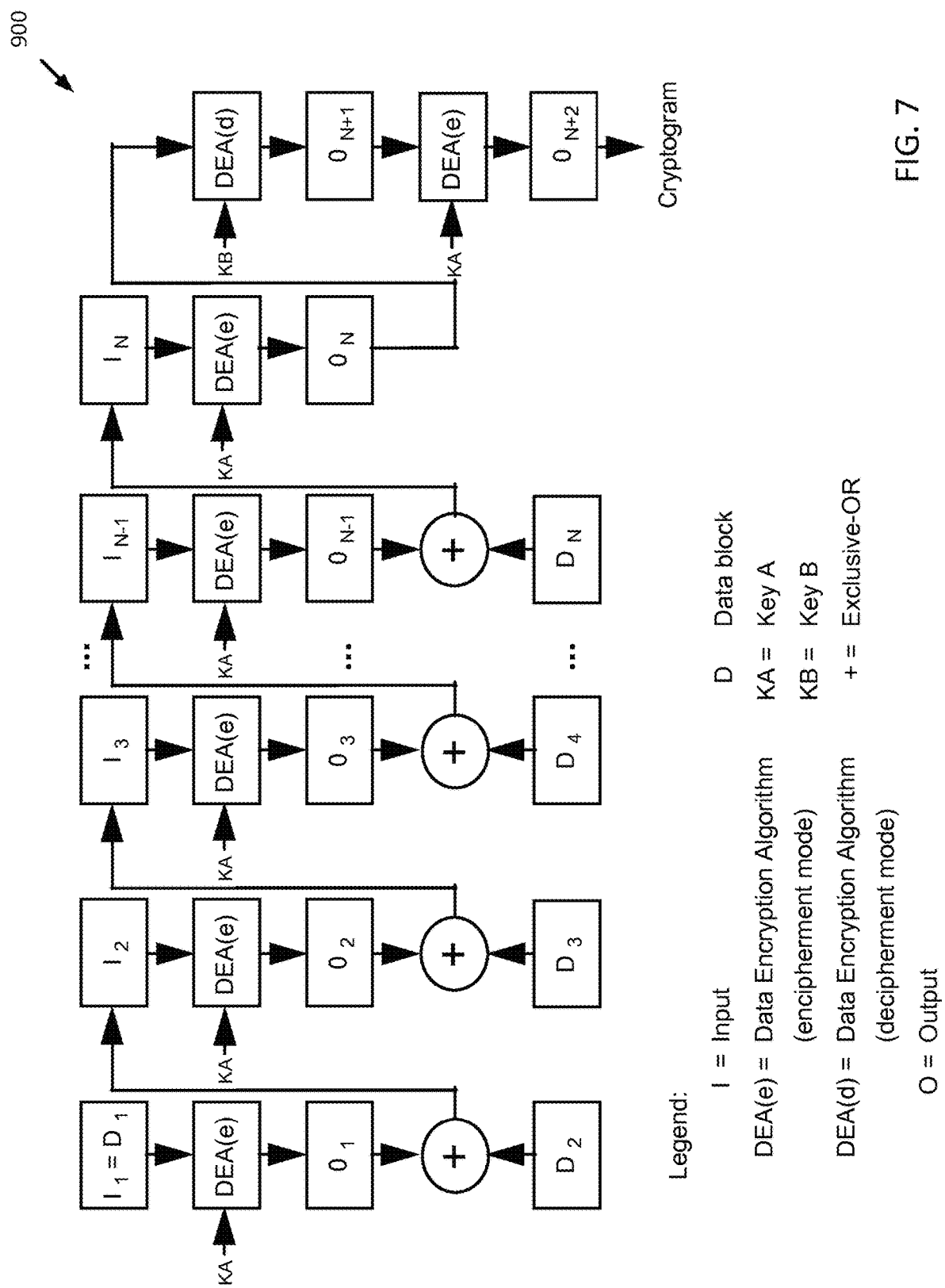
FIG. 7 illustrates an example of an encryption function, according to some embodiments.

FIG. 7 illustrates a block diagram of an example of encryption function 700, according to some embodiments. In some embodiments, encryption function 700 can be used as encryption function 518. For example, the data set that makes up the dynamic transaction data 516 may be concatenated together (e.g., in the order described above), and then divided into a set of data blocks $D_1$ to $D_N$ of equal length (e.g., 8-byte data blocks). If the dynamic transaction data 516 does not divide equally into the length of the data blocks, the missing least significant bits in the last data block $D_N$ can be zero filled. The first key KA may correspond to a first portion of the LUK 514 (e.g., most significant 8 bytes), and the second key KB may correspond to a second portion of the LUK 514 (e.g., least significant 8 bytes) An iterative enciphering process may be applied to the set of data blocks $D_1$ to $D_N$. The iterative enciphering process may include encrypting a first data block $D_1$ using key KA as the encryption key in a data encryption algorithm (DEA(e)). The result of the encryption is then exclusive-ORed with the next data block $D_2$. The result of the exclusive-OR operation is then used as the input for the next iteration of the enciphering process. The enciphering process continues until all data blocks $D_1$ to $D_N$ has been processed, and the output $I_N$ of the last exclusive-OR operation with the last data block $D_N$ is encrypted to form the output of the iterative enciphering process $O_N$. The output of the of the iterative enciphering process $O_N$ may then be deciphered using key KB as the decryption key in data decryption algorithm (DEA(d)). The output of the deciphering process $O_{N+1}$ is then re-enciphered using key KA as the encryption key in a data encryption algorithm (DEA(e)) to generate the output $O_{N+2}$. According to some embodiments, the output $O_{N+2}$ can be used as the transaction cryptogram 520.

It should be noted that in some embodiments, the encryption function 700 described with reference to FIG. 7 can be used to generate the authentication code that is used in the post-payment verification process and/or the account parameters replenishment process, for example, by applying the encryption function 900 over at least the transaction verification log stored on the portable communication device. In some embodiments, the encryption function 900 described with reference to FIG. 7 can also be used for any of the encryption functions 506, 512, and/or 518.

VI. Exemplary Methods

Figure 8:
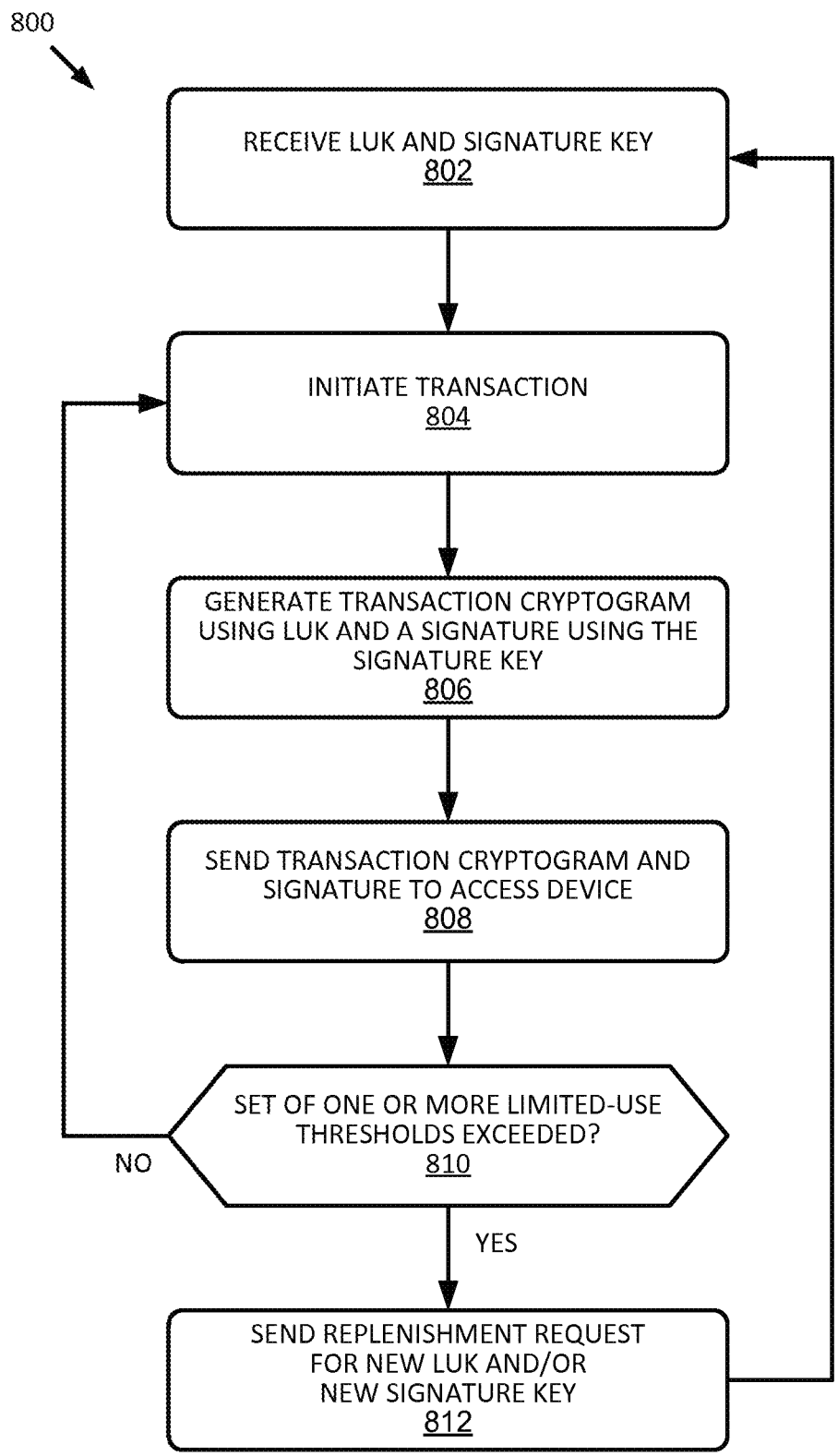
FIG. 8 illustrates a flow diagram of an example of a method for enhancing the security of a portable communication device, according to some embodiments.

FIG. 8 illustrates an exemplary flow diagram of a method 800 for enhancing the security of a communication device (e.g., a portable communication device) when conducting a transaction using the communication device, according to some embodiments. Process 800 can be performed, for example, by a mobile application executing on a portable communication device, and can be performed without using a secure element (although a secure element can be used in some embodiments).

At block 802, a communication device may receive a limited-use key (LUK) that is associated with a first set of one or more limited-use thresholds that limits the usage of the LUK, and a signature key that is associated with a second set of one or more limited-use thresholds that limits the usage of the signature key. The LUK and signature key may be received from a remote computer (e.g., a remote computer associated with MAP, CBPP, or issuer/host system), and may be received together or separately. In some embodiments, the first set of one or more limited-use thresholds may include any combination of one or more limited-use thresholds described herein, and the second set of one or more limited-use thresholds may include any combination of one or more limited-use thresholds described. The types of limited-use thresholds in the first and second sets can be the same or different, and the threshold values for the limited-use thresholds can be the same or different.

In some embodiments, the communication device may also receive additional account parameters such as a key index, a certificate authority public key index, an issuer public key certificate, and a communication device public key certificate. The issue public key certificate may include an issuer public key or information for deriving the issuer public key, and may be signed with a certificate authority private key. The communication device public key certificate may include a communication device public key or information for deriving the communication device public key, and may be signed with an issuer private key.

At block 804, a transaction (e.g., an ODA transaction that is performed using an account) can be initiated, for example, by placing the communication device in proximity to a contactless reader of an access device such as a transit gate terminal. At block 806, the communication device may generate a transaction cryptogram using the LUK and a signature using the signature key. In some embodiments, the communication device may receive terminal transaction data from the access device, and generating the signature may include generating a hash value over at least a portion of the terminal transaction data, and applying a signing function with the signature key to at least the hash value.

At block 808, the communication device may send the transaction cryptogram and the signature to the access device to request access to a good or service associated with the transaction. In some embodiments, the transaction cryptogram and the signature can be sent to the access device in the same communication. In some embodiments, the transaction cryptogram and the signature can be sent to the access device in separate communications, and the signature can be sent to the access device after the transaction cryptogram. In some embodiments, the communication device may also send a token (e.g., a substitute for an account identifier) instead of a real account identifier to the access device for the transaction.

The communication device may also send, to the access device, a communication device public key certificate including a communication device public key that is used to authenticate the signature, a certificate authority public key index, and an issuer public key certificate. The certificate authority public key index can be used by the access device to identify a proper certificate authority public key to authenticate the issuer public key certificate, and the issuer public key certificate may include an issuer public key that is used to authenticate the communication device public key certificate. The communication device may also send a token (e.g., a substitute for an account identifier) instead of a real account identifier to the access device for the transaction.

In some embodiments, process 800 does not use a secure element to store the token, LUK, or signature key in the communication device. Access to the good or the service associated with the transaction can be granted prior to verifying the transaction cryptogram. The access can be granted based on authentication of the signature and/or whether the signature key has exceeded the second set of one or more limited-use thresholds. Thereafter, the transaction can be authorized based on at least whether usage of the LUK has exceeded the first set of one or more limited-use thresholds and/or verification of the transaction cryptogram.

At block 810, after conducting the transaction, process 800 may determine if the first set of one or more limited-use thresholds associated with the LUK, and/or if the second set of one or more limited-use thresholds associated with the signature key has been exhausted or exceeded (or is about to be exhausted or exceeded). If it is determined that the set of one or more limited-use thresholds associated with the LUK, and/or the second set of one or more limited-use thresholds associated with the signature key has not been exhausted or exceeded (or is not about to be exhausted or exceeded), process 800 may continue to block 804 to initiate another transaction.

If it is determined that the set of one or more limited-use thresholds associated with the LUK has been exhausted or exceeded (or is not about to be exhausted or exceeded), and/or the second set of one or more limited-use thresholds associated with the signature key has been exhausted or exceeded (or is not about to be exhausted or exceeded), the communication device may send a replenishment request for a new LUK and/or new signature key to the remote computer at block 812. The replenishment request may be sent in response determining that the first and/or second set of one or more limited-use thresholds has been exhausted, or in response to determining that a next transaction will exhaust the first and/or second set of one or more limited-use thresholds. In some embodiments, the replenishment request may be sent in response to receiving a push message requesting the communication device to replenish the LUK and/or the signature key.

The replenishment request may include transaction log information derived from a transaction log (e.g., a transaction verification log) stored on the communication device. In some embodiments, the transaction log stored on the communication device may include, for each transaction conducted using the LUK, a transaction timestamp indicating the time of the corresponding transaction, an application transaction counter value associated with the corresponding transaction, and/or a transaction type indicator indicating whether the corresponding transaction is a magnetic stripe based transaction or an integrated chip based transaction. In some embodiments, the transaction log information sent to the remote server may include an authentication code computed over at least the transaction log using the LUK. If the transaction log information in the replenishment request matches the transaction log information at the remote computer, process 800 may continue to block 802, and communication device may receive a new LUK and a new key index associated with the new LUK, and/or a new signature key and certificates associated with the new signature key.

Figure 9:
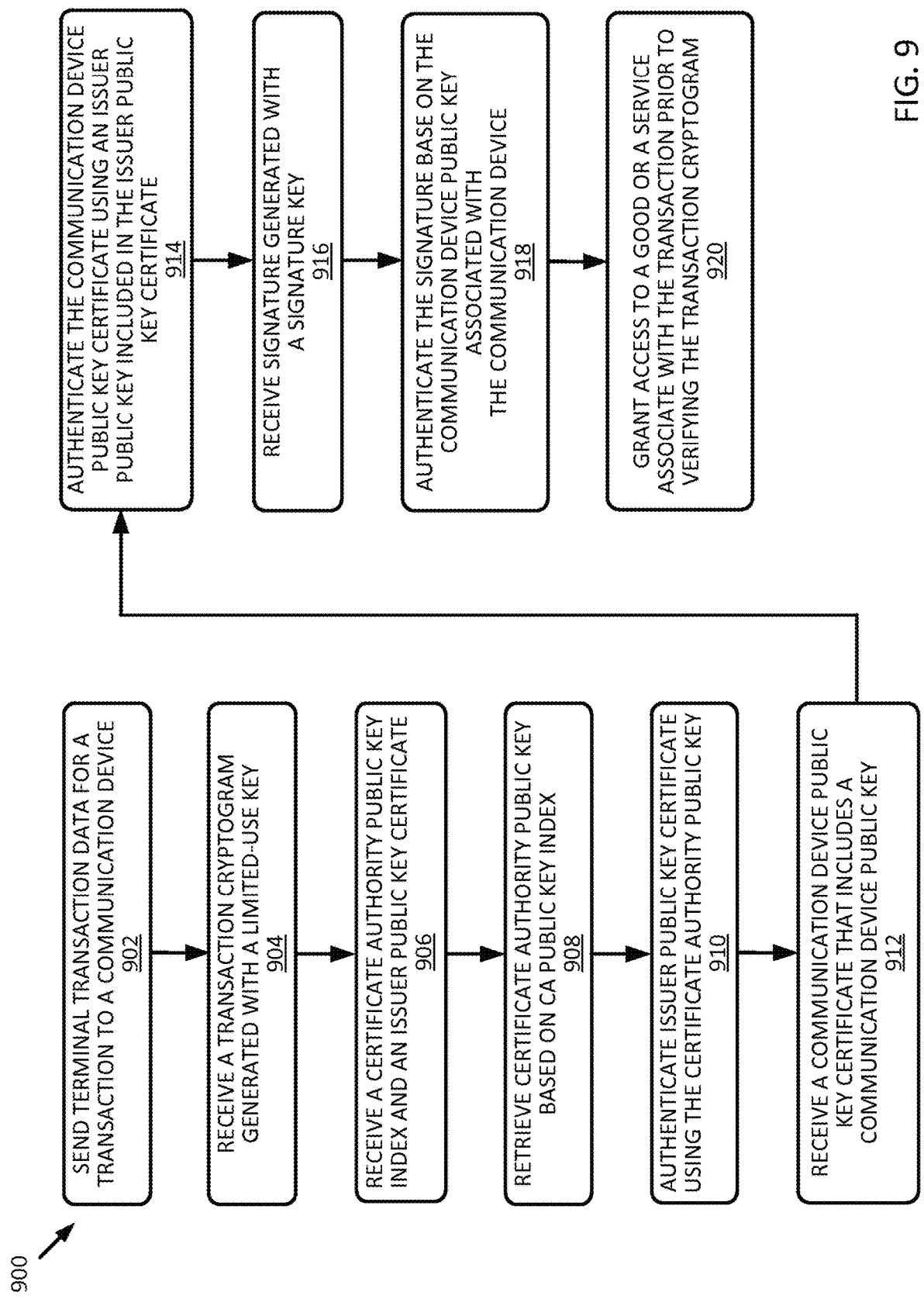
FIG. 9 illustrates a flow diagram of an example of a method for conducting offline data authentication, according to some embodiments.

FIG. 9 illustrates an exemplary flow diagram of a method 900 for performing offline data authentication, according to some embodiments. Process 900 can be performed, for example, by an access device such as a transit gate terminal.

At block 902, the access device detects the presence of a communication device, and sends, to the communication device, terminal transaction data for a transaction. At block 904, the access device receives a transaction cryptogram that is generated with a limited-use key associated with a first set of one or more limited-use thresholds. At block 906, the access device receives a certificate authority public key index and an issuer public key certificate from the communication device. At block 908, the access device retrieves a certificate authority public key based on the certificate authority public key index. For example, the access device may have multiple certificate authority public keys, and the certificate authority public key index received from the communication device can be used by the access device to a select an appropriate certificate authority public key for the ODA transaction. At block 910, the access device authenticates the issuer public key certificate using the retrieved certificate authority public key. For example, the retrieved certificate authority public key can be used to decipher the issuer public key certificate to obtain an issue public key.

At block 912, the access device receives a communication device public key certificate that includes a communication device public key. At block 914, the access device authenticates the communication device public key certificate using the issuer public key. For example, the issuer public key can be used to decipher the communication device public key certificate to obtain the communication device public key. At block 916, the access device receives a signature generated with a signature key from the communication device. the signature key can be associated with a second set of one or more limited-use thresholds. At block 918, the access device authenticates the signature based on the communication device public key associated with the communication device. For example, authenticating the signature may include deciphering the signature using the communication device public key to obtain a hash value, and comparing the hash value against an access device hash value computed by the access device. In some embodiments, the hash value included in the signature can be computed over at least some of the terminal transaction data provided to the communication device from the access device.

At block 920, in response to authenticating the signature, the access device grants access to a good or service associated with the transaction prior to verifying the transaction cryptogram. At a later time, after a user is given access to a good or service associated with the transaction based on authentication of the signature, the access device may send an authorization request message to request authorization for the transaction from an issuer or cloud-based payments platform.

In some embodiments, if a limited-use threshold associated with the signature key is enforced based on cumulative transactions or transaction amounts for a certificate authority public key associated with the signature key, the access device may periodically check the status of the certificate authority public key stored in the access device with a remote computer (e.g., operated by an issuer, cloud-based payments provide, or certificate authority) to determine if the cumulative transactions or transaction amounts for the certificate authority public key has been exceeded or is about to be exceeded. If so, this may indicate that the signature key has exceeded its associated set of one or more limited-use thresholds, and the access device may receive a new certificate authority public key from the remote computer.

VII. Mobile Application

Figure 10:
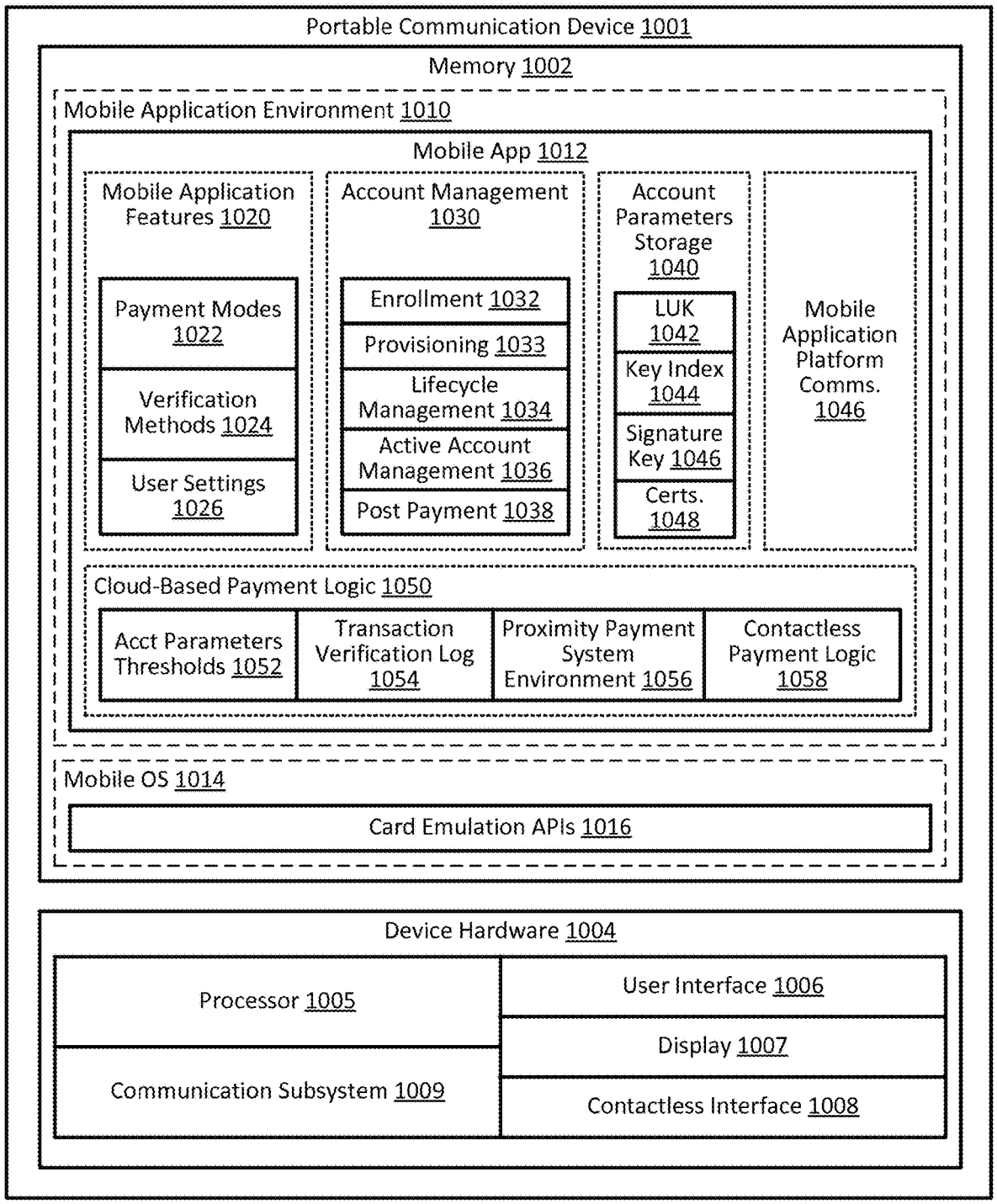
FIG. 10 illustrates a block diagram of an example of a portable communication device, according to some embodiments.

This section describes additional details of some of the functionalities that can be performed by the portable communication device and the mobile application installed on the portable communication device used to conduct cloud-based transactions. FIG. 10 illustrates a detailed block diagram of a portable communication device 1001, according to some embodiments. Portable communication device 1001 may include device hardware 1004 and memory 1002. Device hardware 1004 may include a processor 1005, a communications subsystem 1009, a use interface 1006, a display 1007 (which may be part of user interface 1006), and a contactless interface 1008. Processor 1005 can be implemented as one or more integrated circuits (e.g., one or more single core or multicore microprocessors and/or microcontrollers), and is used to control the operation of portable communication device 1001. Processor 1005 can execute a variety of programs in response to program code or computer-readable code stored in memory 1002, and can maintain multiple concurrently executing programs or processes. Communications subsystem 1009 may include one or more contactless interface transceivers (e.g., RF transceivers) and/or connectors that can be used by portable communication device 1001 to connect with external networks (e.g., communication network 192) and communicate with other devices. User interface 1006 can include any combination of input and output elements to allow a user to interact with and invoke the functionalities of portable communication device 1001. In some embodiments, display 1007 may be part of user interface 1006.

Contactless interface 1008 may include one or more RF transceivers to interact with a contactless reader of an access device. In secure element based implementations, only the secure element may have access to contactless interface 1008. In the cloud-based payments techniques described herein, contactless interface 1008 can be accessed by the mobile OS 1014 without requiring the user of a secure element. In some embodiments, display 1007 can also be part of contactless interface 1008, and is used, for example, to perform transactions using QR codes, bar codes, etc.

Memory 1002 can be implemented using any combination of any number of non-volatile memories (e.g., flash memory) and volatile memories (e.g., DRAM, SRAM), or any other non-transitory storage medium, or a combination thereof media. Memory 202 may store a mobile OS 1014 and a mobile application environment 1010 where one or more mobile applications reside including mobile application 1012 (e.g., a mobile wallet application, mobile payment application, etc.) to be executed by processor 1005. Mobile OS 1014 may implement a set of card emulation APIs 1016 that can be invoked by mobile application 1012 to access contactless interface 1008 to interact with an access device.

For cloud-based payments implementations, the payment system environment (e.g., PPSE) and mobile payment application functionalities are consolidated into mobile application 1012, whereas secure element based implementations may provide some or all of these functionalities from a secure element. Mobile application 1012 may include cloud-based payments logic 1050. Cloud-based payments logic 1050 may include contactless payment logic 1058, proximity payment system environment (PPSE) logic 1056, transaction verification log 1054, and account parameters thresholds 1052 (e.g., set of one or more limited-use thresholds associated with LUK 1042, and/or set of one or more limited-use thresholds associated with signature key 1046). Contactless payment logic 1058 may include functionalities that enable contactless communications to carried out to conduct a contactless transaction with a contactless reader of an access device. PPSE logic 1056 is used to inform the access device which payment product is available on mobile application 1012. The access device then uses this information to select the payment account to initiate a contactless transaction. Transaction verification log 1054 can be used for post-payment support. Mobile application 1012 may maintain transaction verification log 1054 (can be hidden from the consumer) retaining transaction details for transactions initiated from mobile application 1012. Mobile application 1012 may also use the transaction verification log 1054 to support active account management processes and post payment interactions. Account parameters thresholds 1052 (e.g., limited-user thresholds) are initially configured and can potentially be updated with different thresholds to inform mobile application 1012 when to initiate a request for updated account parameters (e.g., time-to-live, number of transactions, cumulative transaction amount, etc.).

Mobile application 1012 may also include account parameter storage 1040 and mobile application platform (MAP) communications logic 1046. Account parameter storage 1040 stores the account parameters (e.g., account identifier or alternate account identifier or token, LUK 1042, key index 1044, signature key 1046 and associated certificates 1048, etc.) that are used to initiate a cloud-based payment transaction. MAP communications logic 1046 is used to enable secure communications with a mobile application platform (MAP) in order to request, send, and receive information to manage a user's cloud-based payment accounts. This may include logic to consume and process information for account management logic 1030.

Account management logic 1030 includes logic to process information for the cloud-based payments services such as enrollment logic 1032, provisioning logic 1033, active account management logic 1036, lifecycle management logic 1034, and post payment interactions logic 1038. Enrollment logic 1032 includes logic for a consumer to initiate the enrollment of an account to the cloud-based payment service. Provisioning logic 1033 includes logic to process the issuer data to configure the account into mobile application 1012, including the provisioning of the initial account parameters. Active account management logic 1036 can be used to initiate a request with MAP to update the account parameters when account parameter thresholds have been exceeded. Lifecycle management logic 1034 may include logic to initiate and process account lifecycle events such as consumer initiated delete, issuer-initiated delete, issuer-initiated suspend, and/or issuer-initiated resume, etc. Post payment interactions logic 1038 is used to support payment verification. Post payment interactions logic 1038 may include logic to receive and respond to requests from MAP for transaction verification log 1054. Post payment interactions logic 238 can also be used to support account parameters replenishment, and may include logic to extract required information from transaction verification log 1054 to send to MAP as part of an account parameter replenishment request.

Mobile application 1012 may also include mobile application features 1020. Mobile application features 1020 may include consumer verification methods (CVM) logic 1024, payment modes 1022, and user settings 1026. CVM logic 1024 may include logic required to confirm a mobile application passcode or on-device verification method (e.g., screen lock), or other verification information method supported by mobile application 1012. Payment modes 1022 may include logic to support various ways of setting up mobile application 1012 and portable communication device 1001 to be ready to initiate a transaction, and may include support for Manual Mode and/or Always-On Mode.

Manual Mode is a state where mobile application 1012 is configured to be accessible for making a payment after the consumer has explicitly chosen to (1) open mobile application 1012, (2) entered user input for a consumer verification method if required, and (3) selected an account to make a contactless payment transaction and for a single transaction or limited time. For Manual Mode, a decision can be made whether a consumer device cardholder verification method (CDCVM) will be required prior to making payment. If a CDCVM is used, then the two-tap scenario for high-value transactions may not be necessary. Conversely, to reduce barriers to use, if an issuer decides to opt for not asking for a CDCVM in Manual Mode, then the consumer will be able to conduct transactions once the conditions for Manual Mode operation are met. In this latter scenario, mobile application 1012 may support entry of CDCVM if a CDCVM is requested during a high value payment.

Always-On Mode is a state where an account on portable communication device 1012 (a default account) is intended to be continuously accessible to a contactless reader. A portable communication device with an account set in this state allows a consumer to initiate a contactless payment transaction by the presentation of the portable communication device to a contactless reader. Always-On Mode may also support device verification (referred to below Always-On with On-Device Verification Mode). This setting allows for additional security. For example, the user may have to unlock the portable communication device's user interface or display screen before mobile application 1012 responds to a contactless reader attempting to initiate payment transaction.

Mobile Application Security

To provide additional security, mobile application 1012 may obfuscate and protect stored keys by an accepted mechanism, such as key wrapping. Code and data in the mobile application 1012 may be obfuscated in order to protect the code against reverse engineering. Communications between mobile application 1012 and MAP that contain sensitive information can be exchanged after the channel has been secured by MAP (e.g. using TLS). Mobile application 1012 may adhere to appropriate industry standards; such as FIPS-140-2. Error codes sent to the OS logging framework may disclose only information that will not be of aid to an attacker. Event logs and debugging information may avoid exposing directly or indirectly any credentials. Logged information can also be encrypted. Mobile application 1012 and MAP may provide mechanisms to detect, resist, and report if the portable communication device is in debug mode. Device state including jail breaking, rooting, malware, mobile application runtime integrity, etc. can be checked prior to personalization and provisioning of mobile application 1012, and when a new account parameter are sent to mobile application 1012. If any compromises are detected, mobile application 1012 can be deactivated, and the deactivation reason relayed back to MAP. The mobile application security capabilities can be inherently built in mobile application 1012, and dependencies on the portable communication device and OS platform security capabilities can be minimized. For a rooted or stolen device to gain access, device fingerprinting and tools that support device analysis and attestation can be used.

In some embodiments, MAP may authenticate the consumer and/or portable communication device 1001 using single or multifactor authentication. The storage/memory used to store the keys in mobile application 1012 may go through a certification process. For example, root credential can be generated. The input for generating root credential can be created from high entropy attributes such as hard to clone functions (UFs) resident on the portable communication device and time-bound attributes received and stored from backend system. Subsequent credentials hosted in key store can be extracted from a generated key encryption key (KEK). User credentials can be used as an input to generate a Root Credential and KEK. Obfuscated permutation logic can be provided as input to generating a Root Credential and KEK. Obfuscated permutation logic can be based on xx-morphic (polymorphic, metamorphic) mechanisms. Credential store can be time-bound and mutable. Extracted data-at-rest key from key store can be encrypted and decrypted from yet another KEK when resident as data-in-use. Binary attributes for application logic processing the key can be provided as input (bind) to generate KEK for protecting data-in-use. Data-in-use keys can be scrubbed through application logic processing keys. The following Protection Profiles (PP) can be established: PPs for KEK1 protected Key Store, PPs for KEK1 & 2 generation logic, PPs for KEK2 protected data-in-use key, and/or PPs for data-in-use key scrubbing.

Code and data in mobile application 1012 can be obfuscated in order to protect the code against reverse engineering. The application logic that also drives key extraction can be certificated for tamper resistance for ensuring protection of keys. The application logic hosting credentials used to authenticate and the credentials themselves can be certificated for tamper resistance. Tamper resistance/detection mechanisms can be implemented to preserve the integrity of the code/application logic. User credentials can be used as an input to encrypting sensitive parts of code logic. Obfuscated permutation logic can be provided as input to generating a KEK. Obfuscated permutation logic can be based on xx-morphic (polymorphic, metamorphic) mechanisms. Code and application logic can be time-bound and mutable. The following Protection Profiles (PP) can be established: PPs for tamper resistance/detection, PPs for obfuscation generation logic, PPs for ensuring measured initialization, and/or PPs for update Mobile Application Launch and Account Preparation On each consumer-initiated manual launch (i.e., through a hard or soft key, or from the device's mobile application environment 1010), mobile application 1012 may check and report to MAP if portable communication device 1001 is in debug mode. Mobile application 1012 may check that the payment accounts provisioned in mobile application 1012 are active and available, and check if the account parameter thresholds 1052 have been exceeded and determine if an account parameter replenish request is required. Mobile application 1012 may check the device state, including jail breaking, rooting, malware, mobile application runtime integrity, and if new account parameters are sent to mobile application 1012. If device or application compromise is detected, mobile application 1012 may be deactivated and the deactivation reason relayed back to MAP.

If a payment account managed by mobile application 1012 is in a suspended state then the consumer can benefit from being presented with information to take the necessary action or to contact their issuer. To make a payment account provisioned in mobile application 1012 ready for payment, the user may first select to pay using this payment account. This can be done in the following ways for each payment mode. In Manual Mode, the user launches mobile application 1012, selects the card or account to use for payment, navigates to payment screen for the selected card or account and selects to pay. In Always-On Mode, the user selects the card or account to be used for payment as the default payment account. For Always-On with On-Device Verification Mode, the user selects the card or account to be used for payment as the default payment account. Once a card or account is selected for payment, mobile application 1012 may configure PPSE 1056 with appropriate account details of the selected card or account. Once PPSE 1056 is configured, the selected card or account is ready for payment when the user taps portable communication device 1001 on an access device or otherwise communicate with the access device.

Mobile Application User Verification

In some embodiments, mobile application 1012 may support user verification when interacting with MAP and/or interacting with an access device. When interacting with MAP (e.g., provisioning or replenishment of account parameters stored in account parameters storage 1040), a unique username and password may be verified by MAP, depending on the context of that interaction and the requirements of the issuer. Mobile application 1012 may also provide a list of the cardholder verification methods supported by mobile application 1012 to an access device when interacting with the access device. Cardholder verification methods that are supported in the card environment, such as online PIN and signature, can also be supported by cloud-based payments.

Portable communication device 1001 may also have a specific category of cardholder verification methods, referred to as consumer device cardholder verification method (CDCVM). There are a number of different methods that can be used to provide the CDCVM for mobile application 1012, which can include the same username/password utilized in the authentication with MAP. The CDCVM method utilized by mobile application 1012 may provide different levels of security.

Cloud-based CDCVM performed through connection to an online service may provide the highest level of security. This could be the same as the username/password used for authentication to MAP. However, if data connectivity is not present, this would result in a payment requiring CDCVM to fail. Hence, this option may be used in Manual Mode to prevent a payment transaction failing midway through the two-tap process due to no data connectivity On-device CDCVM performed at the portable communication device level through the operating system may provide a better consumer experience. An example is the method required to unlock the portable communication device screen. Mobile application 1012 receives an indication from portable communication device 1001 when the CDCVM has been successfully entered. Mobile application 1012 has no capability to change the on-device CDCVM. Mobile application CDCVM can be performed on opening and launching mobile application 1012. An example is entering a numeric code to open mobile application 1012. As a software-based CDCVM may be less secure than the other options, this method may be used in combination with a more secure option, such as with a cloud-based CDCVM, where the mobile application CDCVM is used when there is no data connectivity available.

User Settings

Mobile application 1012 may receive these options, or a subset thereof, in a suitable manner or assume a default for one or more of these options. These options describe the general behavior of mobile application 1012. For example, user settings 1026 may include payment modes such as Manual, Always-On, or Always-On with On-Device Verification. User settings 1026 may include whether the consumer can make changes to these initial preferences, how much time a consumer has to make a payment in each mode, how much time a consumer has to enter password in a two tap transaction (may be applicable to higher value transaction scenarios), within what time period mobile application 1012 should shut down if there has been no interaction from the consumer, etc. User settings 1026 may also support password change. The user may populate the consumer's chosen mobile application password by invoking a password change process and provide the current or default password and the consumer's newly chosen password. The consumer may choose this option to change previously chosen passcode/password. Mobile application 1012 may prompt the consumer to enter the current password and new password (depending on the implementation and the manner in which passwords are masked or not, the consumer may be prompted to input the new password twice to ensure correct entry). Mobile application 1012 may replace the old passcode/password with the new passcode/password. The location of the passcode/password may be stored remote or local to the device.

If the consumer has chosen to modify the Always-On Mode settings, the PPSE 1056 may be configured appropriately (e.g., the file control information (FCI) template can be updated with directory entry for the default payment account). This ensures that the default account is used when portable communication device 1012 is brought in proximity to an access device when conducting transactions.

If on-device verification setting is turned on, mobile application 1012 may ensure to not initiate a transaction until the verification method has been confirmed. The verification method in this case can be the one set by the user for unlocking the phone. Upon successful verification, the cardholder verification method (CVM) verified field in mobile application 1012 may be set. The successful verification in this setting is then conveyed to the access device and eventually to the issuer via the CVM verified field.

Mobile Application Interaction Events

The behavior of mobile application interaction events may depend on whether the mobile application 1012 is currently running when this event occurs, or whether the receipt of the event by the underlying mobile application environment 1012 is the trigger that caused mobile application 1012 to launch. Depending on the capabilities of the underlying mobile application environment 1012, mobile application 1012 may be able to differentiate between different events.

The receipt of a push notification by the underlying mobile application environment 1012 can be targeted towards mobile application 1012. Mobile application 1012 can be reached in band via MAP to replenish account parameters for the cloud-based account or push other data as may be deemed necessary by the issuer and/or MAP. The communication channel with MAP may also be used for issuers to send lifecycle management events such as suspend, resume, delete.

On shutdown, mobile application 1012 may ensure that the state of each payment account is in a suitable state. This may apply when mobile application 1012 is going through an expected shutdown sequence as well as when mobile application 1012 is unexpectedly terminated. The previous account verification applied during manual launch may be reversed, and payment account CDCVM verification indicators may be set to the negative. Mobile application 1012 may ensure that the consumer's chosen settings are reflected and that the payment accounts are in their regular idle states.

Mobile Application Shutdown/Clean Up

Mobile application 1012 may perform cleanup when it is closed unexpectedly (e.g., the portable communication device shuts off due to low battery power) or on purpose. In any payment mode, mobile application 1012 may save the payment mode, account parameters, associated thresholds, and default card settings so that they are available when mobile application 1012 is launched again. Mobile application 1012 may terminate any ongoing transaction, close any open session with the MAP, save transaction logs if shutdown was immediately preceded by a successful transaction, and free up any system and memory resources being used by mobile application 1012. In some embodiments, mobile application 1012 may choose to set or reset the "CDCVM successfully performed" flag, depending on how the CDCVM verification logic is implemented.

The implementation logic related to PPSE configuration may differ during shutdown/cleanup depending on the payment mode selected when mobile application 1012 is shut down. In Always-On Mode, mobile application 1012 may save the PPSE configuration so that the PPSE picks up the default card as the only active card for payment when mobile application 1012 is launched again. In Manual Mode, the PPSE configuration may not be saved upon shutdown. Instead, the PPSE may be re-populated when the consumer selects a card to pay the next time mobile application 1012 is launched. On mobile application 1012 shutdown, mobile application 1012 may ensure that the consumer's chosen settings are reflected and that the payment accounts are in their regular idle states.

Navigating from the Mobile Application

When the consumer presses the portable communication device's home button or back button to move out of mobile application 1012 and then come back to it, mobile application 1012 may continue running in the background and continue the operation being performed. Mobile application 1012 may apply restrictions for additional security, such as timeouts, to limit the time that it can continue running in the background. If a consumer puts mobile application 1012 in the background while a transaction is in progress, mobile application 1012 may continue the transaction processing.

Mobile Application Uninstall

As part of an uninstallation process, mobile application 1012 may clear any sensitive data such as keys, certificates, and account parameters. Mobile application 1012 may inform MAP so that CBPP and the issuer/host system can execute the necessary lifecycle management processes for accounts provisioned in mobile application 1012 at the time of uninstallation. Mobile application 1012 may close any open session with MAP, terminate the ongoing transaction if present, and release any system and memory resources being used by mobile application 1012.

Account Enrollment

Mobile application 1012 may include enrollment logic 1032 to enroll/add a payment account into the cloud-based payment program, unless the issuer has provided another channel to accomplish this. The issuer may be directly involved in the enrollment process (e.g., the issuer directly may make the accept/decline enrollment decision or delegates the decision to a third party under pre-defined conditions). In both cases, the issuer may be in full control of the acceptance criteria and specifically defines card account verification methods and consumer authentication methods.

Enrollment logic 1032 may allow a consumer to input card details to initiate a payment account enrollment. The details to capture may be determined by the issuer/host system and/or CBPP, but should be sufficient to uniquely identify and verify the payment account. The issuer/host system and/or CBPP can determine the method and information required to authenticate the consumer who owns that account. Mobile application 1012 may send payment account enrollment data to MAP, which will then send and manage the account enrollment and account verification process with the issuer/host system and/or CBPP.

If enrollment is successful, mobile application 1012 may receive from MAP the data for provisioning the new payment account for payment, including a payment account application ID (AID), PPSE AID, payment account issuer settings, payment account card art, account parameters, account parameter settings and thresholds, etc. If enrollment is successful, enrollment logic 1032 may provision the payment account based on the information received from MAP. Mobile application 1012 may also, as part of the configuration process, request the consumer to set an account verification method (e.g., a passcode), if it is not already set. Upon completing the account configuration, mobile application 1012 may display a message to the consumer that the enrollment was successful. Mobile application 1012 may support and configure the account parameter thresholds as defined by the issuer/host system and/or CBPP. The account parameter thresholds may include a number of transactions (i.e. cumulative number of transactions that would trigger a replenish request for a specific payment account), time to live (i.e. amount of time to elapse before mobile application 1012 would trigger a replenish request for a specific payment account), and/or cumulative transaction amount (i.e. total monetary amount across one or more transactions conducted on a specific account before mobile application 1012 would trigger a replenish request for that account). If enrollment is not successful, mobile application 1012 may receive and process a the failure notification and reason code, and display a message to the consumer that the enrollment was not successful and request the consumer take any appropriate action.

Payment Using Mobile Application

Mobile application 1012 enables the user to perform contactless transactions at a contactless access device via portable communication device 1001. Mobile application 1012 facilitates this by using the account parameters provided by CBPP to generate the data format to conduct payment transactions. To avoid consumer confusion as to where the payment will be allocated to, if there are multiple payment mobile applications installed on portable communication device 1012, the consumer may be required to choose which mobile application to use for the payment. There are a number of options how this can be achieved. The consumer may, at the consumer's discretion, be able to set a default payment mobile application in the mobile OS settings. The consumer may be able to set a default payment product in a specific mobile application's settings. The consumer may be able to manually select a payment product within that mobile application. To ensure the consumer choice is used, mobile application 1012 may present the selected payment account to the access device. Mobile application 1012 may support either integrated chip based transaction path or magnetic stripe based transaction path, depending on which type of transaction the access device supports. Integrated chip based transaction is the default path used with a chip card capable access device, and magnetic stripe based transaction is the default path used with a magnetic stripe only capable access device.

In some embodiments, mobile application 1012 may support multiple application identifiers (AIDs) for a single account. A single account may have multiple AIDs associated with it, for example, if a transaction conducted on that account can be processed by different payment processing networks and/or if the account has different services, features, product-types, and payment capabilities associated with the account. The multiple AIDs can be communicated to the access device to allow an access device to select a preferred AID to choose how the transaction is processed (e.g., which payment processing network) and/or what services or features can be associated with the transaction. The multiple AIDs can be populated in the directory entry for the PPSE, and communicated to an access device for this purpose.

For example, a single account may have a common debit AID and a payment processing network specific AID (e.g., a Visa AID) associated with the single account. These AIDs can be populated in the directory entry for the PPSE, and the PPSE File Control Information (FCI) for each directory entry may include an Issuer Identification Number (IIN) and an Issuer Country Code (ICC). In some embodiments, the CVM for the debit AID can be an online CVM (e.g., an online PIN), while the CVM for the payment processing network specific AID can be a signature.

A contactless payment can be initiated by the consumer tapping portable communication device 1001 to a contactless reader (e.g., a NFC reader), or otherwise communicating with the contactless reader (e.g., displaying a QR code or bar code) of the access device. The access device may request a cardholder verification method (CVM) for transactions above a threshold amount (e.g., transactions above $20). Mobile application 1012 can support a number of different CVMs, including the mobile specific consumer device cardholder verification method (CDCVM). Not all access devices may support CDCVM, and in those cases, an alternative CVM can be requested such as signature or online PIN.

An indication of successful CDCVM entry is sent during the payment transaction to the contactless reader. Mobile application 1012 may configure the appropriate data in the account parameters at the time of payment when the CDCVM has been successfully confirmed. Whenever the CDCVM is successfully entered, mobile application 1012 may store this information so the CDCVM verified indicator and CDCVM type indicator can be set and passed to the contactless reader during the payment transaction. This may prevent the access device from prompting the consumer for CDCVM entry at the access device. Mobile application 1012 may have the capability to provide indication of a successful CDCVM when requested by a access device during a two-tap payment transaction.

When mobile application 1012 is locked due to inactivity, mobile application 1012 may store this information so the CDCVM verified indicator can be set to negative. If a contactless payment is initiated in this state, the access device may prompt the consumer for CDCVM entry. Mobile application 1012 may provide the capability for CDCVM reset if it provides the consumer verification entry method for CDCVM. Mobile application 1012 may set a limit for number of consumer verification attempts, and locks mobile application 1012 if this limit is exceeded. For security purposes, issuers may request additional consumer verification before unlocking mobile application 1012. In some embodiments, mobile application 1012 may have a CDCVM that is not synchronized with the online PIN of a companion card.

In Manual Mode, the consumer may open or launch mobile application 1012 to enable payment functionality. When mobile application 1012 is opened, functionality can be enabled so the consumer can initiate a payment by tapping portable communication device 1001 to a contactless reader. Portable communication device 1001 may prevent the consumer from performing a transaction based on any accounts stored in mobile application 1012 if mobile application 1012 is not open and active as the foreground application.

If the CDCVM indicator is not positive (i.e. a valid CDCVM entry has not yet been entered), mobile application 1012 can request CDCVM entry on opening. If this implementation path is selected, this may ensure the consumer is not requested again for CDCVM entry during a payment transaction (i.e., avoid the two-tap scenario for high value payments). Conversely, if this implementation path is not selected, usability for the consumer may be improved by omitting the request for CDCVM entry for transactions below a high value limit, with the trade-off being the consumer will be asked for the CDCVM entry if a high value payment is being conducted.

If there is more than one payment card or account available in mobile application 1012, the card or account selected as the default will be the one used for a payment transaction, unless the consumer selects an alternative card or account as active for payment. Once mobile application 1012 is open, PPSE 1056 may be populated and portable communication device 201 can initiate a payment transaction. Mobile application 1012 may display a message to the consumer indicating portable communication device 1001 is "Ready to Pay." Mobile application 1012 may define a time limit for inactivity, which when exceeded, may lock mobile application 1012. This ensures the consumer remains in control of the payment functionality, and the Manual Mode does not morph into Always-On Mode through inactivity. Mobile application 1012 can also enable the consumer to select a preferred time limit in settings. Depending on whether CDCVM is required or not, mobile application 1012 can require CDCVM entry to unlock mobile application 1012 after being locked due to inactivity.

In Always-On Mode, contactless payment capability is available whenever the phone screen is active. The contactless capability (e.g., NFC) may be available even if the phone screen is still in a locked state. To ensure consumers are aware of this capability and can opt-in to its usage, mobile application 1012 may preclude setting Always-On Mode as the default mode. Whenever the phone screen is active, PPSE 1056 can be activated and populated, and portable communication device 1001 is able to initiate a payment transaction. When the consumer initiates a contactless transaction with the screen in a locked state, the contactless reader may request CDCVM entry. Where a device-level CDCVM is used, an icon indicator may be displayed on the notification bar, and the phone screen needs to be unlocked. Mobile application 1012 may then instruct the consumer to tap portable communication device 1001 to a contactless reader. Where a mobile application-level CDCVM is used, an icon indicator can be displayed on the notification bar. Mobile application 1012 may present the CDCVM entry screen to the consumer, and then instruct the consumer to tap portable communication device 1001 to a contactless reader once a successful CDCVM has been entered.

In Always-On with Device Verification Mode, contactless payment capability is available whenever the phone screen is active and unlocked. The contactless capability is not available when the phone screen is still in a locked state. Whenever the phone screen is unlocked, PPSE 1056 may be activated and populated, and portable communication device 1001 is able to initiate a payment transaction. If the consumer attempts to initiate a contactless payment with the screen in a locked state, the contactless reader will not be able to communicate with portable communication device 1001, and so nothing will happen on either the access device or on portable communication device 1001. When the consumer initiates a contactless payment with the screen in an unlocked state, the contactless reader may request CDCVM entry. Where a device-level CDCVM is used, mobile application 1012 may instruct the consumer to tap portable communication device 1001 to the contactless reader. Where a mobile application level CDCVM is used, mobile application 1012 may present the CDCVM entry screen to the consumer, and then instruct the consumer to tap portable communication device 1001 to the contactless reader once a successful CDCVM has been entered.

When mobile application 1012 and the access device have completed the communications to provide the data to complete the transaction, mobile application 1012 may display a message indicating that the payment has been sent. A contactless payment conducted using the integrated chip based transaction path may provide mobile application 1012 with some transaction data, such as transaction amount and merchant information. Mobile application 1012 can populate the payment sent message with this information. A contactless payment conducted using the magnetic stripe based transaction path does not provide mobile application 1012 with any transaction data. Following a payment, mobile application 1012 may check the account parameter thresholds, and determine if mobile application 1012 needs to send a request for replenishment of the account parameters.

Active Account Management

Active account management logic 1036 of mobile application 1012 initiates and manages the request to replenish account parameters when the account parameter thresholds have been exceeded. In order to mitigate the risk of the account parameters stored in account parameters storage 1040 from being compromised, account parameters can be periodically generated by CBPP and replenished in mobile application 1012 as well as refreshed in the issuer/host system in order to maintain the account in the active state. For the active account management process to be initiated, CBPP may receive a replenishment request for new account parameters from mobile application 1012 through MAP. CBPP 180 can also act upon a request received from the issuer/host system.

In some embodiments, active account management logic 1036 of mobile application 1012 can trigger the update or replenishment of the account parameters through an account parameters replenishment pull process. Active account management logic 1036 may attempt to initiate the account parameters replenishment flow at the time the consumer launches mobile application 1012, or after a transaction has been completed, and the account parameter thresholds 1052 have been exceeded. Upon receiving an updated set of account parameters, mobile application 1012 may process the account parameters payload and make the new account parameters available for payment. Upon successfully processing the new set of account parameters, mobile application 1012 may generate a notification to MAP. MAP may notify CBPP that the account parameters were successfully delivered to mobile application 1012. Note that updated account parameters can be accompanied with a new set of device threshold management parameters (e.g., different limited-use thresholds than the previous set of account parameters) that an issuer may want to use when the customer is in different environments (e.g. outside of the domestic market). Before initiating the exchange of sensitive information, MAP may perform user, device, and application level authentication.

The update or replenishment of the account parameters can also be performed with an account parameter replenishment push process. In this flow, CBPP initiates the process to update the account parameters. CBPP sends a push message to MAP to initiate the replenishment push. MAP may then sends a push message to mobile application 1012. Mobile application 1012 then generates the account parameter update request per the replenishment pull flow described above. Before initiating the exchange of sensitive information, MAP may perform user, device, and application level authentication. If a user level authentication is used because previous authentication has expired, then mobile application 1012 may cache the request until the consumer opens mobile application 1012 and performs a user level authentication. After the successful authentication, mobile application 1012 follows the same procedure as in the replenishment pull flow. If user level authentication is not needed because the previous authentication has not expired, mobile application 1012 can immediately follow the same procedure as in the replenishment pull flow.

Upon receiving an updated set of account parameters, active account management logic 1036 may check the validity of the new account parameters, make the new account parameters available for payment, reset the account parameters thresholds, reset the account parameters threshold configurations, and delete the old set of account parameters. In some embodiments, mobile application 1012 may allow a transaction to be initiated even if the account parameters have not been updated due to lack of network connectivity. The issuer/host system or payment processing network acting on behalf of the issuer may make the decision to approve or decline the transaction based on knowledge of the stale account parameters in combination with other issuer defined risk metrics.

Mobile application 1012 may include a number of cloud-based payments device account parameters thresholds 1052 or risk limits that trigger the update of the current set of account parameters. This may include a number of transactions, a time to live, and/or cumulative transaction amount, etc. If the account parameters are valid for a number of transactions in CBPP, then account parameter thresholds 1052 in mobile application 1012 can be configured with a lower threshold number of transactions (e.g., one less than the number of transactions in CBPP) to trigger replenishment. If account parameters have an expiration time in CBPP, account parameter thresholds 1052 in mobile application 1012 can be configured with a threshold amount of time sooner than the expiration time to trigger replenishment. Where available from the contactless reader, the transaction amount can be used by active account management logic 1036 to make a decision as to whether the account parameters should be updated. Smaller transaction amounts would not necessarily require an immediate update of the account parameters. This mechanism, however, may not be reliable in environments where mobile application 1012 does not consistently receive the transaction amount from the access terminal. Where available, a cumulative transaction amount can be used as the trigger for account parameters update. This limit is based on the sum of individual transaction amounts. This data may not be necessarily reliable from mobile application 1012 point of view unless the data gets synchronized with the issuer/host system to ensure that a given transaction has been approved. A domestic versus international risk setting can also be used to trigger updates for international transactions more often in case they are considered more risky.

Account Lifecycle Management

Mobile application 1012 may include lifecycle management logic 1034 to provide a user-initiated delete option for the user to delete a card or account from mobile application 1012 via lifecycle management logic 1034. Account lifecycle logic 1034 may delete account parameters stored in account parameters storage 1040 associated with that account, along with all other account configuration data or artifacts. Lifecycle management logic 1034 may initiate the process of account deletion in CBPP by initiating a delete request to CBPP through MAP.

Lifecycle management logic 1034 may enable an issuer-initiated delete mechanism for an issuer to delete an account. The issuer/hos system may send a delete request to CBPP, and in turn, CBPP may route the request to mobile application 1012. Lifecycle management logic 1034 may delete locally stored account parameters associated with the account, along with all other account configuration data or artifacts. Mobile application 1012 may send an acknowledgement to MAP indicating that the deletion was completed. Mobile application 1012 may also display a message to user informing that the account is deleted.

Lifecycle management logic 1034 may enable an issuer-initiated suspend mechanism for an issuer to suspend an account. The issuer/host system can send a suspend request to CBPP, and in turn, CBPP may route the request to mobile application 1012. Lifecycle management logic 1034 may suspend the card or account in mobile application 1012. In the suspended state, the account cannot be selectable in the mobile application settings to make a payment. Lifecycle management logic 1034 may send an acknowledgement to MAP after suspending the account. Mobile application 1012 may display a message to user informing that the account is suspended, and may also inform the consumer to contact the issuing bank.

Lifecycle management logic 1034 may enable an issuer-initiated resume mechanism for an issuer to resume an account when it has been suspended in mobile application 1012. The issuer/host system may send a resume request to CBPP, and in turn, CBPP may route the request to mobile application 1012. Lifecycle management logic 1034 may resume the card or account in mobile application 1012. After resuming, the card or account may be selectable in the mobile application settings for payment. Mobile application 1012 may send an acknowledgement to MAP after resuming the account, and display a message to user informing that the account has been resumed.

Post Payment Interactions

Post payment interactions or processing can help issuers mitigate the risk of account parameters being compromised and hence can help limit the exposure of the account parameters stored on portable communication device 1001. Information contained in a transaction verification log may be used to provide a reference point for CBPP to assist in assurance that account parameter replenishment requests are originating from the expected portable communication device. Mobile application 1012 may include post payment logic 1038 to extract information from transaction verification log 1054 in order to construct account parameter replenishment requests.

Furthermore, the issuer/host system working in conjunction with CBPP may have the option of initiating a request, through MAP, for transaction verification log data captured and stored by mobile application 1012 to verify transactions. Mobile application 1012 may respond, through MAP, to the request with the requested transaction verification log data. This data can then be verified by the issuer/host system in order to confirm if a particular transaction had originated from the queried portable communication device. Examples of the data elements that may be included in the transaction verification log may include, for each transaction, transaction time (e.g., contactless interaction time, transaction amount, and unpredictable number received from the access device during the transaction) as well as account parameters information such as the key index associated with the LUK that was used to conduct the transactions. For payment transaction verification, mobile application 1012 may receive and process request from MAP for transaction verification log data captured and stored by mobile application 1012. Mobile application 1012 may respond to the MAP request with the requested transaction verification log data. Mobile application 1012 may use the current account parameter's LUK or equivalent in the dynamic data portion of the account parameters to sign the requested transaction verification log data.

Transaction Verification Log

Mobile application 1012 can maintain transaction verification log 1054 to log all contactless interactions (e.g., NFC) where payment account parameters where shared with an access device, irrespective if the transaction was accepted or declined, or irrespective of whether mobile application 1012 has visibility to the outcome of the transaction (e.g., accepted or declined). Mobile application 1012 may store the transaction verification log data for the current and the previous set of account parameters per payment account. In some embodiments, the transaction verification log data for old set of account parameters can be deleted once mobile application 1012 receives a new set of account parameters. Transaction verification log 1054 may or may not be accessible or visible to the user.

VIII. Exemplary Computer System

The various entities or components described herein with reference to FIG. 1 may be associated with or operate one or more computer apparatuses to facilitate the functions described herein. Any of the entities or components in FIG. 1, including any server or database, may use any suitable number of subsystems to facilitate the functions.

Figure 11:
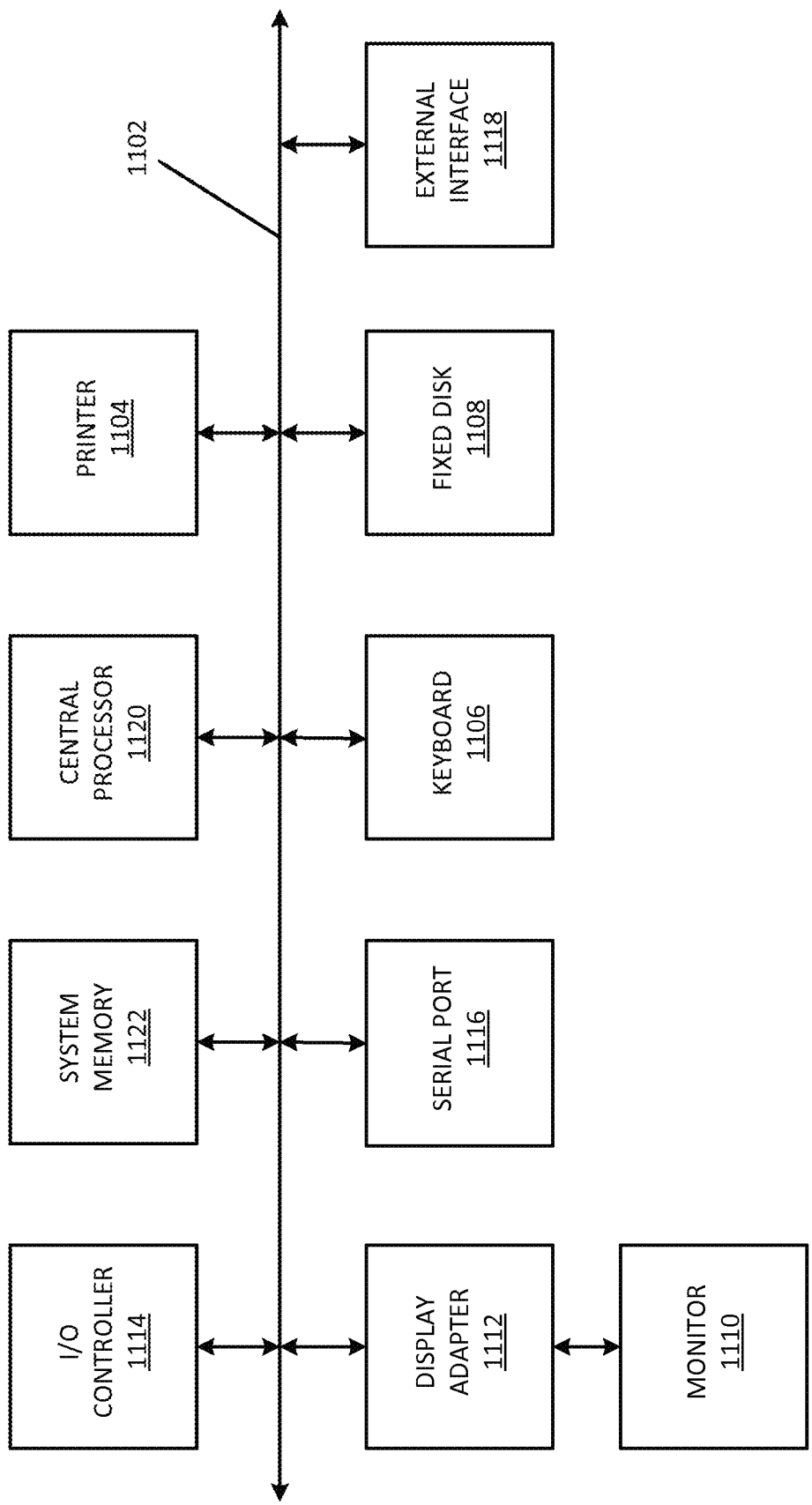
FIG. 11 illustrates a block diagram of an example of a computer system, according to some embodiments.

Examples of such subsystems or components are shown in FIG. 11. The subsystems shown in FIG. 11 are interconnected via a system bus 1102. Additional subsystems such as a printer 1104, keyboard 1106, fixed disk 1108 (or other memory comprising computer readable media), monitor 1110, which is coupled to display adapter 1112, and others are shown. Peripherals and input/output (I/O) devices, which couple to I/O controller 1114 (which can be a processor or other suitable controller), can be connected to the computer system by any number of means known in the art, such as serial port 1116. For example, serial port 1116 or external interface 1118 can be used to connect the computer apparatus to a wide area network such as the Internet, a mouse input device, or a scanner. The interconnection via system bus allows the central processor 1120 to communicate with each subsystem and to control the execution of instructions from system memory 1122 or the fixed disk 1108, as well as the exchange of information between subsystems. The system memory 1122 and/or the fixed disk 1108 may embody a computer readable medium.

Embodiments of the invention are not limited to the above-described embodiments. For example, although separate functional blocks are shown for an issuer, payment processing network, and acquirer, some entities perform all of these functions and may be included in embodiments of invention.

Specific details regarding some of the above-described aspects are provided above. The specific details of the specific aspects may be combined in any suitable manner without departing from the spirit and scope of embodiments of the invention. For example, back end processing, data analysis, data collection, and other transactions may all be combined in some embodiments of the invention. However, other embodiments of the invention may be directed to specific embodiments relating to each individual aspect, or specific combinations of these individual aspects.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. An access device comprising:
a processor;
a contactless interface transceiver to interact with a communication device; and
a memory coupled to the processor and storing code executable by the processor to perform operations including:

sending, to the communication device, terminal transaction data for a transaction, where the transaction is an offline transaction;

receiving, from the communication device, a certificate authority public key index, an issuer public key certificate, and a communication device public key certificate, where the certificate authority public key index identifies a certificate authority public key that authenticates the issuer public key certificate, the issuer public key certificate includes an issuer public key that authenticates the communication device public key certificate, and the communication device public key certificate includes a communication device public key;

receiving, from the communication device, a transaction cryptogram generated using a limited-use-key (LUK) as an encryption key to encrypt at least a plurality of data elements from the terminal transaction data, where the LUK is associated with a first set of one or more limited-use thresholds that limit usage of the LUK;

receiving, from the communication device, a signature generated using a signature key and at least a part of the terminal transaction data, where the signature key is associated with a second set of one or more limited-use thresholds that limit usage of the signature key, and the first set of one or more limited-use thresholds include a first limited-use threshold that is different than a second limited-use threshold included in the second set of one or more limited-use thresholds;

authenticating the communication device without requiring network activity by verifying the signature using the communication device public key;

in response to authenticating the communication device, granting access to a good or a service associated with the transaction prior to verifying the transaction cryptogram; and after granting access to the good or the service, sending an authorization request message to an issuer to obtain authorization for the transaction from the issuer by verifying the transaction cryptogram with the issuer.

2. The access device of claim 1, wherein the operations further include:
retrieving the certificate authority public key based on the certificate authority public key index; and
authenticating the issuer public key certificate using the certificate authority public key.

3. The access device of claim 2, wherein the operations further include:
authenticating the communication device public key certificate using the issuer public key included in the issuer public key certificate.

4. The access device of claim 2, wherein the certificate authority public key is a first certificate authority public key, and wherein the operations further include:
receiving, from a remote computer, a second certificate authority public key after the signature key has exceeded the second set of one or more limited-use thresholds.

5. The access device of claim 1, wherein the second set of one or more limited-use thresholds includes a time-to-live that indicates an amount of time for which the signature key is valid.

6. The access device of claim 1, wherein authenticating the signature includes:
deciphering the signature using the communication device public key to obtain a hash value, and
comparing the hash value against an access device hash value computed by the access device.

7. The access device of claim 1, wherein the LUK is valid for more than one transaction.

8. The access device of claim 1, wherein the access device lacks network connectivity when the transaction is being conducted.

9. A method comprising:
sending, by an access device, to a communication device, terminal transaction data for a transaction, where the transaction is an offline transaction;

receiving, by the access device, from the communication device, a certificate authority public key index, an issuer public key certificate, and a communication device public key certificate, where the certificate authority public key index identifies a certificate authority public key that authenticates the issuer public key certificate, the issuer public key certificate includes an issuer public key that authenticates the communication device public key certificate, and the communication device public key certificate includes a communication device public key;

receiving, by the access device, from the communication device, a transaction cryptogram generated using a limited-use-key (LUK) as an encryption key to encrypt at least a plurality of data elements from the terminal transaction data, where the LUK is associated with a first set of one or more limited-use thresholds that limit usage of the LUK;

receiving, by the access device, from the communication device, a signature generated using a signature key and at least a part of the terminal transaction data, where the signature key is associated with a second set of one or more limited-use thresholds that limit usage of the signature key, and the first set of one or more limited-use thresholds include a first limited-use threshold that is different than a second limited-use threshold included in the second set of one or more limited-use thresholds;

authenticating, by the access device, the communication device without requiring network activity by verifying the signature using the communication device public key;

in response to authenticating the communication device, granting, by the access device, access to a good or a service associated with the transaction prior to verifying the transaction cryptogram; and after granting access to the good or the service, sending an authorization request message to an issuer to obtain authorization for the transaction from the issuer by verifying the transaction cryptogram with the issuer.

10. The method of claim 9, further comprising:
retrieving, by the access device, the certificate authority public key based on the certificate authority public key index; and
authenticating, by the access device, the issuer public key certificate using the certificate authority public key.

11. The method of claim 10, further comprising:
authenticating, by the access device, the communication device public key certificate using the issuer public key included in the issuer public key certificate.

12. The method of claim 10, wherein the certificate authority public key is a first certificate authority public key, and further comprising:
receiving, by the access device, from a remote computer, a second certificate authority public key after the signature key has exceeded the second set of one or more limited-use thresholds.

13. The method of claim 9, wherein the second set of one or more limited-use thresholds includes a time-to-live that indicates an amount of time for which the signature key is valid.

14. The method of claim 9, wherein authenticating the signature includes:
deciphering the signature using the communication device public key to obtain a hash value, and
comparing the hash value against an access device hash value computed by the access device.

15. The method of claim 14, wherein the communication device public key corresponds to the signature key, and wherein the access device hash value is computed over at least a portion of the terminal transaction data.

16. The method of claim 9, further comprising:
receiving, by the access device, from the communication device, a token that is a substitute for an account identifier, the authorization request message including the token and the transaction cryptogram.

\* \* \* \* \*